US012774618B2

(12) United States Patent
Becker

(10) Patent No.: US 12,774,618 B2
(45) Date of Patent: Oct. 27, 2026

(54) MODULAR SECURITY APPARATUS

(71) Applicant: Two Ton Technology, LLC, Ridgefield, CT (US)

(72) Inventor: Todd H. Becker, Ridgefield, CT (US)

(73) Assignee: Two Ton Technology, LLC, Ridgefield, CT (US)

( * ) Notice: Subject to any disclaimer, the term of this patent is extended or adjusted under 35 U.S.C. 154(b) by 30 days.

(21) Appl. No.: 18/983,611

(22) Filed: Dec. 17, 2024

(65) Prior Publication Data

US 2025/0129641 A1 Apr. 24, 2025

Related U.S. Application Data

(63) Continuation-in-part of application No. 18/207,830, filed on Jun. 9, 2023.

(51) Int. Cl.
*E05B 73/00* (2006.01)

(52) U.S. Cl.
CPC ...... *E05B 73/0082* (2013.01); *E05B 73/0029* (2013.01)

(58) Field of Classification Search
CPC ............. E05B 73/0017; E05B 73/0029; E05B 73/0082
See application file for complete search history.

(56) References Cited

U.S. PATENT DOCUMENTS 5,408,212 A 4/1995 Meyers et al.
6,243,005 B1 6/2001 Haimovich
6,420,971 B1 7/2002 Leck et al.
6,994,192 B1 2/2006 Chang
7,104,091 B2 9/2006 Kuhblank
7,685,850 B2 3/2010 Nilsson
8,373,566 B2 2/2013 Yang
8,854,207 B2 10/2014 Williams
(Continued)

FOREIGN PATENT DOCUMENTS

WO 2018102403 A1 6/2018
WO 2022027078 A1 2/2022

OTHER PUBLICATIONS

International Search Report and Written Opinion mailed Sep. 18, 2024 for International Application No. PCT/US202432700.
(Continued)

*Primary Examiner* — Christopher J Boswell
(74) *Attorney, Agent, or Firm* — Pierce Atwood LLP

(57) ABSTRACT

A modular security apparatus may be configured with a controller module and one or more fastener modules. A first fastener module may secure a portable item with, for example, one or more cables forming loops external to a housing of the module and retained by a one-way locking mechanism disposed within the housing. A second fastener module may anchor the modular security apparatus to an anchor surface or other fixed object. The controller module may be releasably attached to the first and second module. The controller module may include a controller configured to receive and verify an electronic signal. Upon verifying the electronic signal, the controller may actuate one or more mechanisms to release the portable item, release the modular security apparatus from the anchor surface, and/or to allow disassembly of the modules. In some implementations, the controller module may be integrated with the first and/or second module.

20 Claims, 41 Drawing Sheets

(56) References Cited

U.S. PATENT DOCUMENTS

| | | | | |
|---|---|---|---|---|
| 9,013,301 | B2 | 4/2015 | Williams | |
| 9,163,433 | B2 * | 10/2015 | Sedon | E05B 73/0082 |
| 9,328,536 | B2 | 5/2016 | Shute et al. | |
| 9,567,772 | B1 | 2/2017 | Snell | |
| 9,567,776 | B2 * | 2/2017 | Moock | E05B 73/0082 |
| 9,747,765 | B1 * | 8/2017 | Berglund | E05B 73/0082 |
| 9,953,498 | B2 | 4/2018 | Van Landingham, Jr. | |
| 10,323,440 | B1 * | 6/2019 | Kelsch | E05B 73/0029 |
| 10,352,068 | B2 | 7/2019 | Hollis | |
| 12,012,781 | B2 * | 6/2024 | Grant | E05B 73/0082 |
| 12,264,508 | B2 * | 4/2025 | Kelsch | E05B 73/0082 |
| 12,264,509 | B1 * | 4/2025 | Kelsch | E05B 73/0082 |
| 2005/0223756 | A1 | 10/2005 | Ling et al. | |
| 2009/0031766 | A1 * | 2/2009 | Stobbe | E05B 73/0005 70/263 |
| 2009/0205380 | A1 | 8/2009 | Tollefson | |
| 2011/0041569 | A1 | 2/2011 | Yu | |
| 2011/0227706 | A1 | 9/2011 | Yang | |
| 2012/0085134 | A1 | 4/2012 | Ezzo | |
| 2013/0301216 | A1 * | 11/2013 | Trinh | E05B 73/0082 361/679.58 |
| 2015/0315822 | A1 | 11/2015 | Garthe et al. | |
| 2018/0197389 | A1 * | 7/2018 | Grant | E05B 73/0082 |
| 2018/0223567 | A1 | 8/2018 | Hollis | |
| 2024/0200366 | A1 * | 6/2024 | Cheung | E05B 73/0082 |

OTHER PUBLICATIONS

U.S. Office Action issued on Jul. 21, 2025 for U.S. Appl. No. 18/207,830.

* cited by examiner

MODULAR SECURITY APPARATUS

CROSS-REFERENCE TO RELATED APPLICATIONS

This application is a continuation-in-part of U.S. patent application Ser. No. 18/207,830, filed Jun. 9, 2023, entitled "ELECTRONICALLY RELEASABLE APPARATUS," the entire contents of which are incorporated herein by references for all purposes.

BACKGROUND

The present disclosure generally relates to systems and methods used to secure portable items, and more specifically to apparatus having an electronically releasable assembly configured to secure a portable item.

Due to their portability, monetary value, and utility, portable items such as personal electronic devices, parcels, and other valuables, are vulnerable to theft. Personal electronic devices such as mobile phones, tablet computers, laptop computers, and the like have become ubiquitous and almost essential to modern life. Due to their portability, monetary value, and utility, such devices are vulnerable to theft. Portable personal electronic devices left unattended, displayed for retail sale or demonstration, and institutional electronic devices for public or private use are also frequent targets. Additionally, home delivery services for on-line purchases have grown rapidly and significantly over recent years. During the COVID-19 pandemic, the volume of parcels delivered directly to the home surged dramatically, with many consumers today expecting same-day and next-day delivery of packages as a basic capability for retailers. This rapid growth in home delivery has led to a significant surge in the theft of parcels left outside homes on doorsteps, porches and driveways.

In summary, items of value are increasingly portable and likely to be transported, increasing both the opportunity and incentive for theft. Consequently, individuals are seeking a convenient and effective solution for securing valuables, for example, by directly attaching the valuable to an immovable surface or object.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of embodiments of the disclosure. In the figures:

DETAILED DESCRIPTION

Figure 1B:
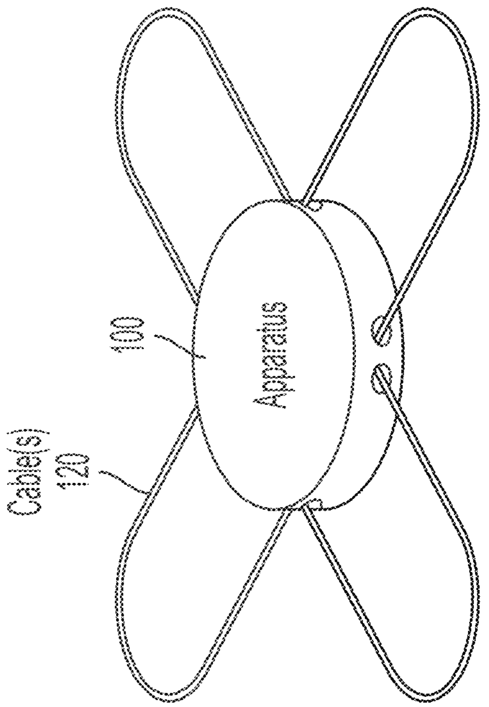
FIGS. 1A and 1B are views of a first example implementation of an electronically releasable security apparatus having a cylindrical shape, according to embodiments of the present disclosure.

Personal devices such as mobile phones, tablet computers, laptop computers, and the like have become ubiquitous and almost essential to modern life. Due to their portability, monetary value, and utility, however, such devices are vulnerable to theft. Other portable items such as parcels, retail merchandise displayed for demonstration or sale, and institutional devices for public or private use are also frequent targets. Yet, many of these items lack standardized features for locking or otherwise securing them.

The mechanism for attaching a security apparatus to a valuable object may be different than the mechanism for attaching the security apparatus and its target object to an immovable anchor surface. For example, the security apparatus may attach to the object of value by wrapping around the object or by fully encapsulating the object. At the same time, the security apparatus may be attached physically to an anchor surface, or it may wrap around an object that is permanently attached to an anchor surface.

Potential mechanisms for attaching a security apparatus to an object of value and to an anchor surface may share certain common design characteristics. For purposes of illustration and not limitation, the security apparatus must be physically secured so that a person of bad intent cannot easily take the object of value. The attachment mechanisms of the security apparatus may be hidden from view or direct manipulation so that an unauthorized individual is unable to access those mechanisms to physically release the object from the anchor surface. The security apparatus may also be integrated into packaging which contains a valuable object.

An owner or authorized user of a valuable object should be able to easily detach or release the security apparatus from the object, upon establishing their authority over the object. Similarly, an owner should be able to easily detach or release the security apparatus and object from the anchor surface or feature of that anchor surface to which it is secured, upon establishing their authority. By doing so, the object can be removed from the anchor surface without extreme effort by an individual who has established their authority to do so.

Another potential design characteristic of the security apparatus is the ability to electronically release the security apparatus and object of value. For example, the security apparatus may rely upon encrypted wireless remote communications of instructions to secure and unsecure the mechanisms of attachment, so that only authorized owners or their delegates are permitted to release secured objects from anchor surfaces within an environment.

In certain embodiments, the individual may use their personal electronic device such as a smart phone, key fob, smart watch, pad device or laptop to wirelessly communicate with the security apparatus.

In certain embodiments, the individual may use the embedded biometric or password-based features of their personal electronic device to wirelessly and securely communicate with the security apparatus. In this manner, the authorization, authentication or other security features of the individual's personal electronic device may be used to establish their authority to access the object of value through the security apparatus.

Such security apparatus may also be augmented with specific features such as sensors, cables, brackets, pulleys, or fitments to further enhance the safety and security of objects of value.

Another potential design characteristic of the security apparatus is portability so that one can easily carry it along with objects of value. The mechanisms of attachment should also be physically secured in such a manner that they will not mar, damage or alter the object of value or the anchor surface.

In certain embodiments, an authorized individual or owner of a valuable object should be able to easily attach the security apparatus to the object, as well as to an anchor surface or feature of that anchor surface. By doing so, the object cannot be removed from the anchor surface without extreme effort, making removal arduous and impractical for unauthorized individuals.

Offered herein are apparatus and techniques for securing valuables using electronically releasable fasteners which may also be referred to herein as electromechanical releasable fasteners, wirelessly releasable security devices, active anchor mechanisms, or any similar combination thereof. An apparatus may be configured with one or more cables forming loops external to a housing of the apparatus that may wrap around and secure a portable item. One or both ends of the cable(s) may be retained by a one-way locking mechanism disposed within the housing. Additionally or alternatively, the apparatus may include two or more brackets protruding from the housing and configured to secure the portable item. One or more of the brackets may be retained by a one-way locking mechanism within the housing. The one-way locking mechanism may allow movement of the cable(s) in a first linear direction (e.g., to decrease a length of cable forming the loop) while preventing movement of the cable(s) in a second linear direction (e.g., to increase the length of cable forming the loop) unless and until a controller of the apparatus verifies a received electronic signal. The electronic signal may be, for example, a wireless signal received by an antenna of the apparatus. Upon verifying the electronic signal, the controller may actuate an electromechanical component to release the cable(s) and/or bracket(s) and allow movement in the first linear direction. The cable loop(s) may wrap around corners, protrusions, etc., of valuables to prevent removal from the apparatus. Similarly, the bracket(s) may include hooks configured to extend around and thereby retain edges or corners of the portable item.

The apparatus may include an anchor mechanism to prevent removal of the apparatus from an anchor surface or other fixed object. In some implementations, the apparatus may have one or more active anchor mechanisms that may be electronically actuated to secure and/or release the apparatus from the fixed object in response to a wireless electronic signal. The apparatus may include a controller configured to receive and verify an electronic signal from an authorized device. Upon verification of an electronic signal, the controller may cause the one-way locking mechanism to release the cable(s) and allow removal of the apparatus from the valuable and vice-versa. In some cases, the controller may be configured to recognize a second electronic and, upon verifying the signal, release the anchor mechanism to allow removal of the apparatus and valuables from the anchor surface.

In some implementations, the security apparatus may have a modular construction in which a separate controller module and fastener modules may interlock in various configurations. For example, a first fastener module may secure to a portable item, a second fastener module may lock to an anchor surface, and the controller module may join the fastener modules together unless and until the controller module verifies a received electronic signal. Upon verifying the electronic signal, the controller module may actuate an electromechanical component to release the locking mechanism of one or both of the fastener modules and/or release one or both of the fastener modules from the controller module. The modular construction of the security apparatus may allow a user to select fastener modules most appropriate for securing their particular portable item to an available anchor surface.

In some implementations, the modules may be joined together using a twist-lock mechanism. For example, the user may bring a fastener module and the controller module into contact with each other and rotate the fastener module with respect to the controller module to engage the twist-lock mechanism such that the modules cannot be separated unless the rotation is reversed. An electromechanical locking mechanism may prevent rotation of the modules with respect to each other unless and until the mechanism is released. For example, the controller module may have a solenoid and plunger arranged so that the plunger extends out of the controller module to engage with a cavity and/or protrusion of the fastener module to create a mechanical interference that prevents rotation of the modules with respect to each other. In another example, the controller module may include an electromagnet and/or permanent magnet configured to attract a moving component from a fastener module such that it engages with a cavity or protrusion of the controller module. The moving component may be a pin (e.g., analogous to the plunger of the solenoid), a hook (e.g., that rotates into position to catch a surface of the cavity or protrusion in the controller module), a plate that is hinged at one side to allow the plate to engage with the cavity or protrusion, and/or take various other configurations. The moving component may be magnetic or ferromagnetic such that it is attracted by the permanent magnet or electromagnet of the controller module. The user may release the electromechanical locking mechanism by sending an electromagnetic signal to the controller. Upon verifying electronic signal, the controller may cause the solenoid to retract the plunger out of the cavity or away from the protrusion in the fastener module, and/or release the movable component from the cavity or protrusion in the controller module, thereby allowing the fastener module to be rotated and detached from the controller module.

In some implementations, the modular security apparatus may include an electronically releasable surface treatment on one or more of the mating surfaces between the controller module and a fastener module. For example, the surface of the controller module may include the electrically or electronically controlled barbs that are mechanically deployed from the surfaces to affect the coefficient of friction that resists lateral and/or rotational sliding of the modules with respect to each other. In a first state, the controller may cause the barbs to deploy from the surface(s) and create friction that resists lateral/rotational movement. In a second state, the controller may cause the barbs to retract from the surface(s) and reduce the friction between the mating surface of the modules and permit lateral/rotational movement. The mating surface of the fastener module may also include the electronically controlled barbs and/or may include a passive surface treatment configured for robust engagement with the electronically controlled barbs when the latter are deployed.

In some implementations, the modular security apparatus may have a manual locking mechanism. For example, a pin may extend from a fastener module to engage with a cavity or protrusion of the controller module such that when the fastener module is anchored to the anchor surface the pin is not accessible, and the fastener module and controller module cannot be detached from one another. When the modular security apparatus is removed from the anchor surface (e.g., by unlocking the anchor mechanism via an electronic signal), the user may access the pin and retract it from the cavity or protrusion of the controller module, thereby allowing the controller module to be rotated and detached from the fastener module. Similarly, a second pin may extend from the controller module into a cavity of the second fastener module that secures the portable item. The first fastener module (e.g., which attaches to the anchor surface) may block access to the second pin until it is removed from the controller module. Once the first fastener module is detached from the controller module, the user may retract the second pin from the cavity in the second fastener module, allowing the second fastener module to be rotated and detached from the controller module. In some implementations, the modular security apparatus may be implemented as a two-part apparatus in which a single module acts as both the controller module and one of the fastener modules. The integrated controller/fastener module may act as an anchor module, while the second module may secure the portable item, or vice-versa. These features may be implemented alone or in combination with each other and/or other features as described herein.

Figure 1A:
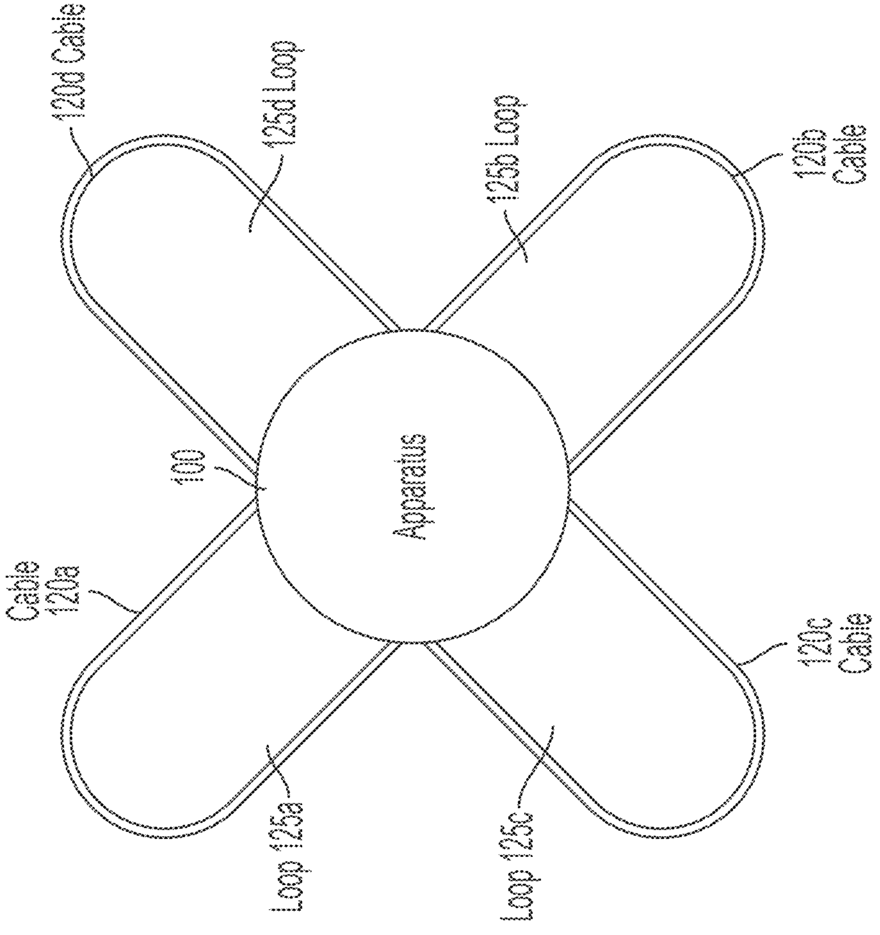

FIGS. 1A and 1B are views of a first example implementation of an electronically releasable security apparatus 100 having a cylindrical shape, according to embodiments of the present disclosure. In some embodiments, the apparatus 100 may have a block shape (e.g., a rectangular prism) such as shown in FIGS. 2A and 2B. In other embodiments, the apparatus 100 may take on other shapes made up of various flat and/or curved sides. The apparatus 100 may have a cable 120 for securing an object. In various implementations, the apparatus 100 may have one or more cables 120*a*, 120*b*, 120*c*, and/or 120*d* (collectively "cables 120"). A cable(s) 120 may form one or more loops 125*a*, 125*b*, 125*c*, and/or 125*d* (collectively "loops 125") extending from the apparatus 100, as shown in FIGS. 1A through 1D, 2A through 2D, etc.

Figure 1D:
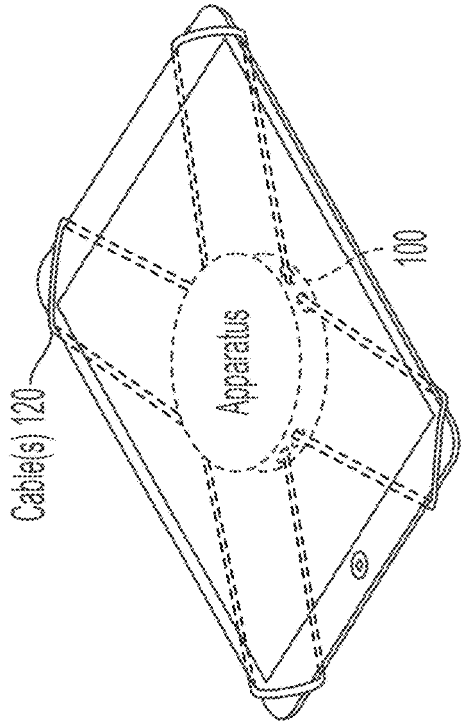
FIGS. 1C and 1D are views of the first example electronically releasable security apparatus securing an electronic device, according to embodiments of the present disclosure.
Figure 1C:
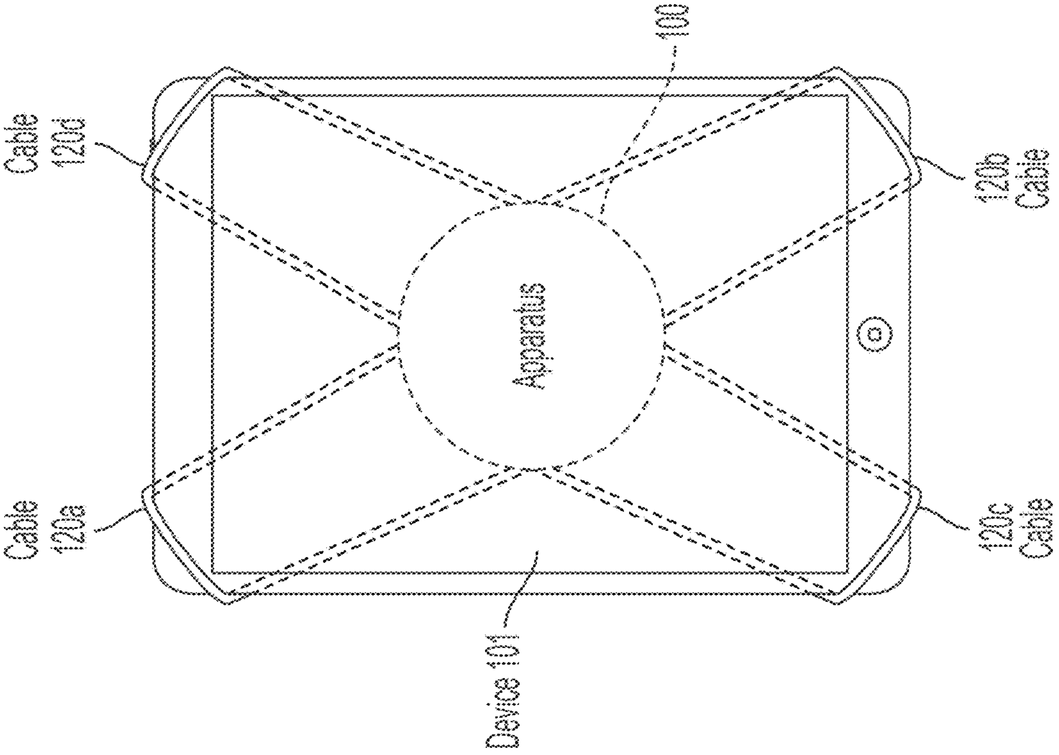
Figure 2B:
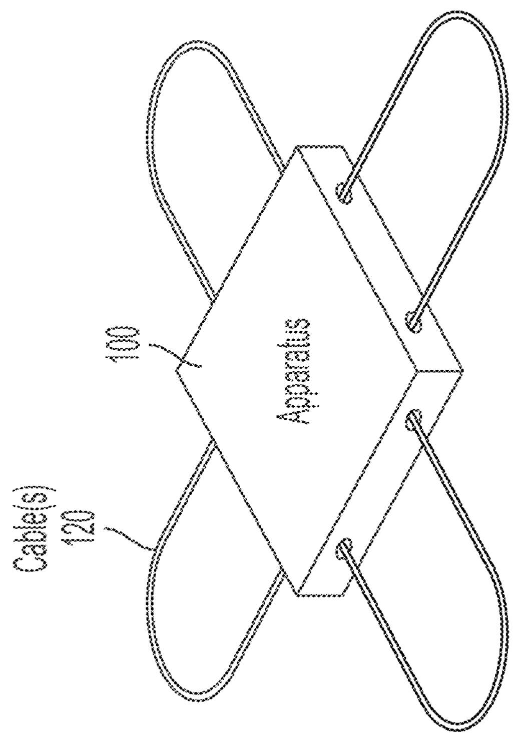
FIGS. 2A and 2B are views of a second example implementation of an electronically releasable security apparatus having a rectangular shape, according to embodiments of the present disclosure.
Figure 2A:
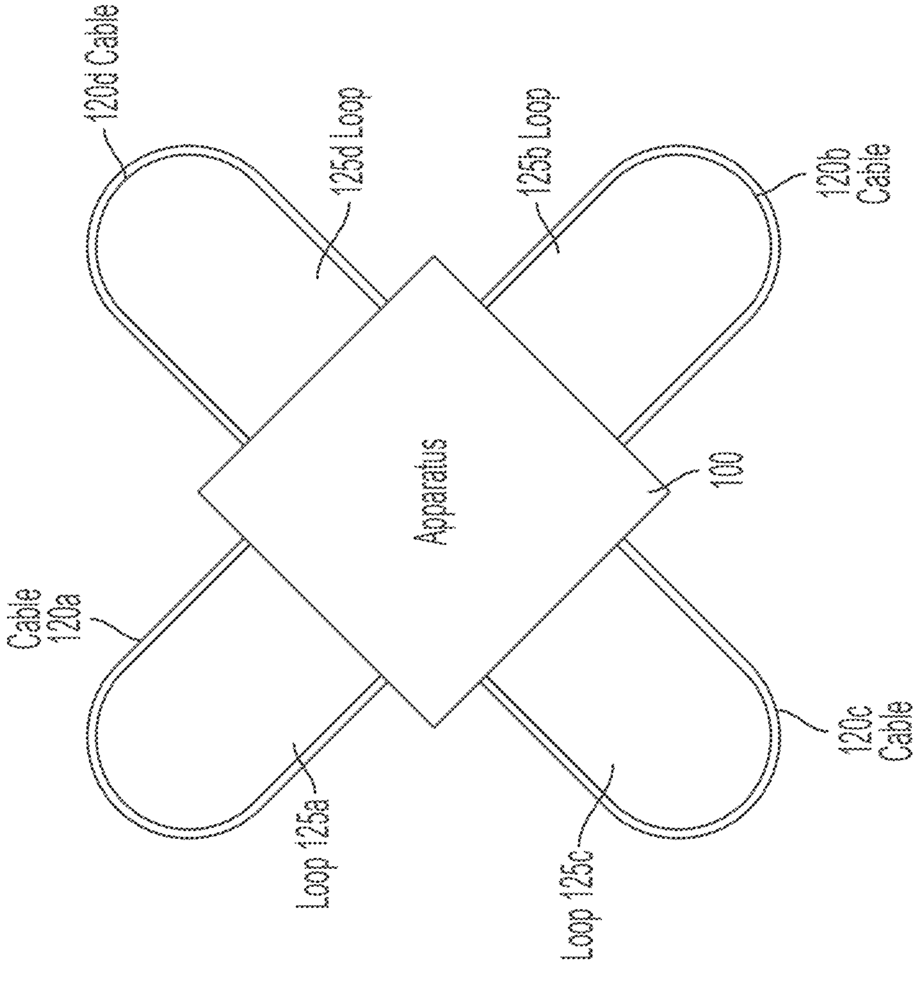
Figure 2D:
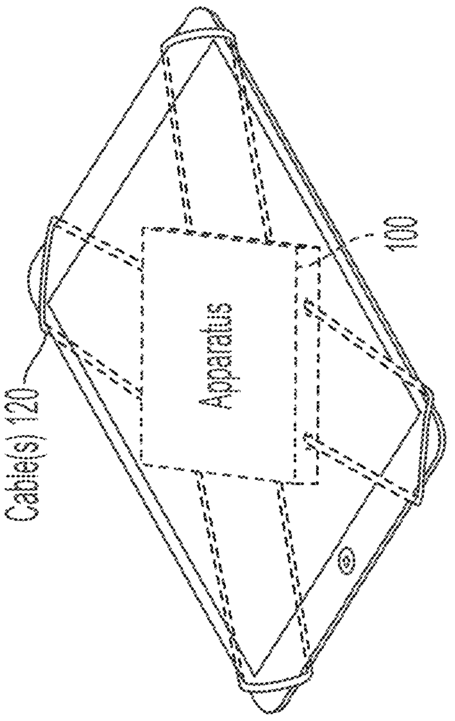
FIGS. 2C and 2D are views of the second example electronically releasable security apparatus securing an electronic device, according to embodiments of the present disclosure.
Figure 2C:
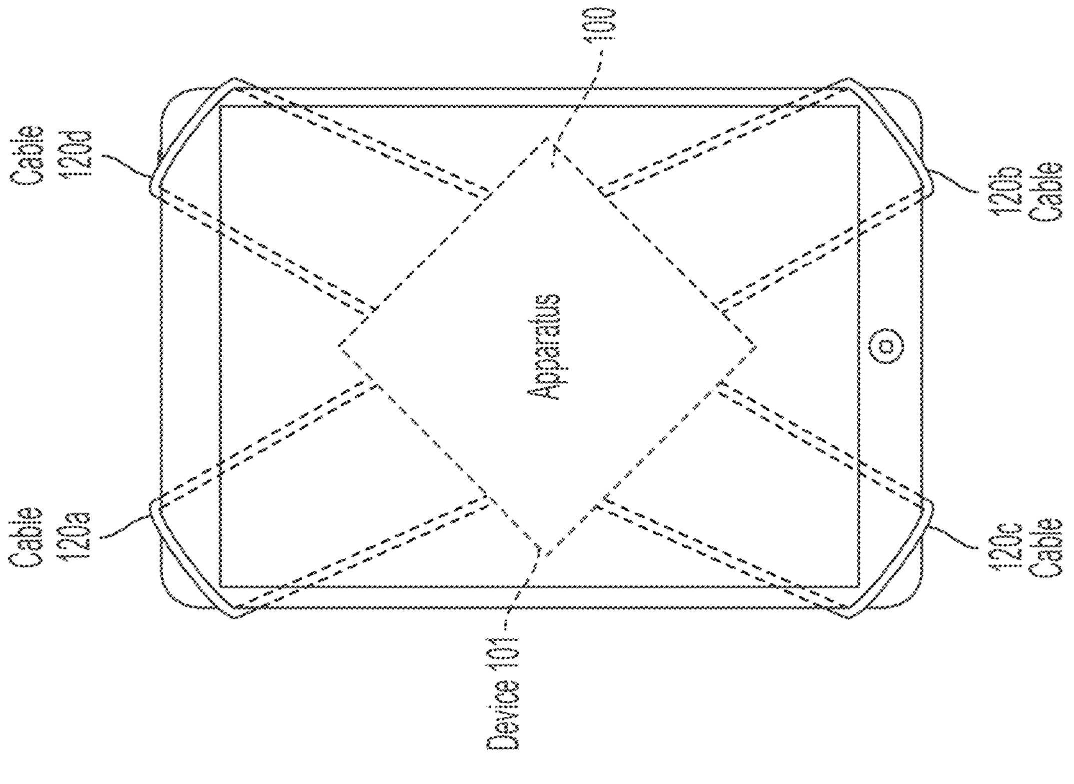

FIGS. 1C and 1D are views of the first example electronically releasable security apparatus 100 securing a personal electronic device 101, according to embodiments of the present disclosure. Similarly, FIGS. 2C and 2D are views of a second example apparatus 100 securing the device 101. The device 101 may be, for example, a personal device, electronic device, and/or handheld device, etc. Example devices 101 may include a mobile phone, tablet computer, laptop, e-reader, etc. Although various figures of the disclosure illustrate operation of the apparatus 100 in securing a personal electronic device, use of the apparatus 100 is not so limited, and may extend to securing other portable items such as parcels, textbooks, lockboxes, retail merchandise, musical instruments, and/or myriad other portable items. Embodiments of the apparatus 100 may secure any object having corners, protrusions, and/or other features that may be secured via the cables 120, brackets, straps, bag, and/or any of the other mechanisms described herein. The cables 120 may include metal and/or polymer with low stretch, high tensile strength, and/or high resistance to cutting; for example, braided and/or stranded steel cable, Kevlar, chain, etc. In some implementations, the cables 120 may include natural materials such as cotton, sisal or manila. In some implementations, the cables 120 may include synthetic materials like nylon, polyester, or polypropylene. In some implementations, the cables 120 may include multiple layers; for example, a stranded steel cable core for strength surrounded by a rubber, cloth, silicone, and/or polymer shield less likely to abrade, gouge, dent or otherwise damage the device 101. In some implementations, the cables 120 may have various cross sections such as round, oval, or flattened (e.g., a strap). For example, the cable 120 may take the form of a strap that increases the surface area with which it contacts the object being secured. A strap-style cable 120 configuration may increase the flexibility of the cable 120 in certain directions, allowing it to wrap around the object to be secured, while maintaining a sufficiently high overall cross-sectional area and strength. In some implementations the cable 120 may have a high-friction coating such as a rubber, polymer, adhesive, etc. The coating may be an additional layer formed around an internal, high-tensile-strength and/or cut-resistant material (e.g., by wrapping, weaving, extruding, coating, etc.). The high-friction coating may be applied as a liquid and then dried/cooled/cured. The high-friction coating may have a high coefficient of friction that resists lateral sliding off the secured object.

The cables 120 may form one or more loops that can wrap around corners or protrusions of the device 101. For example, as shown in FIGS. 1C, 1D, 2C, and 2D, a first cable 120*a* can secure a first corner of the device 101, a second cable 120*b* can secure a second corner of the device 101, and so on. When the apparatus 100 is unlocked, the cables 120 may be elongated (e.g., by being drawn through the apparatus 100) to increase the size of the loops. When the apparatus 100 is locked, the cables 120 may be fixed in length so the loops cannot be elongated to release the device 101 from the apparatus 100. In some implementations, when the apparatus 100 is locked, the cables 120 may be retracted into the apparatus 100 and/or drawn through the apparatus 100 in a manner that decreases the size of the loops; however, the apparatus 100 may prevent the cables 120 from being drawn from the apparatus 100 until/unless the apparatus 100 is unlocked.

The apparatus 100 may include electrical and/or mechanical features to prevent the cables 120 from being extracted when the apparatus 100 is locked. For example, the apparatus 100 may include a ratchet mechanism with an electronically releasable pawl as shown in FIG. 3A or a gear mechanism with a solenoid that can stop or release the gear as shown in FIG. 3B.

Figure 3A:
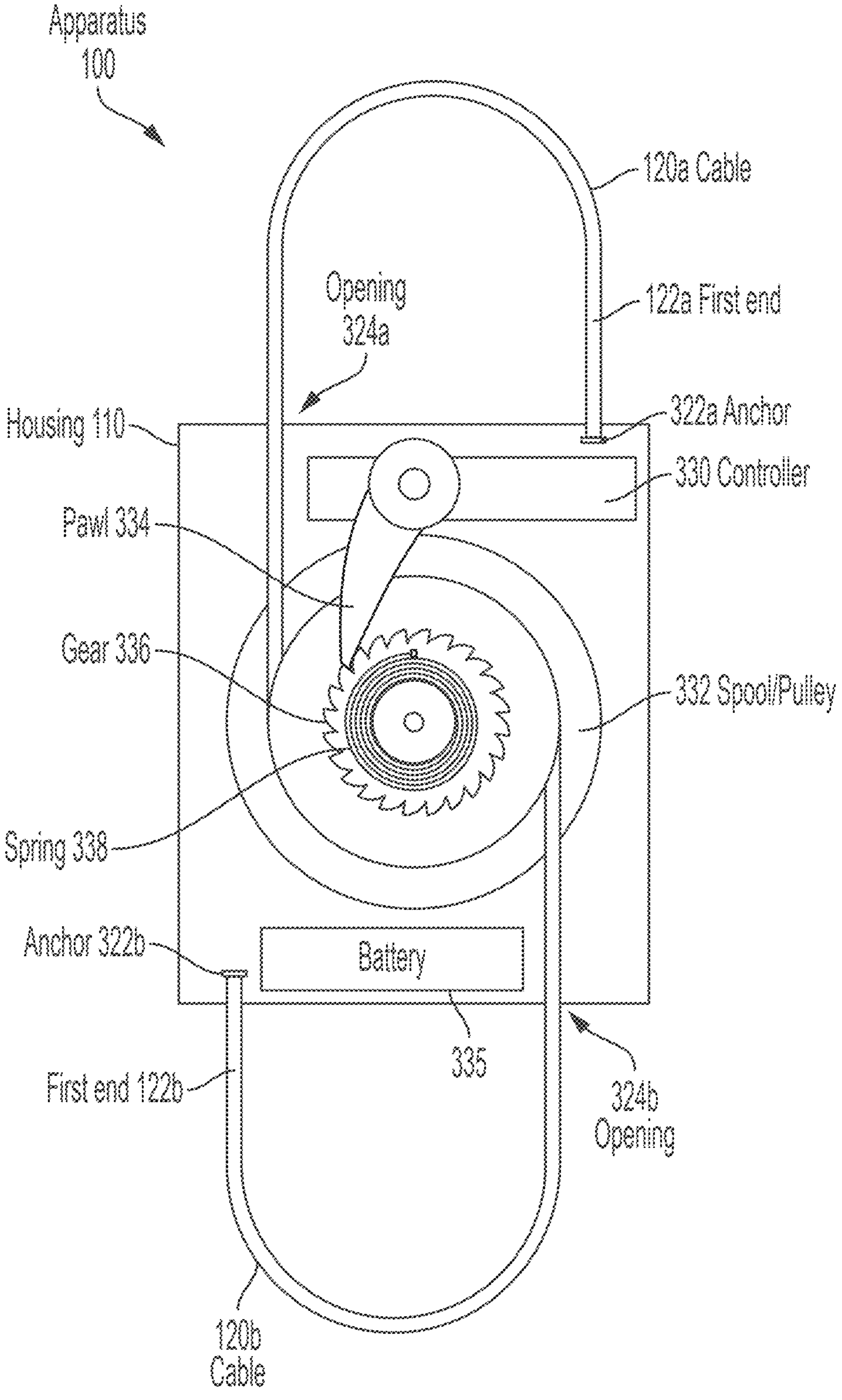
FIGS. 3A and 3B are conceptual drawings illustrating a first example electronically releasable, one-way locking mechanism, according to embodiments of the present disclosure.
Figure 3B:
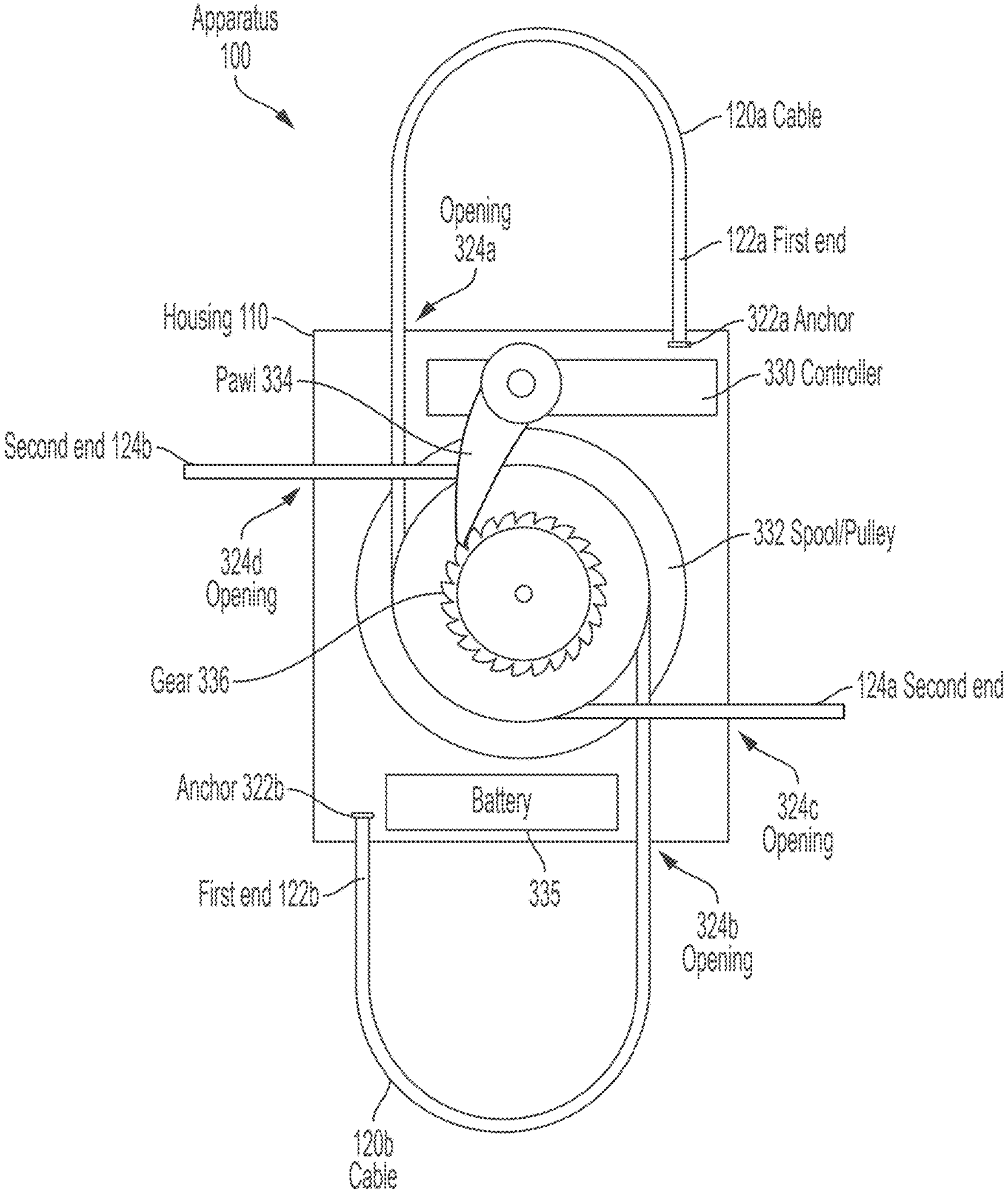
Figure 3C:
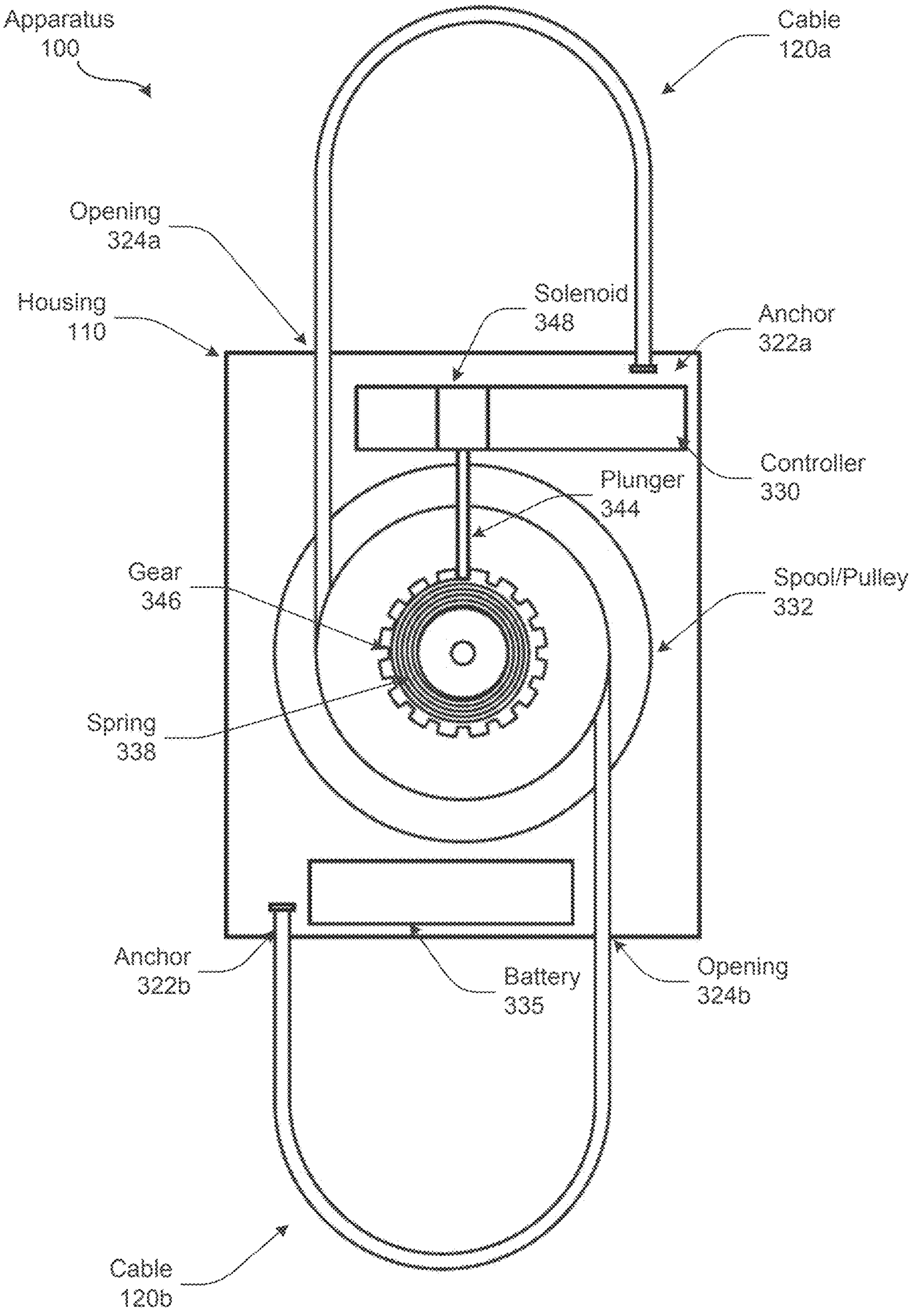
FIG. 3C is a conceptual drawing illustrating a second example electronically releasable locking mechanism, according to embodiments of the present disclosure.
Figure 6B:
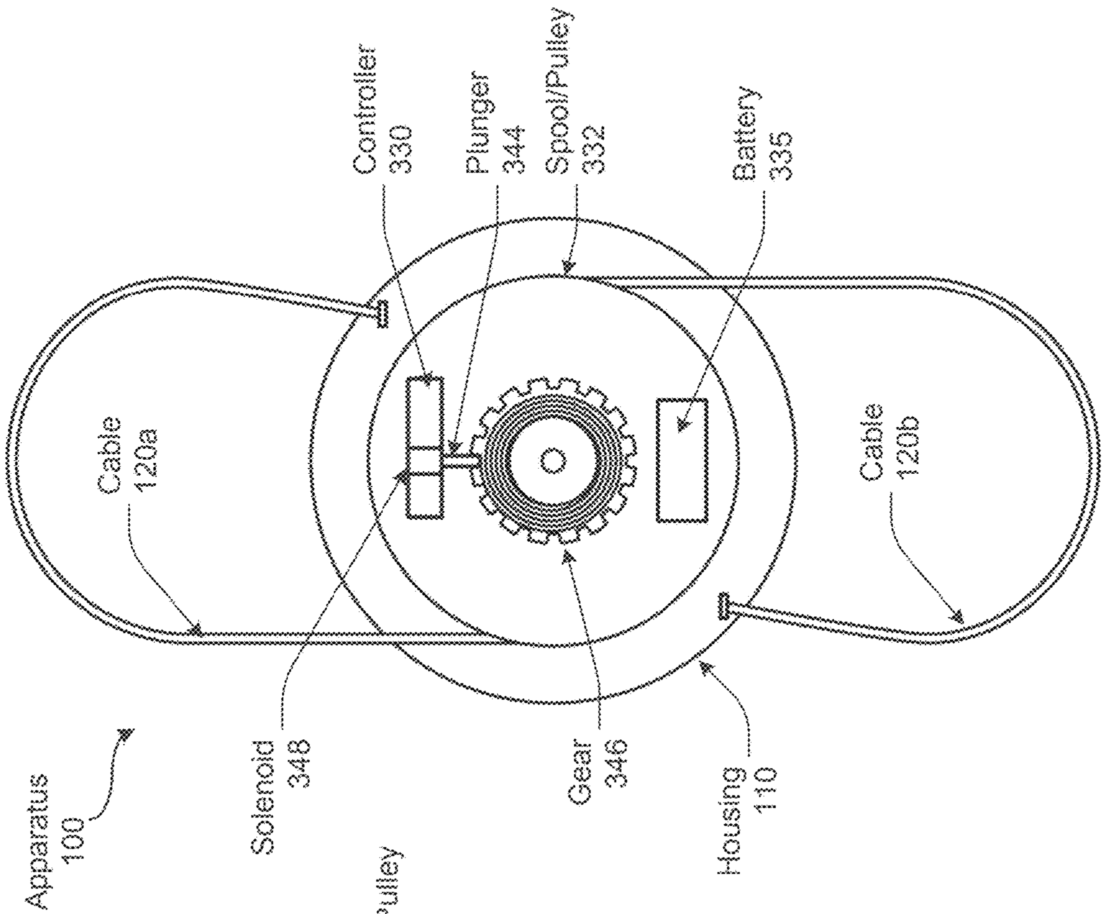
FIG. 6B is a conceptual drawing illustrating the second example electronically releasable locking mechanism in a cylindrical apparatus, according to embodiments of the present disclosure.
Figure 6A:
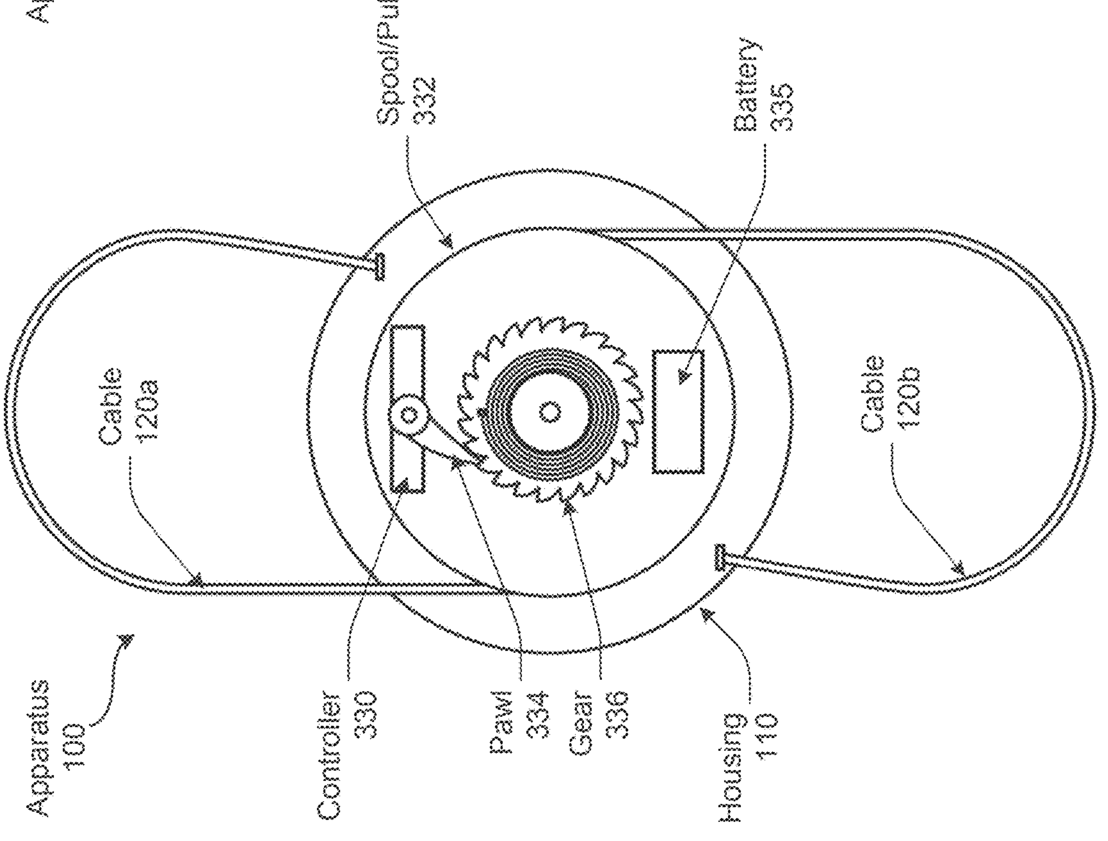
FIG. 6A is a conceptual drawing illustrating the first example electronically releasable locking mechanism in a cylindrical apparatus, according to embodiments of the present disclosure.
Figure 6C:
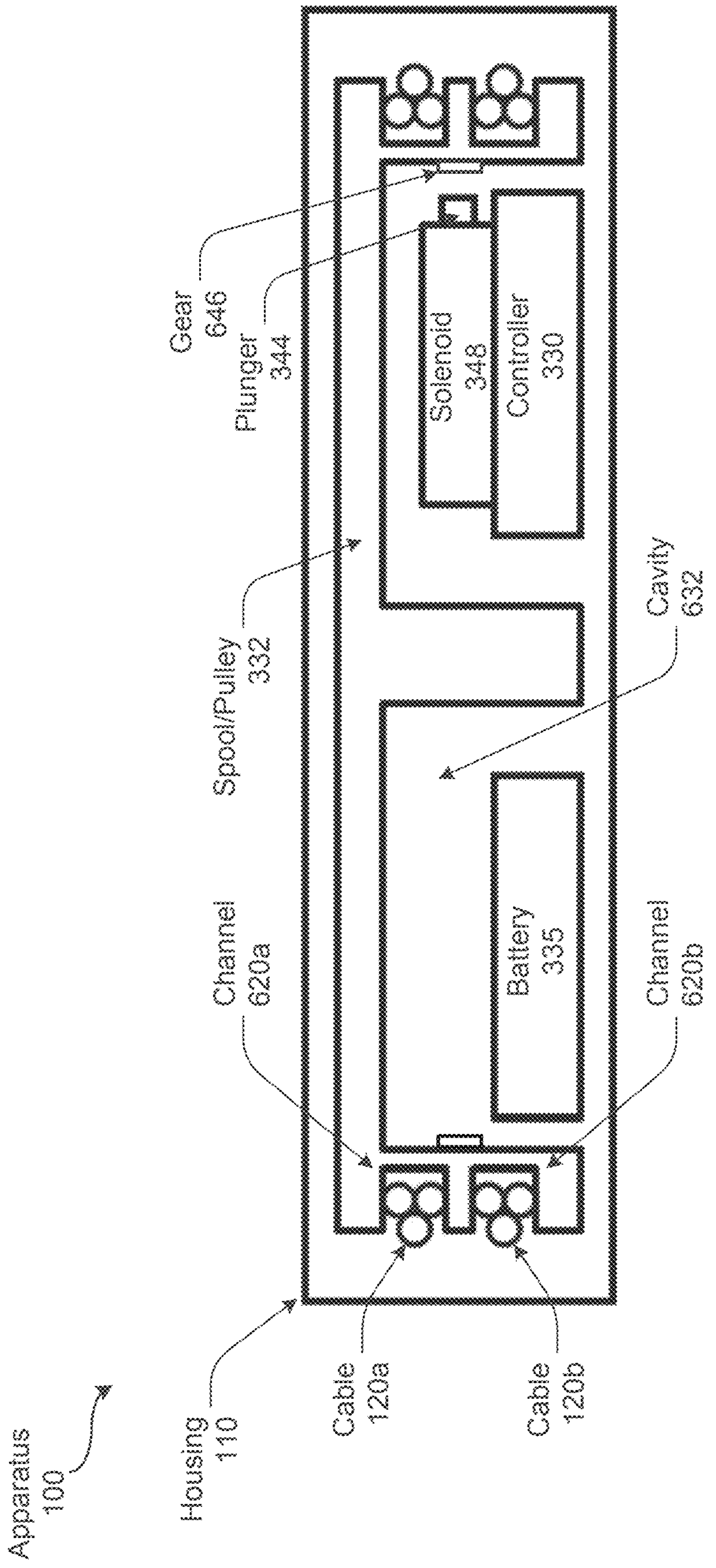
FIG. 6C is a conceptual drawing illustrating a side view of the electronically releasable security apparatus, according to embodiments of the present disclosure.

FIGS. 3A through 3C illustrate different locking mechanisms of the apparatus 100. In FIGS. 3A through 3C, the apparatus 100 has rectangular housing 110. In some implementations, the apparatus 100 may have a cylindrical housing 110, as shown in FIGS. 6A through 6C. As shown in FIG. 3A, the apparatus 100 may include a first cable 120*a* and a second cable 120*b* (collectively "cables 120"). In various implementations, the apparatus 100 may include more or fewer cables 120. The first cable 120*a* may have a first end 122*a* fixed to an anchor 322*a* of the housing 110 and a second end entering an opening 324*a* defined in the housing 110. The second cable 120*b* may have a first end 122*b* fixed to an anchor 322*b* of the housing 110 and a second end entering an opening 324*b* defined in the housing 110. In some implementations, the anchor(s) 322 may be inside the housing, and the first end of the cable(s) 120 may pass through an additional opening in the housing 110 to reach the anchor(s) 322. The second end of the cable(s) 120 may engage with a one-way locking mechanism.

In some implementations, the cable(s) 120 may be releasably attached to the anchor(s) 322. For example, the first end 122 may slot into an anchor 322 (e.g., through a keyhole opening, a narrowing slot, etc.). If the cable 120 is loose, the first end 122 may be removable from the anchor 322 (e.g., by sliding, unhooking, etc.). If the cable 120 is tight, however, such as when secured around an object, the tension in the cable 120 may prevent the first end 122 from being removed from the anchor 322. Additionally or alternatively, anchoring the apparatus 100 itself (e.g., as illustrated in FIGS. 8, 9A through 9D, and 10) may prevent the first end 122 from being removed from the anchor 322. For example, an anchor surface to which the apparatus is anchored may block an opening defined in the housing 110 through which the first end 122 is inserted into and removed from the anchor 322.

The one-way locking mechanism may include various parts configured to receive and secure the cable(s) 120, unless and until the apparatus 100 receives and/or verifies an electronic signal. In the example implementation shown in FIG. 3A, the one-way locking mechanism includes a spool or pulley 332, pawl 334, and ratchet gear 336. The spool or pulley 332 may include a channel configured to prevent movement of the cable 120 in a direction of the channel; that is, physical features of the channel may be configured to create friction and/or interlock with the cable 120 to prevent slippage. The pawl 334 and ratchet gear 336 may allow the spool or pulley 332 to rotate in a first linear direction (e.g., that allows the cable 120 to move into the housing 110 via the opening 324). The pawl 334 and ratchet gear 336 may, however, prevent the spool or pulley 332 from turning in a second rotational direction (e.g., that allows the cable 120 to be pulled outward from the opening 324). Upon release of the pawl 334, however, the spool or pulley 332 may turn freely in the second rotational direction as well, allowing the cable 120 to be pulled outward from the opening 324 and the loop created by the cable 120 to expand.

In an example operation, a cable 120 may form a loop, which may be positioned around a corner of the device 101. The loop may be shortened in various manners. In some implementations, the cable 120 may pass through the opening 324, and the second end of the cable may attach to the spool or pulley 332. A spring 338 may retract the cable 120 by exerting a torque on the spool or pulley 332 in a first rotational direction. In some implementations, the cable 120 may pass through the opening 324, wrap around at least a portion of the spool or pulley 332, and pass out of an additional opening in the housing 110. Rather than (or, in some cases, in addition to) the spring 338 retracting the cable 120, the user may pull the second, free end of the cable 120. Thus, in some implementations, the apparatus 100 may not include a spring for rotating the spool or pulley 332, relying on the user to move the cable(s) 120 into or out of the housing 110 manually. In some implementations, the apparatus 100 may have other manual and/or automatic electrical and/or mechanical features for adjusting the length of the cable(s) 120 extending from the housing 110. For example, the apparatus 100 may have a crank that a user may turn to rotate the spool or pulley 332. In some implementations, the apparatus 100 may have an electric motor for rotating the spool or pulley 332. The electric motor may be actuated by the controller 330; for example, using buttons or other input elements on the housing 110 and/or using a key or app executed on a user device. By shortening the loop in one of these manners, the device 101 may be secured by the apparatus 100 until/unless the one-way locking mechanism is released by, for example, lifting or rotating the pawl 334 to disengage it from the ratchet gear 336.

The one-way locking mechanism may be released by a controller 330 of the apparatus 100. The controller 330 may include an antenna and/or connector configured to receive an electronic signal. The controller 330 may include logic and/or software configured to verify the received signal. The controller 330 may further include a driver (e.g., an electromechanical relay or solid-state driver) configured to actuate an electromechanical part such as a solenoid or motor. Thus, upon verifying the received electronic signal, the controller 330 may actuate the electromechanical part to release the one-way locking mechanism (e.g., by lifting the pawl 334, retracting a plunger of the solenoid, etc.). A battery 335 may provide power to the controller 330 and/or electromechanical parts. The controller 330 and operation thereof are described in additional detail below with reference to FIGS. 11A and 11B.

In some implementations, the user may control the apparatus 100 (e.g., to release the cable and/or anchor mechanism) using a phone app operatively coupled to the controller 330. The app may communicate with the controller 330 via wireless (e.g., near-field communication (NFC) or Bluetooth) and/or wired connection (e.g., USB). The user may open the app to control the apparatus 100. The app may require a login or other verification (e.g., including two-factor authentication) prior to signaling the controller 330 to release any of its locking mechanisms. The app may be configured with a unique code or identifier that the controller 330 may verify prior to releasing a locking mechanism. Once a locking mechanism has been released by the controller 330, the user may loosen a cable 120 to enlarge the loop and release the secured device 101 and/or remove the apparatus 100 from the anchor surface 700 to which it was secured. In some implementations, a user may interface with the controller 330 through various means such as a dongle, keycard, remote control, personal computing device executing a desktop or web application, etc.

In some implementations, release of locking mechanisms may be based on mere proximity of a device (e.g., computing device, keycard, or dongle, etc.) to the apparatus 100 and without a separate action (e.g., opening an app) performed by the user. For example, the apparatus 100 may respond to a mobile device and/or electronic key configured to transmit a wireless electronic signal. In some implementations, the device or key may transmit a near-field signal continuously or periodically—that is, automatically and not necessarily in response to a button press—such that proximity of the key to the apparatus 100 may result in the apparatus 100 detecting the signal and releasing the cables 120 and/or the anchor mechanism in response. Similarly, by moving the device or key away from the apparatus 100, the apparatus 100 may no longer detect the signal (or determine that an amplitude of the detected signal has fallen below a threshold) and lock the cables 120 and/or the anchor mechanism in response. In some implementations, the device or key may generate and emit multiple different signals, such as a first signal that may release the cables 120 to free the device 101 and a second signal that may release an anchor mechanism that secures the apparatus 100 to another object such as a surface, pole, rack, shelf, etc. (e.g., as shown in FIGS. 8, 9A through 9D, and 10). The key or an app executing on the device may include a single button that can trigger a signal based on the type of button press (e.g., one short press, two short presses, one long press, etc.) or multiple buttons, each corresponding to a different signal. In some implementations, the signal may be a wireless (e.g., radio frequency) signal. In some implementations, the signal may be delivered to the apparatus 100 via a wired connection such as a USB port. The signal may be encoded/encrypted to prevent spoofing.

In some implementations, the phone app may receive information back from the controller 330. For example, the controller 330 may send data regarding charge of the battery 335 and the status of one or more locking mechanisms of the apparatus 100. In some implementations, the controller 330 may interface with one or more sensors of the apparatus 100 that may detect tampering (e.g., tilting, movement, vibration, shock, pressure, structural deformation, etc.). In some implementations, the controller 330 may record data regarding attempts to unlock (e.g., release locking mechanisms) of the apparatus 100 via electronic means. In some implementations, the controller 330 may be provided with a constant or periodic network connectivity that may allow the apparatus 100 to send a notification to a user device to notify the user in the event of tampering.

FIG. 3B is a conceptual drawing illustrating the second example electronically releasable locking mechanism with cables 120 that wrap partially around the spool/pulley 332 and exit the housing 110, according to embodiments of the present disclosure. In some implementations, the cables 120 may be tightened manually by a user. For example, a cable 120 may be fixed to an anchor 322 at a first end 122, while a second end 124 passes through a first opening, partially or completely around the spool/pulley 332, and out a second opening 324*c* or 324*d*. The user may pull the free, second end 124*a* or 124*b* (collectively "second ends 124") of a cable 120 to shrink the loop formed by the cable 120, thus tightening the cable around a device 101 to be secured. The rachet mechanism (e.g., the ratchet gear 336 and pawl 334) may allow the cable 120 to travel in a first linear direction (e.g., a direction of pull on the free end 124 of the cable 120) while locking the cable 120 when pulled in the other direction (e.g., in an attempt to enlarge the loop). When the controller 330 receives the appropriate signal, however, it may actuate the pawl 334 to allow movement of the cable in the second linear direction (e.g., through the opening 324), and thus enlargement of the loop in the cable 120 and release of the device 101. Although FIG. 3B illustrates manual cable tightening in the context of a rectangular housing and a ratchet and pawl configuration, manual cable tightening may be used by other implementations described herein including the solenoid and gear locking mechanism shown in FIG. 3C.

FIG. 3C is a conceptual drawing illustrating a second example electronically releasable locking mechanism, according to embodiments of the present disclosure. The locking mechanism of the apparatus 100 shown in FIG. 3C includes a solenoid 348 having a plunger 344 that can engage with teeth of a gear 346 to control rotation of the spool or pulley 332, rather than the ratchet and pawl mechanism shown in FIG. 3A. The solenoid 348 and the plunger 344 may form an electromechanical component in which the solenoid 348 is a stationary element that may have a position fixed with respect to the housing 110, and the plunger 344 is a movable element that can extend or retract from the solenoid 348 under control of the controller 330. The controller 330 may apply an actuation signal (e.g., an electric current) to the solenoid 348 to move the plunger 344 into or out of the teeth of the gear 346. When the plunger 344 is engaged with the gear 346, the spool or pulley 332 may be prevented from rotating, thus fixing the length of the cable 120 extending from the housing 110 such that the apparatus 100 cannot be removed from the device 101. When the plunger 344 is disengaged from the gear 346, the spool or pulley 332 may rotate to allow an additional length of cable 120 to be pulled from the housing 110. The additional length of cable 120 extending from the housing 110 may allow the loops of cable to be removed from the corners/protrusions of the device 101, thus allowing the device to be separated from the apparatus 100.

In some implementations, the teeth of the gear 346 may have a "shark tooth" and/or triangular shape that allows the spool/pulley 332 to turn in a first rotational direction even when the plunger 344 is engaged with the gear 346, but not a second rotational direction. Thus, the example locking mechanism shown in FIG. 3C may operate in a ratcheting manner.

Figure 3D:
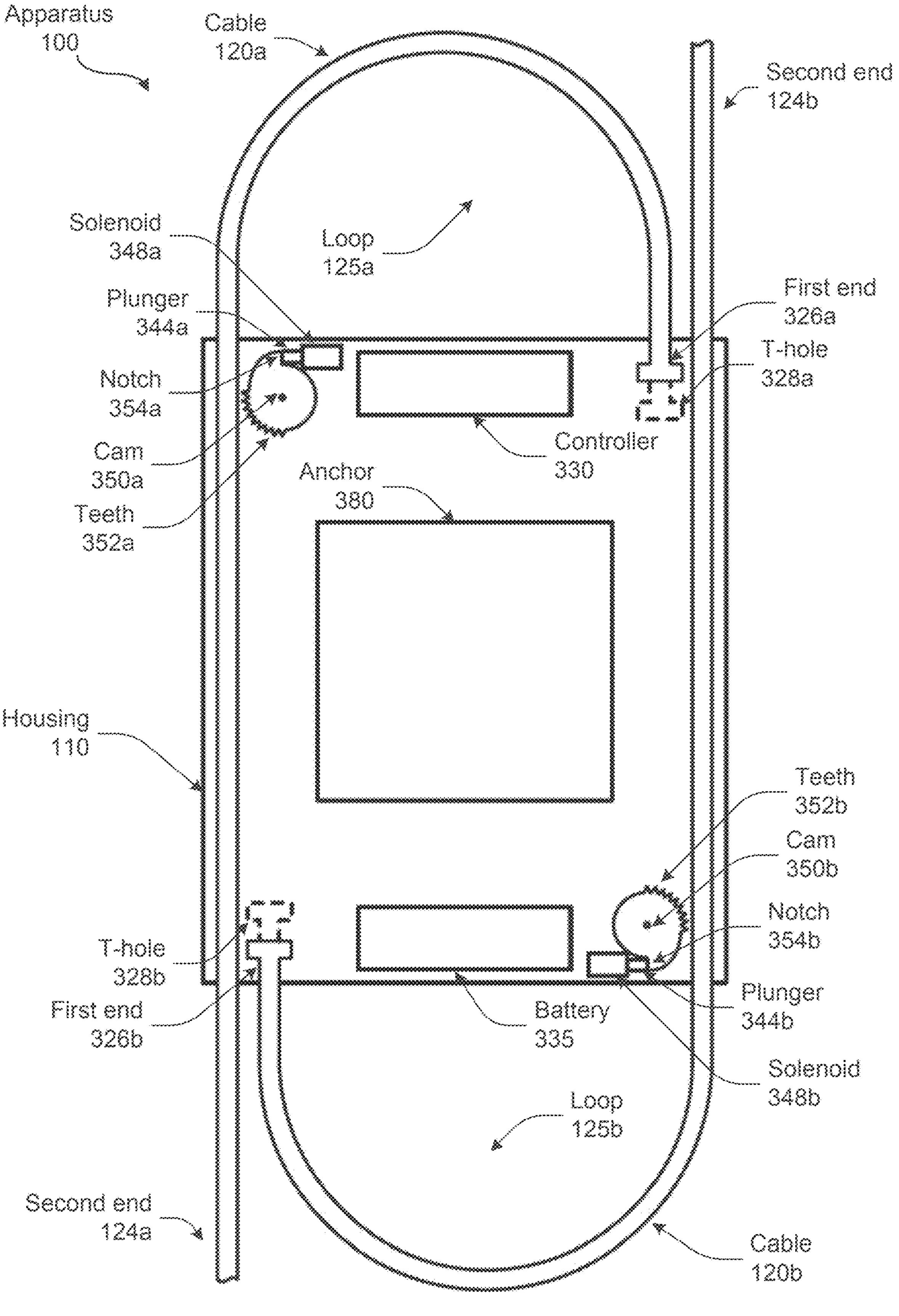
FIG. 3D is a conceptual drawing illustrating a third example electronically releasable, one-way locking mechanism, according to embodiments of the present disclosure.

FIG. 3D is a conceptual drawing illustrating a third example electronically releasable, one-way locking mechanism, according to embodiments of the present disclosure. The third example electronically releasable one-way locking mechanism may include a cam 350 (e.g., a first cam 350*a* for the first cable 120*a* and a second cam 350*b* for the second cable 120*b*). The cam 350 may be a mechanical component that rotates about an axis and has a radius that varies through at least a portion of the rotation. The cam 350 may include teeth 352*a* or 352*b* (collectively "teeth 352") or other feature that may grip the cable 120 via friction and/or mechanical interference (e.g., by "biting" into the cable 120).

The cam 350 may allow the cable 120 to move in a first linear direction (e.g., that reduces a size of a loop 125 formed by the cable). When pulled in the first linear direction (e.g., by a user pulling on the free, second end 124), the cam 350 may rotate such that the radius from the axis of rotation of the cam 350 to the point of contact with the cable 120 decreases and the cable 120 pulls freely. The cam 350 may, however, prevent movement of the cable 120 in a second linear direction opposite the first linear direction. When pulled in the second linear direction (e.g., as when someone attempts to increase the size of the loop 125), the cam 350 may rotate such that the radius to the point of contact with the cable 120 increases, causing the teeth 352 to push into the cable 120. The cam 350 and a wall of the housing 110 may form a cam buckle or cam lock mechanism that clamps the cable 120 between the cam 350 and the wall of the housing 110, with the teeth 352 and/or wall holding the cable 120 by friction and/or mechanical interference caused by the teeth 352 digging into the cable 120 (e.g., a soft sheath of the cable, between braids of a stranded cable, the stitch texture of a strap, etc.). The cam 350 may retain the cable unless released via the solenoid 348 and plunger 344 (e.g., a first solenoid 348*a* and first plunger 344*a* corresponding to a first cam 350*a*, and a second solenoid 348*b* and second plunger 344*b* corresponding to a second cam 350*b*) under control of the controller 330. As shown in FIG. 3D, the cam 350 may have a notch 354*a* or 354*b* (collectively "notches 354") (e.g., edge, tooth, pin, and/or other feature) that the plunger 344 may push to rotate the cam 350 in a direction that releases the cable 120 and allows movement in the second linear direction. The plunger 344 may apply a force in a direction substantially tangential to the circumference of the cam 350 to cause the rotation. In some implementations, the cam 350 may have a longer protrusion (e.g., a tab similar to the tab 1154 shown in FIG. 11B) that may increase the radius of the cam 350 at the point engaged by the plunger 344, thereby providing more leverage to the solenoid 348 and plunger 344 for effecting the rotation.

In some implementations, the housing 110 may define a t-shaped hole (T-hole) 328 (e.g., a first T-hole 328*a* for receiving the first cable 120*a* and a second T-hole 328*b* for receiving the second cable 120*b*). The T-hole 328 may receive a first end 326 of the cable (e.g., a first end 326*a* of the first cable 120*a* and a first end 326*b* of the second cable 120*b*). The first end 326 may be enlarged relative to the diameter or width of the rest of the cable 120. The enlarged first end 326 may fit through a wide portion of the T-hole 328 but not through a narrow portion of the T-hole 328. Thus, if the cable 120 is pulled tight (e.g., such as when the apparatus 100 is locked to prevent removal of the cable 120 and/or enlargement of the loop 125), the first end 326 may be secured in the housing 110. When the cable 120 is loose, however, the first end may be moved further into the housing 110 and out of the wide portion of the T-hole 328. This configuration may lock the first end 326 to the housing 110 when the cable 120 is locked tight but allow for the first end 326 to be released when the cable 120 is unlocked and/or loose, thus allowing the user to conveniently wrap the cable 120 around an object to be secured by the apparatus 100 and/or thread the cable 120 through the object before tightening and locking the cable 120.

In some implementations, the apparatus 100 may include an anchor mechanism 380 such as one of the fixed and/or electronically releasable anchors shown in FIGS. 7A, 7B, 8, and 9A through 9D. In some implementations, the anchor mechanism 380 may be released electronically by the controller 330. In some implementations, anchoring the apparatus 100 using the anchor mechanism 380 may further prevent removal of the first end(s) 326 through the T-hole(s) 328; for example, by causing the wide portion of the T-hole 328 to be covered or otherwise obstructed by a surface to which the apparatus 100 is anchored.

Figure 4B:
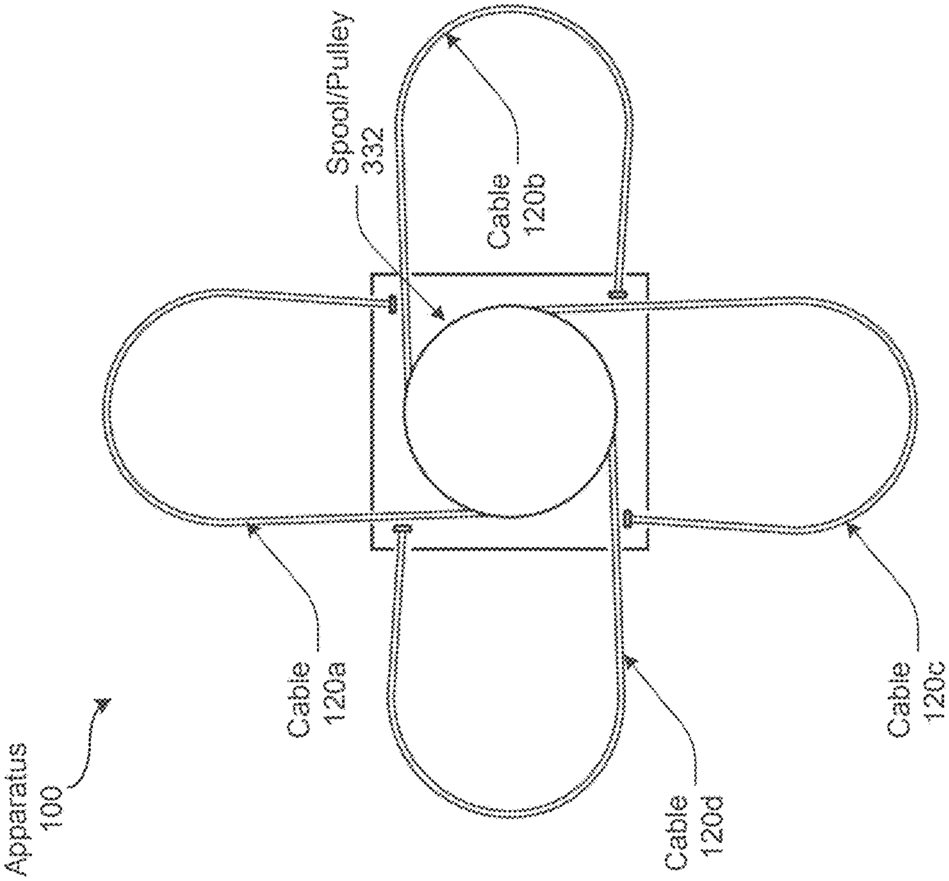
FIGS. 4A and 4B are conceptual drawings illustrating various example cable configurations of an electronically releasable locking mechanism, according to embodiments of the present disclosure.
Figure 4A:
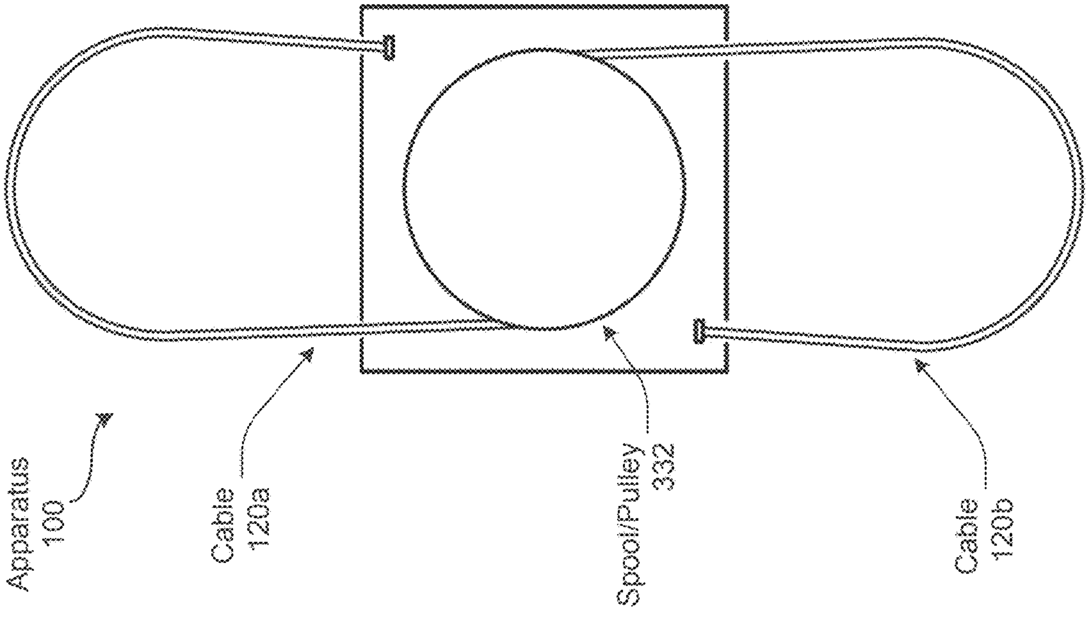

FIGS. 4A and 4B are conceptual drawings illustrating various example cable configurations of an electronically releasable locking mechanism, according to embodiments of the present disclosure. As shown in FIG. 4A, the apparatus 100 may have a first cable 120*a* and a second cable 120*b*. The cables 120 may wind around the spool/pulley 332. The cables 120 may wind around the spool/pulley 332 together (e.g., such that they overlap) or the spool/pulley 332 may have separate channels into which each cable 120 winds. In some implementations, the cables 120 may be anchored to the spool/pulley 332. In some implementations, the cables 120 may wind around a portion of the spool/pulley 332 and exit the housing 110 such that the user can pull the free end of a cable 120 to adjust the length forming the loop. In some implementations, a cable 120 may wind around less than a full circumference of the spool/pulley 332 (e.g., ¼, ½, or ¾ of the way around, etc.). In some implementations, a cable 120 may wind around more than a full circumference of the spool/pulley 332 (e.g., once around, 1½ times around, or twice around, etc.).

As shown in FIG. 4B, the apparatus 100 may have a first cable 120*a*, a second cable 120*b*, a third cable 120*c*, and a fourth cable 120*d*. Similar to the example shown in FIG. 4A, the cables 120 may wind around the spool/pulley 332 together (e.g., such that they overlap) and/or the spool/pulley 332 may have separate channels into which one or more cables 120 may wind. The cables 120 may be anchored to the spool/pulley 332 or may wind around a portion of the spool/pulley 332 and exit the housing 110 such that the user can pull the free end of a cable 120 to adjust the length forming the loop.

Figure 5B:
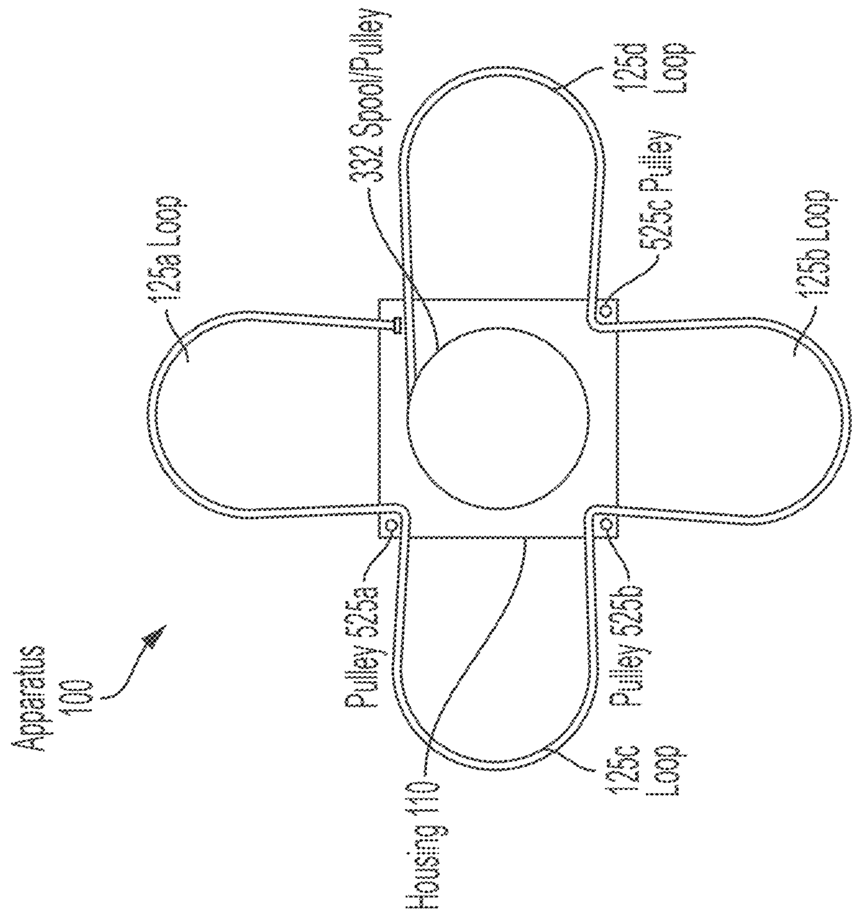
FIGS. 5A and 5B are conceptual drawings illustrating various example cable configurations of an electronically releasable locking mechanism, according to embodiments of the present disclosure.
Figure 5A:
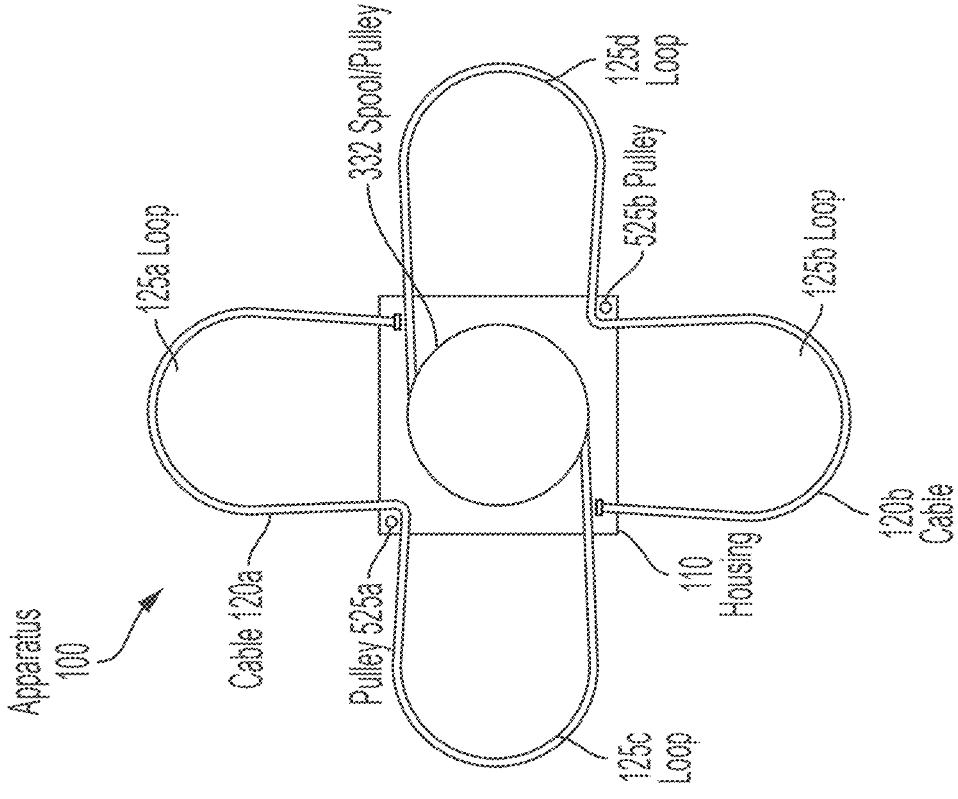

FIGS. 5A and 5B are conceptual drawings illustrating various example cable configurations of an electronically releasable locking mechanism, according to embodiments of the present disclosure. In the examples shown in FIGS. 5A and 5B, one cable 120 may form more than one loop. FIG. 5A shows a first portion of the first cable 120*a* forming a first loop 125*a* and a second portion of the first cable forming a second loop 125*b*. Between the first loop and the second loop, the first cable 120*a* passes across a first pulley 525*a* mounted to the housing 110 (and likewise for the second cable 120*b* passing across a second pulley 525*b*). The pulley(s) 525 may be mounted to and/or within the housing 110 to prevent the cable 120 from being removed from the pulley 525. A cable 120 may enter the housing through an opening, pass across at least a portion of a pulley 525, and exit the housing through another opening. FIG. 5B shows a cable 120 forming a first loop 125*a*, a second loop 125*b*, a third loop 125*c*, and a fourth loop 125*d* by passing across a first pulley 525*a*, a second pulley 525*b*, and a third pulley 525*c* within the housing 110.

FIGS. 6A and 6B illustrate examples of the apparatus 100 having a cylindrical housing 110, according to embodiments of the present disclosure. The apparatus 100 include a first cable 120*a* and a second cable 120*b* winding around a spool/pulley 332. In some implementations, the apparatus 100 may have more cables 120. Both examples of the apparatus 100 include a controller 330 and a battery 335; however, in the examples shown in FIGS. 6A and 6B, the controller 330 and/or the battery 335 reside in a cavity formed in the spool/pulley 332. In FIG. 6A, rotation of the spool/pulley 332 may be locked using the pawl 334 and the ratchet gear 336. In FIG. 6B, rotation of the spool/pulley 332 may be locked using the solenoid 348, plunger 344, and the gear 346.

FIG. 6C is a conceptual drawing illustrating a side view of the electronically releasable security apparatus 100, according to embodiments of the present disclosure. The first cable 120*a* and second cable 120*b* may wind around the spool/pulley 332. As shown in FIG. 6C, the spool/pulley 332 has two channels 620, with the first channel 620*a* receiving the first cable 120*a* and the second channel 620*b* receiving the second cable 120*b*. In some implementations, the spool/pulley 332 may have only a single channel 620 or more than two channels 620. A channel 620 may receive a single cable 120 or multiple cables 120.

A channel 620 may be configured with a surface treatment and/or surface features that prevent movement of a cable 120 along a length of a cable. In this manner, locking of the spool/pulley 332 (e.g., preventing rotation of the spool/pulley 332) will prevent the cable 120 from being pulled out of and/or through the housing 110. For example, if the cable 120 is made of a chain or twisted and/or braided strands of wire, the channel 620 may have structural features such as a pattern of surface protrusions and/or indentations that mate with the links, twists, and/or braids of the cable 120. In some implementations, the channel 620 may be formed in a V shape such that engagement between the cable 120 and the structural features of the channel 620 increases the harder the cable 120 is pulled. In another example, the cable 120 may have a polymer shield that has a high coefficient of static and/or kinetic friction with a material of the channel 620 (e.g., a surface treatment, layer, and/or the material of the spool/pulley 332 itself). In some implementations, the channel 620 may grip the cable 120 using a combination of structural features and friction.

The spool/pulley 332 may define a cavity 632 that may fit the battery 335 and/or the controller 330, which may be attached to the housing 110 and/or other part of the apparatus 100. The apparatus 100 may include a ratchet and pawl mechanism and/or a solenoid and plunger mechanism for locking rotation of the spool/pulley 332. The pulley 332 may define the teeth of a gear 646 and/or be mechanically attached to a separate gear 646. In contrast with the gear 346 shown in FIG. 3B, the gear 646 shown in FIG. 6C includes teeth facing inwards (e.g., toward an axis of rotation of the spool/pulley 332) rather than facing outwards as shown in FIG. 3B. Thus, the solenoid 348 may push the plunger 344 outward to engage with the teeth of the gear 646 and lock rotation of the spool/pulley 332, and may withdraw the plunger 344 inward to release the spool/pulley 332.

In certain embodiments, the inventive concepts described for the electronically releasable security apparatus 100 also apply to other ratchet mechanisms and electromechanical devices such as those including a ratchet gear 336, which may be engaged with an electronically controlled pawl 334, or linear rack with teeth engaged by an electronically controlled plunger 344, in a manner similar to that described in the implementations illustrated in FIGS. 3A through 3D and 6A through 6C. For purposes of illustration and not limitation, such a device might also be described as a wirelessly releasable ratchet mechanism, a wirelessly releasable round gear ratchet, a wirelessly releasable linear ratchet, an electronically or wirelessly releasable rope ratchet, cable lock, cam cleat, or cam buckle (e.g., such as the cam buckle formed by the cams 350 or 1150 and rollers 1130 shown in FIGS. 11A through 11D). Such a device may comprise a housing 110, a ratchet (e.g., having a pawl 334 and ratchet gear 336) mounted within the housing 110 and operable to move between a latched position and an unlatched position, a release mechanism mounted within the housing and operatively connected to the ratchet for unlatching from a primary latched positions, an electronic circuit (e.g., the controller 330) capable of activating the release mechanism so as to move the ratchet into an unlatched position, and a wireless radio to communicate authenticated commands or controls to/from a user device (e.g., such as one of the devices 1210 shown in FIG. 12B).

Figure 7A:
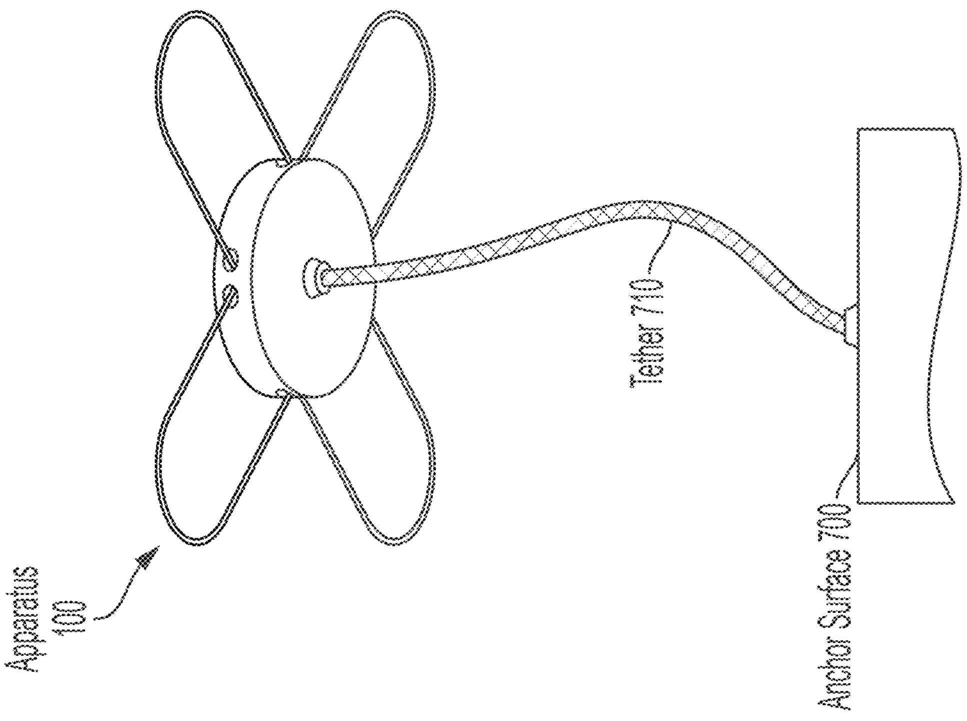
FIG. 7A is a conceptual drawing illustrating the security apparatus having tether for securing the apparatus to an anchor, according to embodiments of the present disclosure.
Figure 7B:
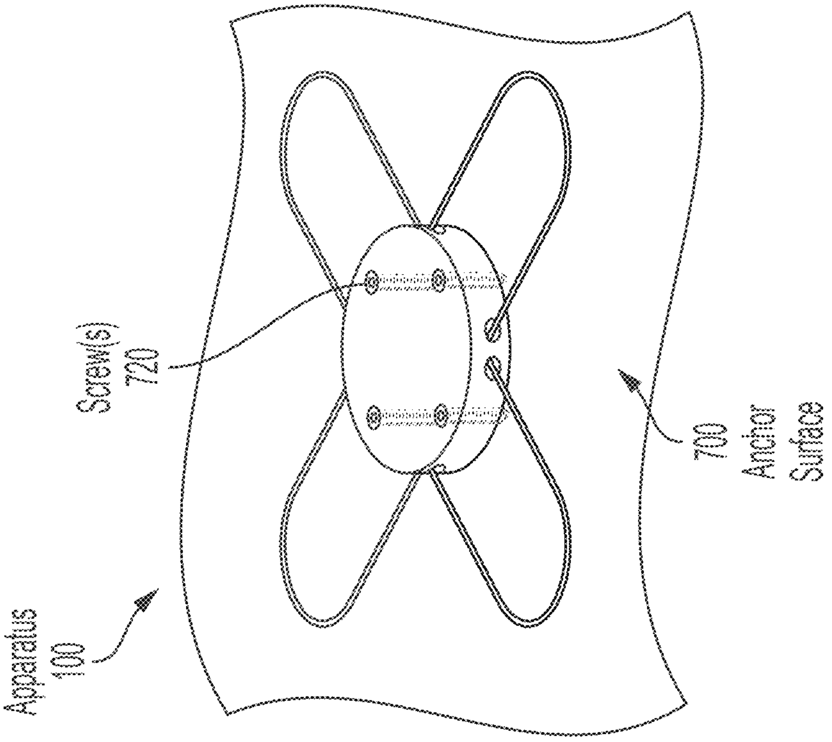
FIG. 7B is a conceptual drawing illustrating the security apparatus secured to a surface with tamper-proof screws, according to embodiments of the present disclosure.
Figure 8:
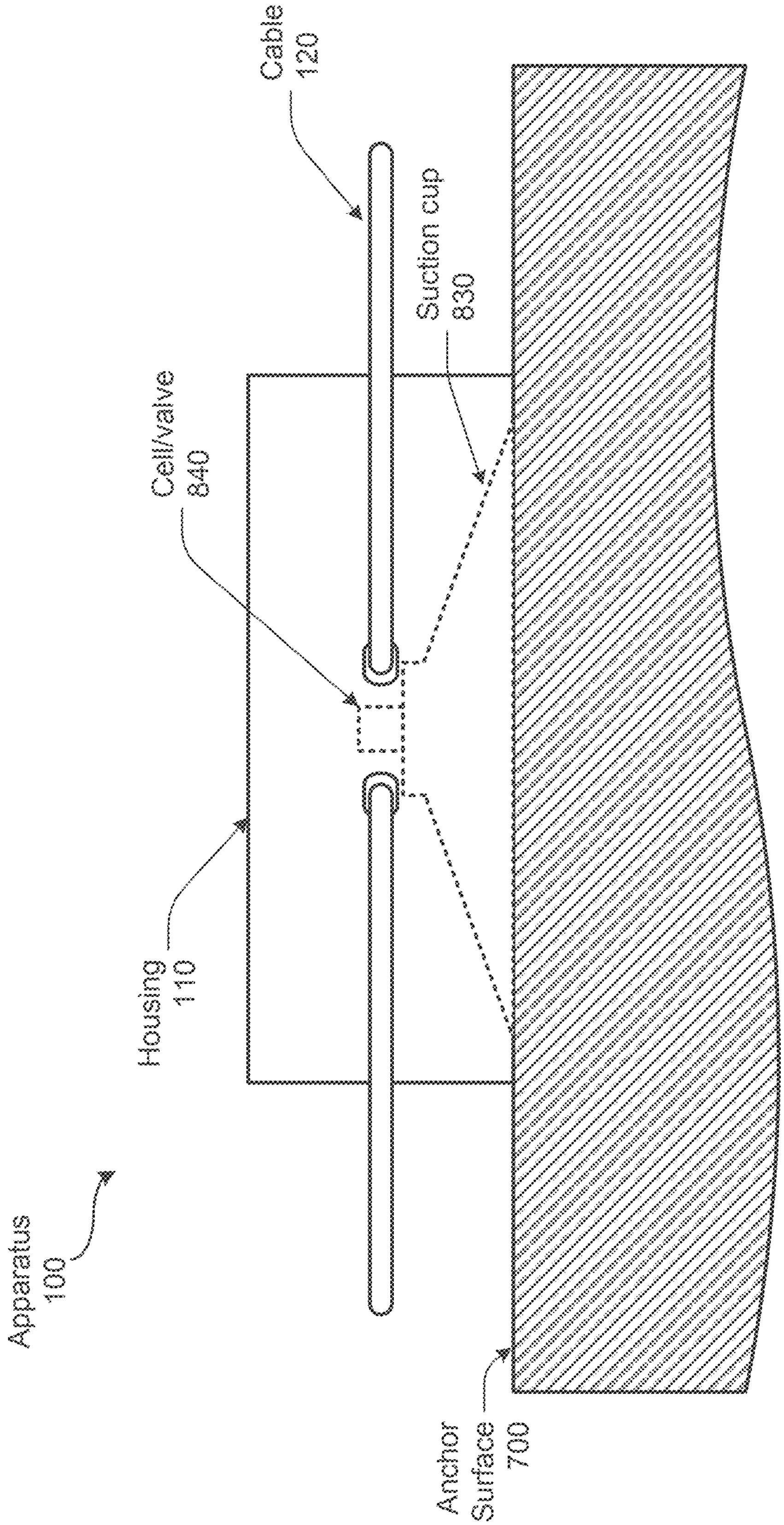
FIG. 8 is a conceptual drawing illustrating the security apparatus having an electronically releasable suction cup for securing the apparatus to a surface, according to embodiments of the present disclosure.

FIGS. 7A, 7B, and 8 show examples of features for anchoring the apparatus 100 to an anchor surface 700 such as a desk, shelf, rack, etc. Anchoring the apparatus 100 to the anchor surface 700 may provide added security for a device 101 retained by the apparatus 100. An apparatus 100 so anchored may be useful for securing devices 101 for retail display, for use in an academic, public, and/or commercial setting where device 101 may be provided for use by various people. In some cases, apparatus 100 may be made available for users to use to secure their own personal devices 101 and allow them to leave the immediate vicinity without risking loss or theft of their device.

FIG. 7A is a conceptual drawing illustrating the apparatus 100 having tether 710 for securing the apparatus to an anchor surface 700, according to embodiments of the present disclosure. The tether 710 may be similar to the cables 120 in that it may be constructed from a material with high strength and high resistance to cutting such as steel, Kevlar, etc. The tether 710 may be thicker in diameter relative to the cables 120 or the same diameter. The tether 710 may take the form of a stranded or braided cable, chain, or solid length of flexible or rigid material.

FIG. 7B is a conceptual drawing illustrating the apparatus 100 secured to an anchor surface 700 with anti-theft, tamper-proof, and/or or tamper-resistant screws 720, according to embodiments of the present disclosure. The screws 720 may have heads configured for one way use (e.g., tightening but not loosening/releasing) and/or may have a head configured to accept a specialized tool, for example and without limitation, spanner drilled, spanner slotted, multi-node security, one way, tri-wing, fluted socket, hexagon internal or Torx with tamper-proof pin, etc.

FIG. 8 is a conceptual drawing illustrating the apparatus 100 having an electronically releasable suction cup 830 for securing the apparatus 100 to an anchor surface 700, according to embodiments of the present disclosure. The electronically releasable suction cup 830 may be used to secure apparatus 100 to flat surfaces or substantially flat surfaces such as the anchor surface 700 shown in FIG. 8. The anchor surface 700 need not be a specially prepared or treated surface, and can simply be a surface of a desk, counter, bench, shelf, floor, window, wall, appliance, or even another apparatus 100. The suction cup 830 may be a part of an assembly that includes the suction cup 830 as well as a gas generating cell and/or valve 840. The gas generating cell and/or valve 840 may release the suction cup 830 from the anchor surface 700 by allowing gas (e.g., from the cell and/or the surrounding air) to enter the suction cup 830 and break a vacuum formed between the suction cup 830 and the anchor surface 700. The gas generating cell and/or valve 840 may be small (e.g., button-sized) such that it may be inserted into a center head of the suction cup 830, such that an ejection port of the gas generating cell is in fluid (gas or liquid) communication with the evacuated "headspace" of the suction cup 830.

In some implementations, a gas generating cell may be connected to an electronic circuit comprised of a resistor and a switch. The controller 330 may actuate the switch to take the resistor in and out of contact with the positive and negative ends of the gas generating cell. The resistor may be selected with a resistance value to cause the gas generating cell to eject sufficient gas, such as hydrogen, to alleviate the vacuum in the headspace of the suction cup 830, thereby releasing the suction cup 830, along with the rest of the apparatus 100 and any device 101 secured thereto, from the anchor surface 700. The controller 330 may keep the switch open (e.g., breaking the circuit) until such time as it receives and verifies an electronic signal indicating that the apparatus 100 is to be released from the anchor surface. When the controller 330 receives and verifies the electronic signal, the controller 330 may close the circuit between the resistor and the gas generating cell, causing gas to enter the suction cup 830 and the suction cup 830 to release from the anchor surface 700.

In some implementations, a valve may open a passage between the headspace of the suction cup 830 and the air inside and/or surrounding the housing 110. The controller 330 may actuate the valve (e.g., using a solenoid or other electromechanical means). The controller 330 may keep the valve closed (e.g., blocking the passage of gas into or out of the suction cup 830) until such time as it receives and verifies an electronic signal indicating that the apparatus 100 is to be released from the anchor surface. When the controller 330 receives and verifies the electronic signal, the controller 330 may open the valve, causing air to enter the suction cup 830 and the suction cup 830 to release from the anchor surface 700. In some implementations, the valve may be a one-way valve configured to allow air flow out of the suction cup 830 (e.g., to form a vacuum when the suction cup 830 is pressed against the anchor surface 700), but not into the suction cup 830 until opened by the controller 330.

As shown in FIG. 8, the apparatus 100 may be secured to an anchor surface 700 using the suction cup 830. The housing 110 may device a bottom within which the suction cup 830 may be secured. The arrangement is such that the suction cup 830 may releasably secure the apparatus 100 to the anchor surface 700. When desired, the suction cup 830 may release from the anchor surface 700, thereby enabling the removal of the apparatus 100 from the anchor surface 700. Although one suction cup 830 is shown in FIG. 8, in some implementations the apparatus 100 may have two or more suction cups 830 (e.g., for larger apparatus 100 and/or devices 101).

The suction cup 830 may be made of an elastic and/or flexible material. The suction cup 830 may include a flat or curved rim that matches the flat or curved anchor surface 700 to which it attaches. The suction cup material can also be made of multiple materials, such as a composite designed for desirable features, such as gas permeability for low air leakage, high tensile strength for tamper or cut resistance, and high melt temperature for heat resistance, to name a few. The base of the suction cup illustrated in FIG. 8 is shown to be flat, but a curved wall can be provided as well. When the center head of the suction cup 830 is pressed against a flat, non-porous anchor surface 700, a volume of a cavity or space ("headspace") between the base of the suction cup 830 and the anchor surface 700 is reduced, which causes fluid (e.g., air) between the base of the suction cup 830 and the anchor surface 700 to be expelled past the rim of the base of the suction cup 830. The cavity, which develops between the suction cup 830 and the anchor surface 700, has little to no air or water in it because most of the fluid has already been forced out of the inside of the base of the suction cup 830 by, for example, an individual's physically applied force or the weight of the apparatus 100 and/or device 101, which reduces the pressure within the suction cup 830.

A pressure difference between the atmosphere on the outside of the suction cup 830 and the low-pressure cavity on the inside of the suction cup 830 maintains the base of the suction cup 830 adhered to the anchor surface 700. The force exerted by this vacuum is conventionally calculated as Fv=AP where Fv is the vacuum force, A is the area of the surface covered by the cup (Pi times radius squared or A=πr2, for a circular suction cup 830), and P is the pressure outside the cup (for example, atmospheric pressure for an air suction cup 830 at sea level). The electronically releasable suction cup 830 can be designed for different use cases by adjusting the various design parameters herein described, such as the radius of suction cup 830, the materials comprising suction cup 830 or its component parts like the center head, base, and/or rim, to name a few. Also, one or more electronically releasable suction cup assemblies can be integrated into customized fastening systems for different use cases.

As shown in FIG. 8, the suction cup 830 may be recessed within the housing 110 such that the suction cup 830, when anchored to the anchor surface 700, is surrounded by the housing 110 in a manner that prevents tampering with the 830; for example, attempts to break the vacuum using probe, blade, etc. In some implementations, the suction cup 830 and/or the housing may include a non-slip and/or non-skid layer that prevents sliding of the apparatus 100 along the anchor surface 700 (e.g., to an edge or other feature where the vacuum can be broken). The non-skid material may have a high coefficient of friction that resists lateral sliding of an apparatus 100 along the anchor surface 700. While the evacuated suction cup 830 provides a resistive force to lifting the apparatus 100 from the anchor surface 700, the non-skid material provides a resistive force of friction between the bottom of the apparatus 100 and the anchor surface 700 upon which the apparatus 100 is placed. The force of friction Ff is governed by the model Ff equals μ times Fn where μ is the coefficient of friction, an empirical property of the contacting materials comprising the non-skid material and the anchor surface 700, and Fn is the normal force exerted by the exterior bottom wall of the apparatus 100, directed perpendicular to the anchor surface 700. For a flat, non-sloped anchor surface 700, the normal force is conventionally expressed as Fn=MG where M is the mass of the apparatus 100 and G is gravitational acceleration which on Earth is 9.8 meters per second-squared. This force Fn is applied as a vector that is perpendicular to the anchor surface 700. In embodiments of the present disclosure, the normal force Fn is augmented by an additive force also applied to the anchor surface 700 as a perpendicular vector, the vacuum force Fv. Thus, the force of friction becomes a function of the force of gravity plus the force of the vacuum applied by the suction cup 830. Accordingly, the forces applied by the apparatus 100 can be described as the force of friction Ff=μ(Fn+Fv)=μ(MG+AP)=μ(MG+πr2P). Thus, the force of friction is a design parameter as a function of the coefficient of friction between the non-skid material and the anchor surface 700, the mass of the apparatus 100 and/or device 101, and the radius of the suction cup 830. By selecting an appropriate suction cup 830 and non-skid materials for a particular apparatus 100, the apparatus 100 can be secured to an anchor surface 700 in such a way so as to resist lifting and sliding of the apparatus 100 from its original position on the anchor surface 700.

Various other implementations of active anchor mechanisms are possible. In some implementations, an anchor mechanism may include an expansion bolt configured to insert into a hole pre-drilled into the anchor surface 700. This configuration may facilitate anchoring by electromechanical means with minimal preparation of the anchor surface 700. The expansion bolt may have an expanded state and a retracted state. In the expanded state, the expansion bolt may have a first diameter (e.g., in a direction perpendicular to an axis of the bolt and/or the hole in the anchor surface). In the retracted state, the expansion bolt may have a second diameter narrower than the first. In the retracted state, the expansion bolt may be easily inserted into or removed from the hole. In the expanded state, the expansion bolt may be secured in the hole; for example, by a combination of friction and/or mechanical interference. In some implementations, the expansion bolt may include one or more surface treatments such as protrusions, textures, and/or coatings that increase mechanical interference and/or friction with a wall of the hole. For example, the circumference of the expansion bolt may have knurling, teeth, rings, bumps, and/or other edges that may bite into the wall of the hole. Additionally or alternatively, the circumference of the bolt may be treated with a high-friction material such as a rubber, polymer, and/or adhesive that increases the coefficient of friction with the wall of the hole. In some cases, the wall of the hole itself may have one or more similar surface treatments. In some cases, the expansion bolt and the wall of the hole may define complementary (e.g., interlocking) features.

In some implementations, the apparatus 100 may be configured such that attempting to pull the apparatus 100 away from the anchor surface 700 when the expansion bolt is in the expanded state causes the expansion bolt to expand further, increasing the holding strength of the anchor mechanism. For example, the expansion bolt may include a wedge or ramp mechanism that translates a linear movement (e.g., out of the hole) of a first element to a lateral (e.g., into the wall(s) of the hole) of a second element. The first element may be, for example, a tapered mandrel (e.g., having a conical and/or flared shape) coupled to a bolt. The second element may be, for example, an expansion wedge or wedges coupled to a collar surrounding the bolt. Pulling the bolt out of the hole (e.g., moving the bolt relative to the collar with respect to the axis of the expansion bolt) may move the tapered mandrel relative to the expansion wedges, thereby pushing the expansion wedges outward toward and/or into the wall of the hole. In some implementations, the bolt may be fixed to the housing 110 while the collar is actuated by the controller 330. If an attempt is made to remove the apparatus 100 from the anchor surface 700 while the expansion bolt is in the expanded state, the movement of the bolt may increase the lateral force pushing the expansion wedges into the wall of the hole. To release the expansion bolt, the controller 330 may, via electromechanical means such as a solenoid and/or motor and subject to verifying a received wireless electronic signal, cause the collar to move relative to the bolt with respect to the axis of the expansion bolt to transition the expansion bolt to the retracted state, thereby releasing the expansion bolt from the hole and thus the apparatus 100 from the anchor surface.

In some implementations, the apparatus 100 may include manual elements such as a button, lever, dial, screw, etc. to facilitate manual release of the expansion bolt. The manual element(s) may be locked by the controller 330 subject to verifying a wireless electronic signal and/or blocked by an object secured to the apparatus 100 (e.g., a device 101 secured by one or more cables 120). Thus, apparatus 100 may remain locked in the hole of the anchor surface 700 with the expansion bolt in the expanded state until and unless the user provides the correct wireless electronic signal.

In some implementations, the electronically releasable mechanism(s) of the apparatus 100 may include electrically or electronically controlled barbs that are mechanically deployed from the base of an apparatus 100 to affect the coefficient of friction that resists lateral sliding of apparatus 100 along the anchor surface 700. In a first state, the controller 330 may cause the barbs to deploy from the base of an apparatus 100, thereby increasing friction to resist lateral sliding of an apparatus 100 along the anchor surface 700. In a second state, the controller 330 may cause the barbs to retract from the base of an apparatus 100, thereby reducing friction to permit lateral sliding of an apparatus 100 along the anchor surface 700. For purposes of illustration and not limitation, electronically releasable barbs enable the apparatus 100 to grip or release anchor surfaces 700. For an anchor surface 700 comprised of a porous or soft material like fabric, the electronically controlled barbs increase the adhesion of the apparatus 100 to the anchor surface 700.

In another embodiment, the electronically controllable barbs are designed to deploy at a variety of angles that affect the direction of incidence to the anchor surface 700. These angles and direction of incidence are designed to optimally affect the force of friction or level of grip along the 360 degrees of potential movement as the apparatus 100 slides across the anchor surface 700.

In another embodiment, the electronically controllable barbs are comprised of fibers whose stiffness varies along a continuity of values that are electronically controllable. Such fibers are comprised of materials whose measure of elasticity and stiffness varies based on externally applied conditions, causing the Young's modulus of the material to vary within a defined range. In both embodiments, the apparatus 100 receives wireless electronic signals that control the elasticity or stiffness of the barbs.

In some implementations, the apparatus 100 may be inserted, via a lateral movement, into a secure slot, shelf, cubby, nook, etc., having an anchor surface 700 to which the barbs may engage. When the electronically controlled barbs are deployed, they may secure the apparatus 100 within the slot by resisting or preventing lateral movement of the apparatus 100 back out of the slot unless and until the barbs are retracted (e.g., upon verification of the appropriate wireless electronic signal). In addition, the apparatus 100 may be configured with a cavity for receiving one or more valuable objects. Inserting the apparatus 100 into the slot may prevent removal of the valuables from the cavity by, for example, blocking access to mechanism securing a cable 120 or strap 1120, obstructing an opening of the cavity (e.g., by enclosing the apparatus 100 on one or more sides in addition to the anchor surface 700), preventing a lid covering the cavity from being opened, etc. When the barbs are retracted, the authorized user is able to slide the object and its security apparatus 100 into and out of the slot. When the barbs are deployed, the high friction interface between the surface(s) of the security apparatus 100 and the surface(s) 700 of the slot resist the insertion or removal of the object. In another embodiment, the electronically deployable barbs are integrated in one or more surface 700 of the secure slot, while in yet another embodiment, the barbs or similar features like interlocking hooks and loops are integrated in the anchor surface(s) 700 of the secure slot and one or more outer surfaces of the housing 110.

In some implementations, the barbs may resist or prevent upward movement (e.g., away from the anchor surface 700 in a direction perpendicular to the anchor surface 700) of the apparatus 100 when deployed and allow upward movement of the apparatus 100 when retracted. The barbs may act in a manner similar or analogous to the hooks of hook-and-loop tape. Various means may be used to deploy and/or retract the barbs. In a first example implementation, the barbs may include a shape-memory alloy or polymer. A shape-memory alloy such as ninitol, CoNiAl, NiMnGa, etc., may respond to an electric current or field by changing shape or volume. Ninitol, for example, is an alloy of nickel and titanium which may be deformed (e.g., curved into a hook shape) at a first temperature and recover its original shape (e.g., relaxed into a straight or only slightly curved shape) when heated; for example, by an electric current. When the shape-memory alloy hook is heated, it may retract by uncurling, thereby releasing it from loops or other features on the opposing surface (e.g., the anchor surface 700 and/or a material adhered to the anchor surface). Other shapes may be used such as protrusions with an enlarged end (e.g., like a mushroom with a cap) where the enlarged end can be enlarged or shrunk based on an electric signal.

In a second example implementation, the barbs may be formed from a hollow, flexible material. The barbs may be formed into a hook shape. Application of pressure inside the hollowed-out portion of a barb may cause it to retract by uncurling, thereby releasing it from loops or other features on the opposing surface. Pressure may be applied by forcing a fluid (e.g., gas or liquid) into the hollowed-out portion; for example, using a piston. Many such barbs may be actuated in unison in this manner. In another example, flexible hollow hooks may be retracted (e.g., uncurled and/or straightened) by inserting a rigid member (e.g., a rod or needle) into the curved portion of the barb. Thus, a "bed-of-nails" array of rods may be inserted into a complementary array of hollow hooks to release many hooks based on a single actuation.

In a third example implementation, rigid barbs may be rotated and/or shifted laterally to catch or release a porous, fibrous, or otherwise textured material on the opposing surface. For example, barbs may be arranged in columns, rows, patches, or other types of sections in which barbs in different sections deploy and retract in different directions. Thus, if the apparatus 100 is moved in one direction, certain barbs may "unhook" from the opposing surface while others remain attached and possibly increase their attachment points (e.g., by hooking more loops). Such a configuration may resist or prevent movement of the apparatus 100 both laterally and/or away from the anchor surface 700.

In a fourth example implementations, the barbs may be bent or flexed backwards—that is, in a direction away from the curl of the hook. The barbs may be anchored on a first surface and pass through holes of a second surface. Moving the two surfaces relative to each other may flex the hooks backwards and partially or completely cause the hooks to release from loops or other features on the opposing surface.

The features of the various examples of electrically actuatable barbs described above may be used individually and/or in combination; for example, by flexing the barbs to partially unhook from loops on the opposing surface while using an electric current to further uncurl the hooks of the barbs. The controller 330, upon verification of a wireless electronic signal, may actuate one or more electromechanical components (e.g., a solenoid, piston, motor, etc.) to retract the barbs by one or more of the means described above.

In another embodiment, electronically releasable barbs may grip and release certain components of the apparatus 100 including a cable 120. In some embodiments, the electronically releasable barbs may be used as a releasable locking mechanism in a modular security apparatus 1300 as described beginning at FIG. 13A below.

FIGS. 9A through 9D are conceptual drawings illustrating an example of an electronically releasable anchor mechanism of the apparatus 100, according to embodiments of the present disclosure. The electronically releasable anchor mechanism may be configured to fasten to a feature protruding from an anchor surface 700, such as the shoulder screw 910 shown in FIGS. 9A through 9D. In some implementations, the electronically releasable anchor mechanism may be configured to fasten to a cavity in the anchor surface 700. In some implementations, the electronically releasable anchor mechanism may be configured to fasten to a flat and/or smooth anchor surface 700 (e.g., using the electronically releasable suction cup shown in FIG. 8). In various implementations, the electronically releasable anchor mechanism may be configured to fasten to a combination of various prepared/unprepared features of an anchor surface 700. Various examples of anchor surfaces 700 may include, for example and without limitation, a desk, workbench, sidewalk, road, wall, beam, shelf, etc. In some cases, the electronically releasable anchor mechanism need not be secured to an anchor surface as such, but may attach to a tether (e.g., a cable, chain, rope or the like), a piece of luggage (e.g., to secure a mobile phone to a suitcase or laptop bag), a signpost (e.g., utility pole or bike rack), etc.

Figure 9A:
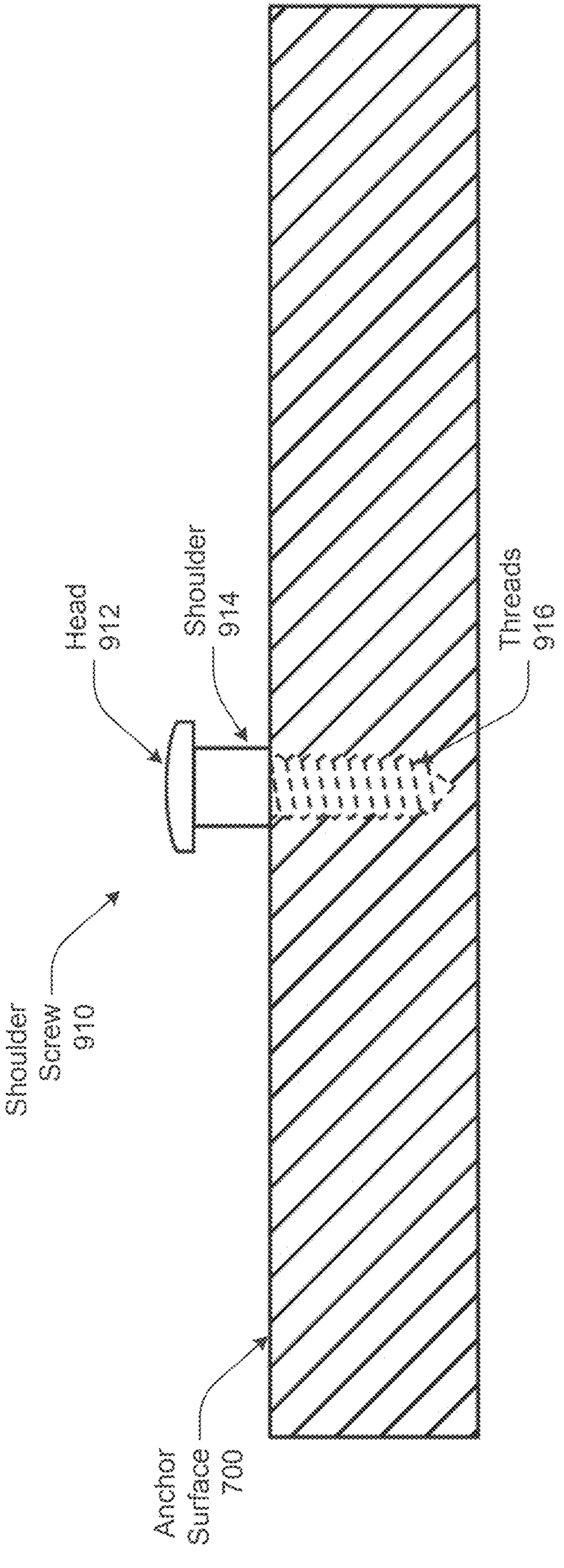
FIGS. 9A through 9D are conceptual drawings illustrating an example of an electronically releasable anchor mechanism of the apparatus 100, according to embodiments of the present disclosure.

As shown in FIG. 9A, the shoulder screw 910 may include a head 912 having a larger diameter than a shoulder 914. In some implementations, the shoulder screw 910 may be secured to the anchor surface 700 with threads 916. In some implementations, the shoulder screw 910 may be a bolt secured to the anchor surface 700 with a nut and/or other hardware. The shoulder screw 910 may have a tamper-proof or tamper-resistant head 912 similar to the screws 720 shown in FIG. 7B; for example, the head 912 may be configured to accept a specialized tool, for example and without limitation, spanner drilled, spanner slotted, multinode security, one way, tri-wing, fluted socket, hexagon internal or Torx with tamper-proof pin, etc. Similarly, if a nut is used, the nut may also have a tamper proof configuration such as a T-groove, tork-nut, slot-lok, etc.

Figure 9B:
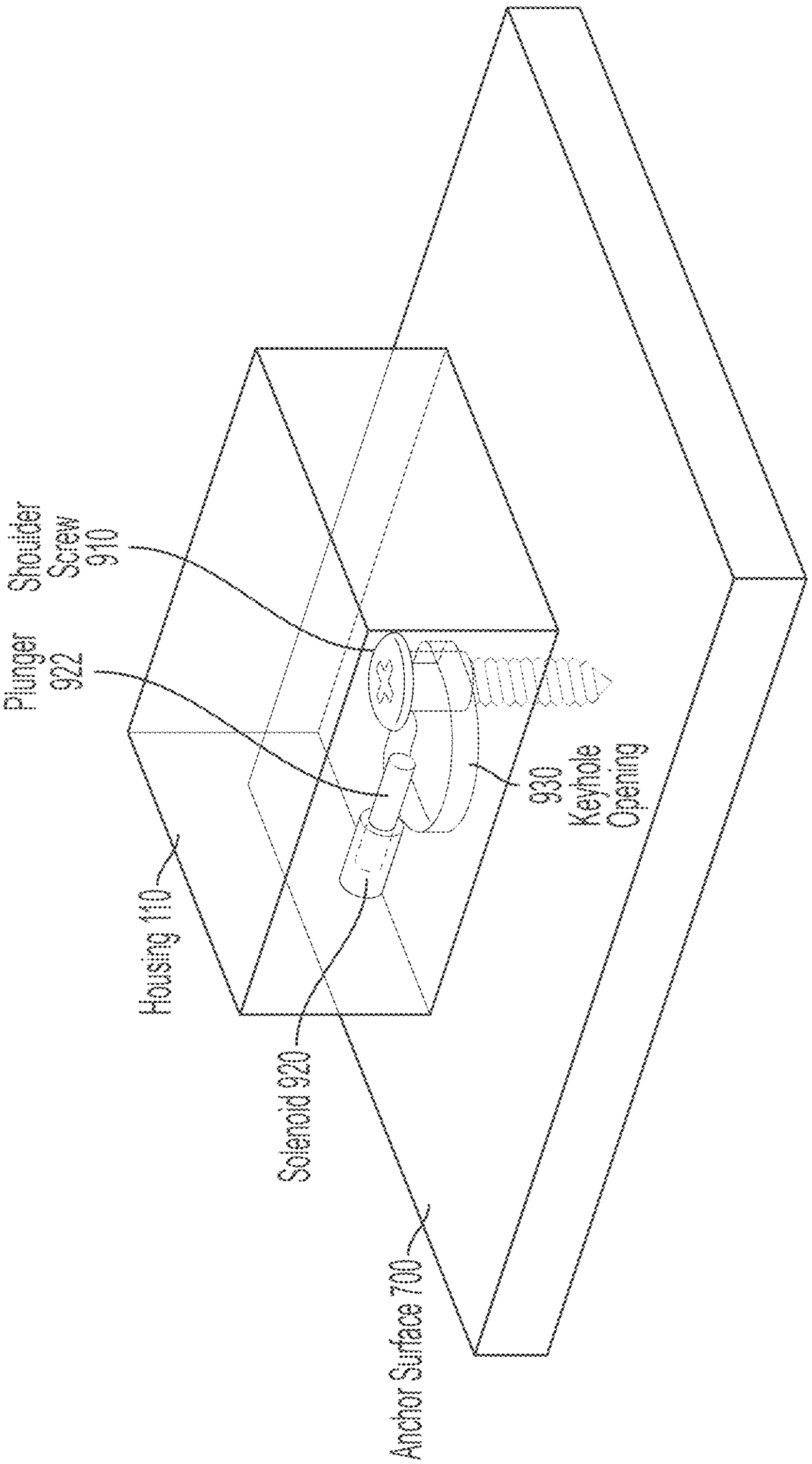

As shown in FIG. 9B, the housing 110 of the apparatus 100 may define a keyhole opening 930 with a first portion having a diameter large enough to accept the head 912 of the shoulder screw 910 and a second portion having a diameter large enough to fit around the shoulder 914 of the shoulder screw 910 but too narrow for the head 912 to pass through. The apparatus 100 may be placed over the shoulder screw 910 (or other protrusion from the anchor surface 700) such that the head 912 inserts into the wider, first portion of the keyhole opening 930. The apparatus 100 may then be moved laterally to slide the shoulder 914 of the shoulder screw 910 into the narrower, second portion of the opening 930 where the wall of the housing secures the head 912 and prevents upward movement. A solenoid 920 may extend a plunger 922 to block such lateral movement of the apparatus 100 with respect to the shoulder screw 910, thus securing the apparatus 100 to the anchor surface 700, as described further below. In addition, with the apparatus 100 in place, the housing 110 may block access to the shoulder screw 910 to prevent it from being unscrewed.

Figure 9D:
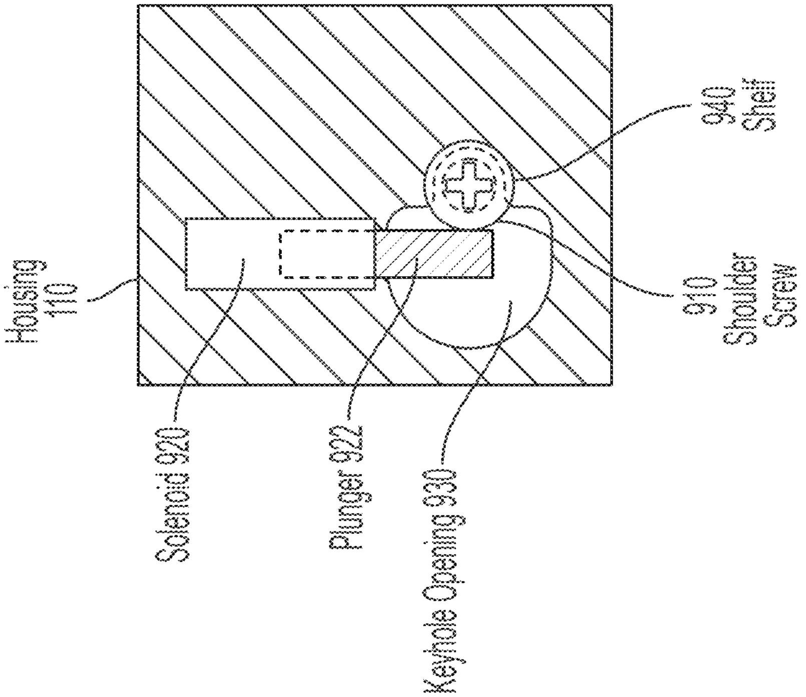
Figure 9C:
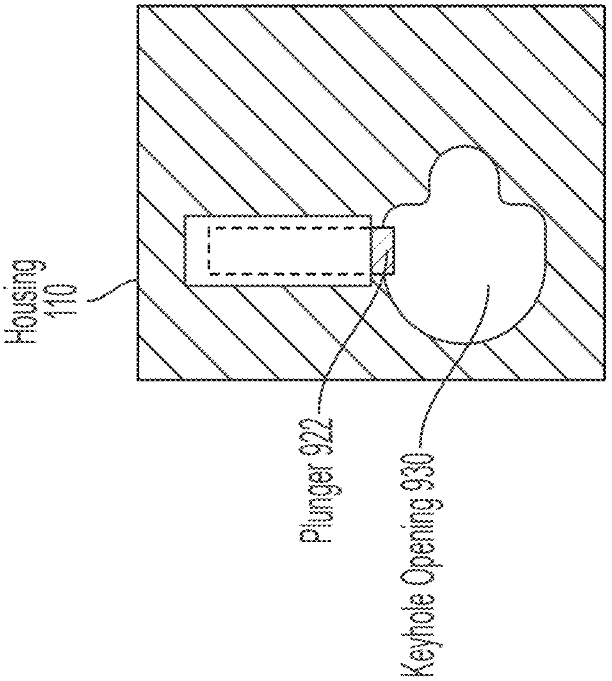

FIGS. 9C and 9D show the keyhole opening 930 and the solenoid 920 for a point of view inside the housing 110 and looking out. FIG. 9C shows the keyhole opening 930 with the plunger 922 of the solenoid 920 retracted, thus allowing the apparatus 100 to be placed over the head 912 of the shoulder screw 910 such that the shoulder screw partially enters the housing 110. As shown in FIG. 9D, the shoulder screw 910 can be moved laterally until the shoulder 914 of the should screw 910 is in the second, narrower portion of the keyhole opening 930. A wall of the housing 110 may form a shelf 940 that secures the head 912 of the shoulder screw 910 and prevents the apparatus 100 from being lifted upwards and away from the anchor surface 700.

The plunger 922 of the solenoid 920 (and/or other latching mechanism) may extend to block lateral movement of the shoulder screw 910 out of the narrower second portion of the opening 930, thus securing the apparatus 100 to the anchor surface 700. In some implementations, the solenoid 920 and/or latching mechanism may engage automatically (e.g., using a spring), while in other implementations the solenoid 920 may be engaged actively by the controller 330. The controller 330 may actuate the solenoid 920 to retract the plunger 922 and allow lateral movement of the shoulder screw 910 out of the second narrow portion of the opening 930. The controller 330 may be the same as or different from the controller 330 that controls the electronically releasable one-way locking mechanism that locks the cables 120.

In certain embodiments, the inventive concepts described for the electronically releasable anchor mechanism may also apply to fasteners where a solenoid 920 and plunger 922 mechanism is used to block the fastener from opening. For purposes of illustration and not limitation, such a device might also be described as an electronically or wirelessly releasable fastener, clasp, shackle, bolt snap, snap hook, carabiner, or locking gate. Such a device may comprise a manually operated bolt action slide or gate which is locked into a latched or secured position by the solenoid 920 and plunger 922. A release mechanism may be mounted within the housing 110 and operatively connected to the plunger 922 for extending into a primary latched position or retracting into a secondary unlatched position. An electronic circuit such as the controller 330 may activate the release mechanism so as to move the plunger 922 into a retracted or deployed position, with a wireless radio to communicate authenticated commands or controls to/from a user device (e.g., such as one of the devices 1210 shown in FIG. 12B).

Figure 10:
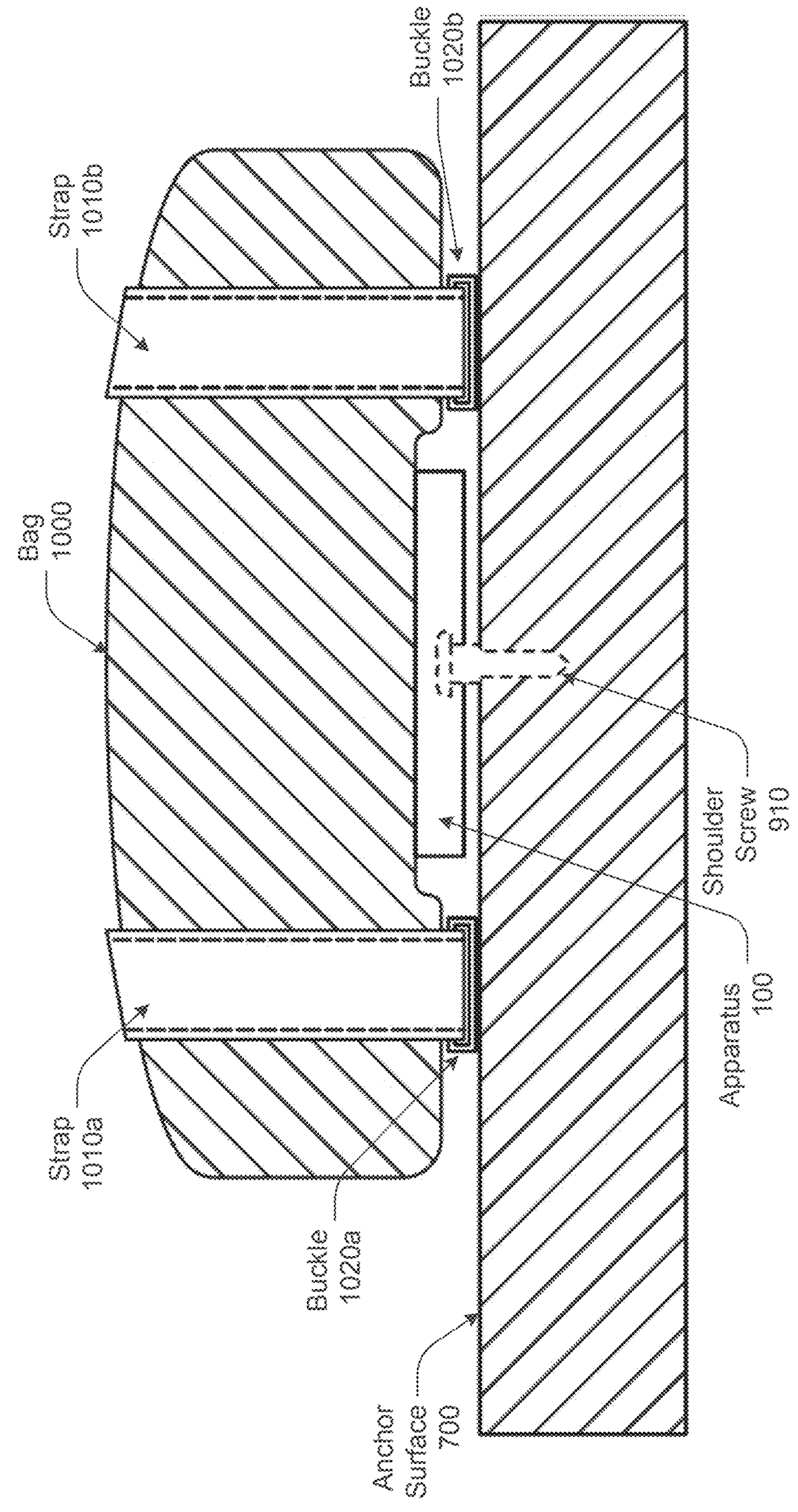
FIG. 10 is a conceptual drawing illustrating an example of the apparatus in which engaging the electronically releasable anchor mechanism prevents a bag from opening, according to embodiments of the present disclosure.

FIG. 10 is a conceptual drawing illustrating an example of the apparatus 100 in which engaging the electronically releasable anchor mechanism prevents a bag 1000 from opening, according to embodiments of the present disclosure. In various implementations, the bag 1000 may include different mechanisms for opening/closing including one or more zippers, buckles, latches, etc. The example implementation shown in FIG. 10 includes a bag 1000 having straps 1010*a* and 1010*b* (collectively "straps 1010") and respective buckles 1020*a* and 1020*b* (collectively "buckles 1020"). The buckles 1020 may be configured to secure respective straps 1010 to hold the bag closed when engaged. The apparatus 100 may be attached to and/or integrated with the bag 1000, and thus secure the bag 1000 to the anchor surface 700.

The buckles 1020 may be positioned on an underside of the bag 1000 such that they are positioned between the bag 1000 and the anchor surface 700 when the apparatus 100 is secured to the anchor surface 700. Although FIG. 10 shows an example implementation in which the apparatus 100 is secured to the shoulder screw 910, in various implementations the apparatus 100 may be secured to other features (including a flat anchor surface 700) as described herein (e.g., using an electronically releasable suction cup 830 as shown in FIG. 8). The bag 1000 may include one or more of a frame, bracket, plate, beam, or other reinforcement to prevent deformation of the bag 1000 in a manner that could expose the buckle(s) 1020 when the apparatus 100 is secured. In some implementations, the bag 1000 and/or the straps 1010 may be made from a robust, cut-resistant material such as Kevlar™. In various implementations, a zipper and/or latch holding the bag 1000 closed may be blocked in a similar manner.

In another embodiment, electronically releasable barbs grip and release certain components of the apparatus 100 including the strap 1010.

Figure 11A:
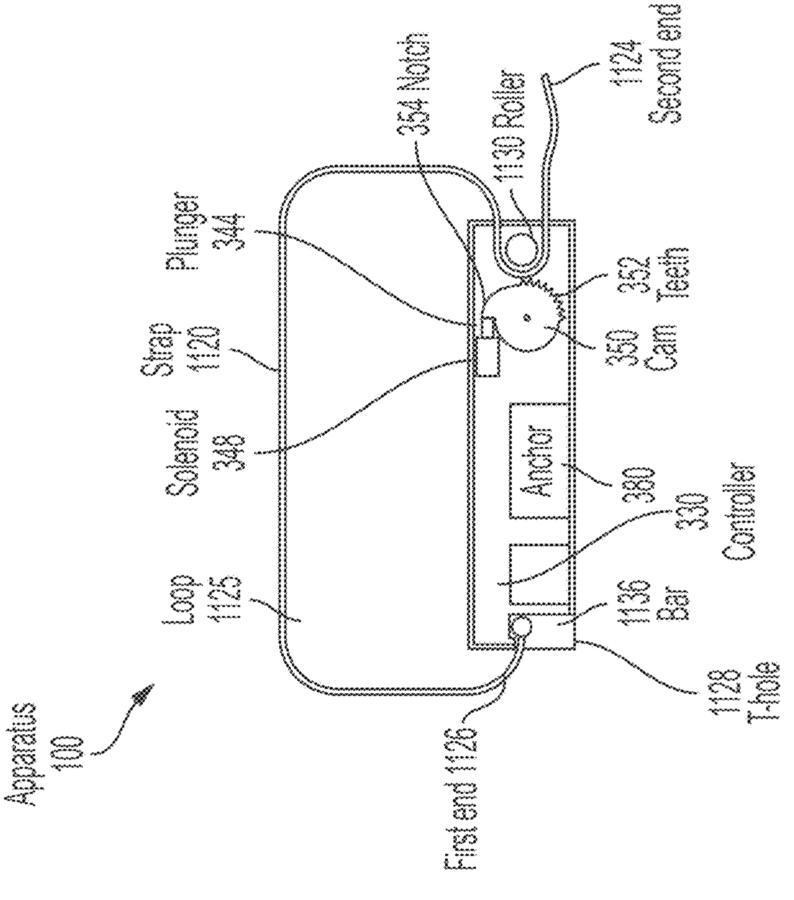
FIG. 11A illustrates a third example implementation of an electronically releasable security apparatus, according to embodiments of the present disclosure.

FIG. 11A illustrates a third example implementation of an electronically releasable security apparatus 100, according to embodiments of the present disclosure. The third example electronically releasable security apparatus 100 may include a cam 350 similar to that of the apparatus 100 shown in FIG. 3D. The cam 350 may include teeth 352 or other feature that may grip a strap 1120 via friction and/or by mechanically biting into the strap 1120. The cam 350 may allow the strap 1120 to move in a first linear direction (e.g., that reduces a size of a loop 1125 formed by the strap 1120). When pulled in the first linear direction (e.g., by a user pulling on a free, second end 1124 of the strap 1120), the cam 350 may rotate such that the radius to the point of contact with the strap 1120 decreases and the strap 1120 pulls freely. The cam 350 may, however, prevent movement of the strap 1120 in a second linear direction opposite the first linear direction. When pulled in the second linear direction (e.g., as when someone attempts to increase the size of the loop 1125), the cam 350 may rotate such that the radius to the point of contact with the strap 1120 increases, causing the teeth 352 to push into the strap 1120. The cam 350 and a roller 1130 (e.g., a fixed or rotating cylinder around which the strap 1120 wraps) may form a cam buckle or cam lock that clamps the strap 1120 between the cam 350 and roller 1130, with the teeth 352 and/or wall holding the strap 1120 by friction and/or mechanical interference caused by the teeth 352 digging into the strap 1120. In some implementations, rather than a roller 1130, the cam 350 may form a cam buckle with a wall of the housing 110, a feature on the wall of the housing 110, and/or another component of the apparatus 100. The cam 350 may retain the strap 1120 unless released via the solenoid 348 and plunger 344 under control of the controller 330. As shown in FIG. 11A, the cam 350 may have a notch 354 (e.g., edge, tooth, and/or other feature) that the plunger 344 may push to rotate the cam 350 in a direction that releases the strap 1120 and allows movement in the second linear direction.

In some implementations, the housing 110 may define a t-shaped hole (T-hole) 1128. A wide portion of the T-hole 1128 may be defined in a bottom surface of the housing 110. The wide portion of the T-hole 1128 may be contiguous with a narrow portion of the T-hole that extends around an edge of the housing 110 to a side of the housing 110. The T-hole 1128 may receive a first end 1126 of the strap 1120. The first end 1126 may have a bar 1136 that may fit through the wide portion of the T-hole 1128 but not through the narrow portion. Thus, if the strap 1120 is pulled tight (e.g., such as when the apparatus 100 is locked to prevent removal of the strap 1120 and/or enlargement of the loop 1125), the first end 1126 may be secured in the housing 110 by the bar 1136. When the strap 1120 is loose, however, the bar 1136 may be moved further into the housing 110 and out of the wide portion of the T-hole 1128. This configuration may lock the first end 1126 to the housing 110 when the strap 1120 is locked tight but allow for the first end 1126 to be released when the cable 120 is unlocked or loose, thus allowing the user to conveniently wrap the strap 1120 around an object to be secured by the apparatus 100 and/or thread the strap 1120 through the object.

In some implementations, the apparatus 100 may include an anchor mechanism 380 such as one of fixed and/or electronically releasable anchors shown in FIGS. 7A and 7B, 8, and 9A through 9D. In some implementations, the anchor mechanism 380 may be released electronically by the controller 330. In some implementations, anchoring the apparatus 100 using the anchor mechanism 380 may further prevent removal of the first end(s) 1126 through the T-hole(s) 1128; for example, by causing the wide portion of the T-hole 1128 to be covered or otherwise obstructed by a surface (e.g., an anchor surface 700) to which the apparatus 100 is anchored.

Figure 11B:
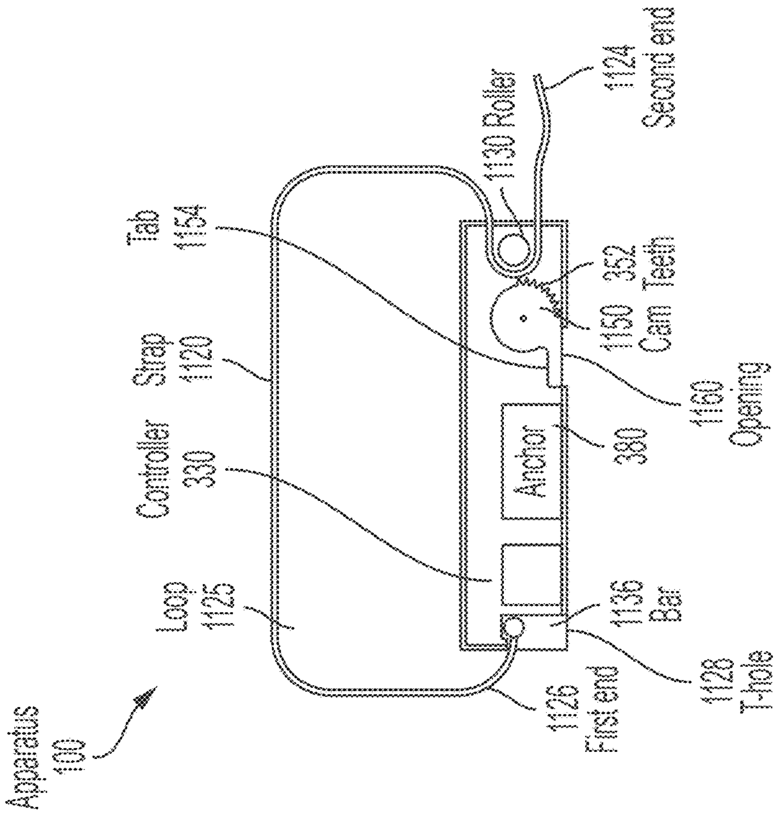
FIG. 11B illustrates a fourth example implementation of an electronically releasable security apparatus, according to embodiments of the present disclosure.

FIG. 11B illustrates a fourth example implementation of an electronically releasable security apparatus 100, according to embodiments of the present disclosure. In addition or as an alternative to the electronically releasable mechanism shown in FIG. 11A, the fourth example implementation of the apparatus 100 may include a cam 1150 having a release tab 1154. A user may pull the second end 1124 of the strap 1120 to tighten the loop 1125; however, the strap 1120 may not be loosened without releasing the cam 1150. To release the cam 1150, a user may insert a finger or other object into an opening 1160 defined in the housing 110 to push the tab 1154. By pushing the tab 1154, the user may rotate the cam 1150 and release the strap 1120. In some implementations, the cam 1150 may include both the release tab 1154 for manual release of the strap 1120 as well as a notch (such as the notch 354 of the cam 350) for electromechanical release of the strap 1120 via a solenoid and plunger.

In some implementations, the apparatus 100 may include an anchor mechanism 380 such as one of fixed and/or electronically releasable anchors shown in FIGS. 7A and 7B, 8, and 9A through 9D. Anchoring the apparatus 100 to an anchor surface using the anchor mechanism 380 may block access to the opening 1160 and/or the tab 1154 until and unless the anchor mechanism 380 is released from the anchor surface. Therefore, the strap 1120 may remain locked/tight as long as the apparatus is anchored. The strap 1120 may be released by releasing, electronically and/or manually, the anchor mechanism 380 and removing the apparatus 100 from the anchor surface.

Figure 11C:
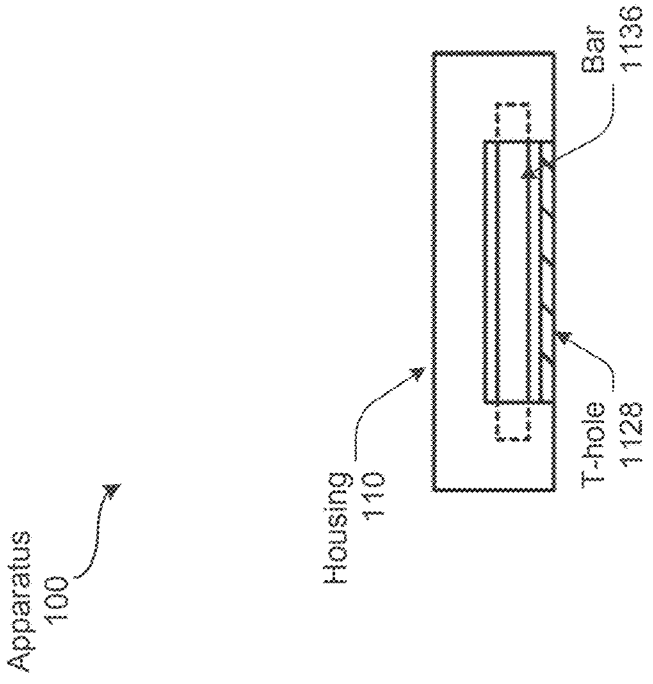
FIG. 11C illustrates a side view of an electronically releasable security apparatus, according to embodiments of the present disclosure.
Figure 11D:
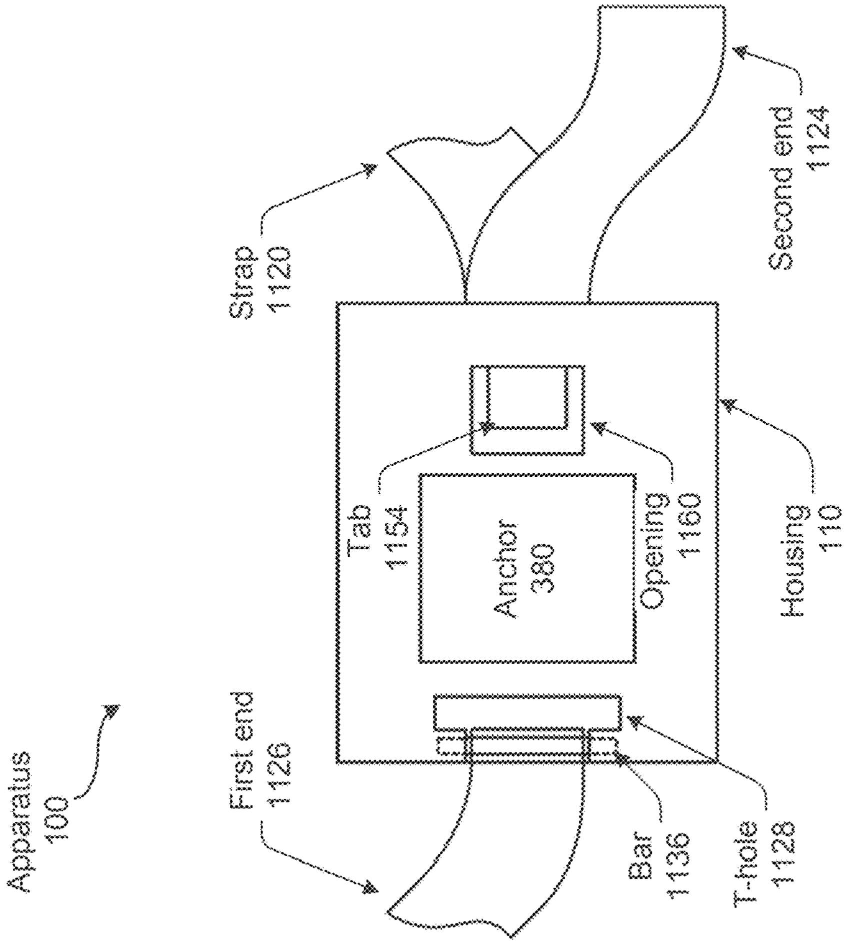
FIG. 11D illustrates a bottom view of the fourth example electronically releasable security apparatus, according to embodiments of the present disclosure.

FIG. 11C illustrates a side view of an electronically releasable security apparatus 100 and FIG. 11D illustrates a bottom view, according to embodiments of the present disclosure. The side view shows the T-hole 1128 defined in the housing 110. The bar 1136 (e.g., fixed to the first end 1126 of the strap 1120) may insert into the T-hole 1128 through the wide portion at the bottom of the apparatus 100. When pulled tight (e.g., outwards or up), the bar 1136 is too wide to pass through the narrow end of the T-hole 1128. Thus, first end 1126 cannot be removed from the T-hole 1128 unless the strap 1120 is loosened.

As shown in FIG. 11D, the release tab 1154 of the cam 1150 may be accessible through an opening 1160 defined in the bottom of the housing 110. When the anchor mechanism 380 anchors the apparatus 100 to an anchor surface, access to the opening 1160 and/or the tab 1154 may be blocked or otherwise obstructed (e.g., by the anchor surface). When the anchor mechanism 380 is released, the apparatus 100 may be removed from the anchor surface, and the user may press the tab 1154 to release the strap 1120 and free the object secured by the apparatus 100.

In certain embodiments, the inventive concepts described for the electronically releasable security apparatus 100 also apply to other mechanisms and devices for gripping a strap, rope or cable via friction and/or by mechanically biting into the strap, rope or cable. For purposes of illustration and not limitation, such a device might be described as a wirelessly releasable cable lock, a wirelessly releasable pulley, or wirelessly releasable rope lock.

The techniques described herein for securing objects and/or containers may be applied to any object. Electronically releasable cables and/or anchor mechanisms may be designed into and/or designed to secure portable electronic devices, such as laptops, mobile phones, and pad devices; electronic devices, such as computers, appliances, and audio/video equipment; tools and tool boxes; toys and video games; artwork and collectibles; containers such as boxes, brief cases, purses, suitcases, safes, and jewelry boxes; security bags made, for example, out of Kevlar or other robust materials; musical instruments; sports equipment; medical equipment; drug access and control; industrial equipment and material; commercial appliances and equipment; consumer appliances; any object of actual or perceived value; any container intended to hold one or more objects of actual or perceived value.

Having thus described several aspects of at least one embodiment of this disclosure, it is to be appreciated various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

Figure 12A:
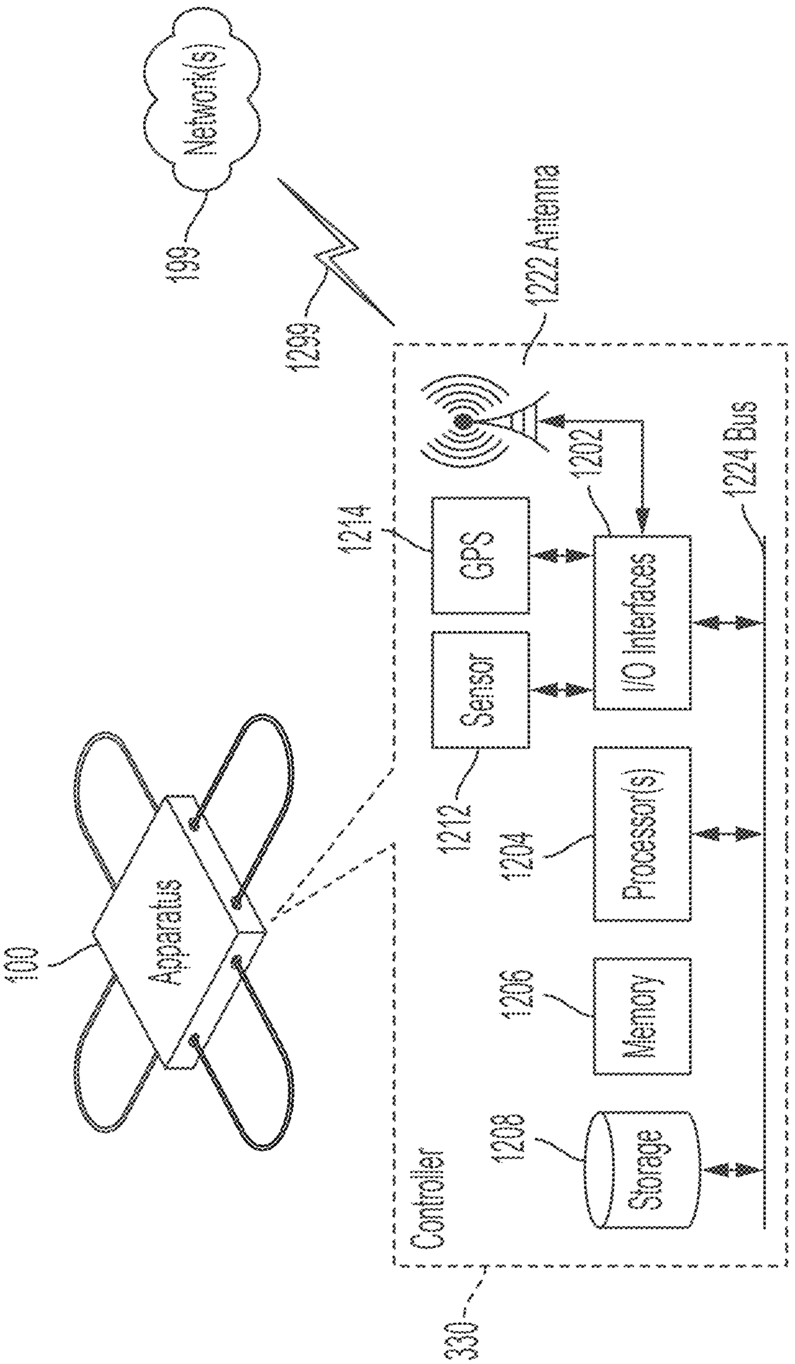
FIG. 12A is a block diagram conceptually illustrating example components of the controller of the security apparatus, according to embodiments of the present disclosure.

FIG. 12A is a block diagram conceptually illustrating example components of a controller 330 of the apparatus 100, according to embodiments of the present disclosure. The controller 330 may include one or more antennas 1222 for communicating via one or more communications links 1299 over a computer network or multiple computer networks 199. The controller 330 may include one or more processors 1204, which may each include a central processing unit (CPU) for processing data and computer-readable instructions, and a memory 1206 for storing data and instructions of the respective device. The memories 1206 may individually include volatile random-access memory (RAM), non-volatile read only memory (ROM), non-volatile magnetoresistive memory (MRAM), and/or other types of memory. The controller 330 may include a data storage component 1208 for storing data and controller/processor-executable instructions. Each data storage component 1208 may individually include one or more non-volatile storage types such as magnetic storage, optical storage, solid-state storage, etc. The controller 330 may also be connected to removable or external non-volatile memory and/or storage (such as a removable memory card, memory key drive, networked storage, etc.) through respective input/output device interfaces 1202.

Computer instructions for operating the controller 330 and its various components may be executed by the processor(s) 1204, using the memory 1206 as temporary "working" storage at runtime. A device's computer instructions may be stored in a non-transitory manner in non-volatile memory 1206, data storage component 1208, or an external device(s). Alternatively, some or all of the executable instructions may be embedded in hardware or firmware on the respective device in addition to or instead of software.

The controller 330 may include input/output device interfaces 1202. A variety of components may be connected through the input/output device interfaces 1202, as will be discussed further below. Additionally, the controller 330 may include an address/data bus 1224 for conveying data among components of the respective device. Each component within the controller 330 may also be directly connected to other components in addition to (or instead of) being connected to other components across the data bus 1224.

The controller 330 may include input/output device interfaces 1202 that connect to a variety of components such as an accelerometer and/or vibration sensor 1212 (e.g., to detect tampering with the apparatus 100), a global-positioning system (GPS) 1214 component for determining a location of the apparatus 100, and/or the antenna(s) 1222. In some implementations, the input/output device interfaces 1202 may connect to additional components such as a fingerprint reader, scanner, and/or camera for biometric identification which may, in some implementations, be used as an additional or alternative method of unlocking the apparatus 100 from a secured device 101 and/or an anchor. In some implementations, the input/output device interfaces 1202 may connect to a speaker and/or microphone.

Via the antenna(s) 1222, the input/output device interfaces 1202 may connect to one or more networks 199 via communication links 1299 such as a wireless local area network (WLAN) (such as Wi-Fi) radio, Bluetooth, near-field communication (NFC), and/or wireless network radio, such as a radio capable of communication with a wireless communication network such as a Long Term Evolution (LTE) network, WiMAX network, 3G network, 4G network, 5G network, etc. A wired connection such as Ethernet or USB may also be supported. Through the network(s) 199, the system may be distributed across a networked environment. The I/O device interface 1202 may also include communication components that allow data to be exchanged between devices such as different physical servers in a collection of servers or other components.

Figure 12B:
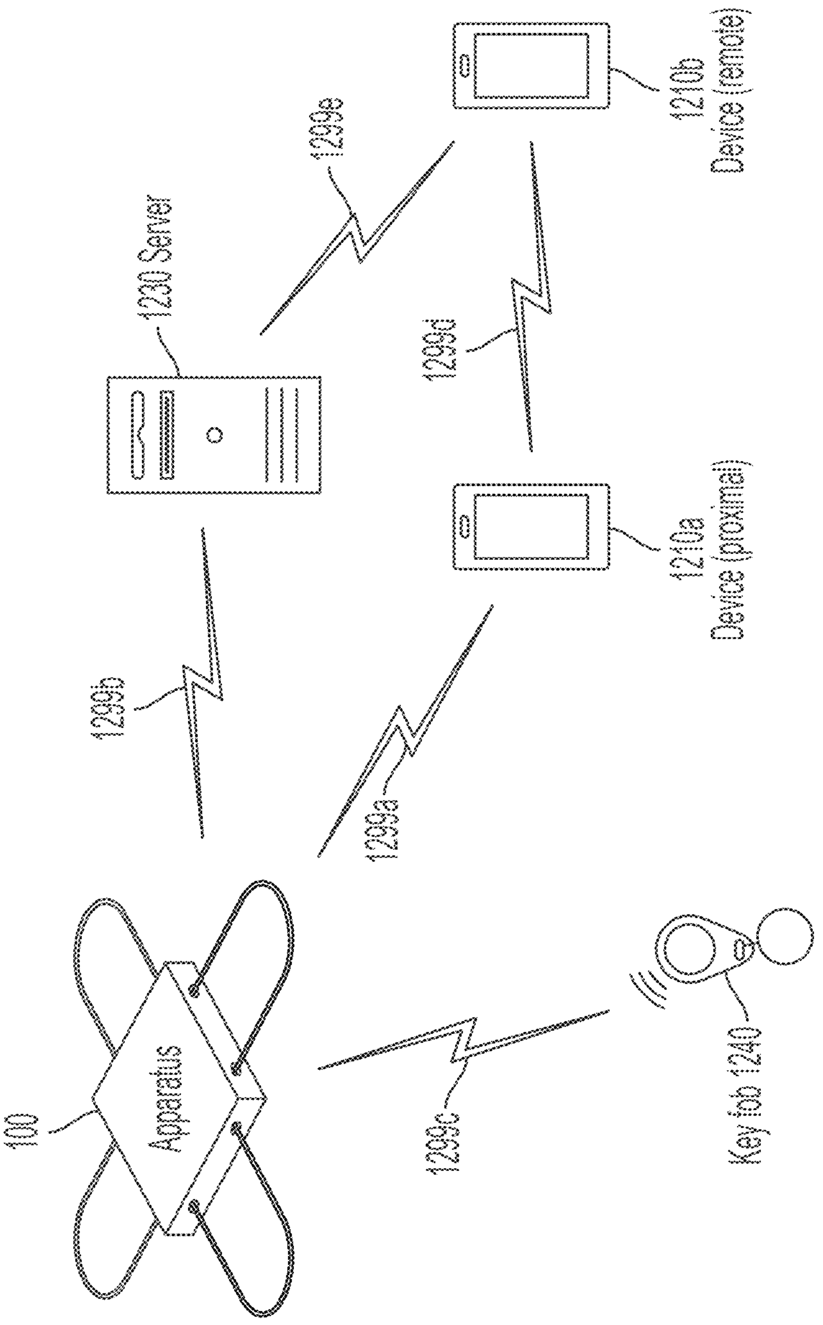
FIG. 12B is a conceptual drawing illustrating an example of communication between security apparatus and a controlling device and/or key fob, etc., according to embodiments of the present disclosure.

FIG. 12B is a conceptual drawing illustrating an example of communication between apparatus 100, one or more controlling devices 1210, servers 1230, and/or key fobs 1240, according to embodiments of the present disclosure. A controlling device 1210 may be, for example and without limitation, a mobile device (e.g., cell phone), tablet, laptop or desktop computer, smart watch or other wearable device, and/or computing device integrated with another device such as an appliance, vehicle, etc. In some implementations, communication between the apparatus 100 and another device may be based on proximity (e.g., over a communication link 1299*a* with a user device 1210*a* and/or a communication 1299*c* with a key fob 1240 (e.g., a remote, dongle, transmitter, etc.). In some implementations, the apparatus 100 may communicate with a remote server 1230 and/or a remote device 1210*b* over communication links 1299*e* or 1299*d*, respectively.

In some implementations, the apparatus 100 may be programmed to recognize an authorized user when a transmitting device such as the proximal device 1210*a* and/or the key fob 1240 is in local proximity to the apparatus 100. As part of a set-up procedure, the authorized user may physically activate a feature in the apparatus 100 that causes the apparatus 100 to enter a binding mode that allows pairing between the controller 330 (e.g., via the antenna(s) 1222) and the transmitting device (e.g., using an app on a mobile phone, tablet, smart watch, laptop, etc.). Once the apparatus 100 and the transmitting device are communicatively coupled via a communication link 1299, the authorized user may operate the transmitting device to instruct the controller 330 of the apparatus 100 to store the unique radio-frequency identifier (RFID) of the authorized user's transmitting device (e.g., the user device 1210*a* and/or the key fob 1240) in its non-volatile memory.

In some implementations, the apparatus 100 may be programmed to periodically broadcast its unique RFID and to scan for other radio frequency signals (e.g., a Bluetooth identifier and/or other identifier) from transmitting devices. A transmitting device may also broadcast its unique RFID periodically and/or on command and scan for other radio frequency signals. When the authorized user carries the transmitting device in local proximity to the apparatus 100 (e.g., as shown by the key fob 1240 and/or proximal user device 1210*a* in FIG. 12B), the controller 330 of the apparatus 100 may recognize the unique RFID of the transmitting device as one it has stored and authorized, and thereby recognizes the close proximity of the user. Similarly, when the authorized user carries the transmitting device out of local proximity to the apparatus 100, the controller 330 may detect the absence of the RFID of the transmitting device and, by proxy, its authorized user.

In some implementations, the transmitting device (the key fob 1240 and/or user device 1210*a*) may remember an RFID of apparatus 100. This procedure also works for multiple apparatus 100 and multiple transmitting devices, with each device (e.g., the apparatus 100 and the transmitting device) storing the unique RFID of those other devices with which it has been paired.

In some implementations, the apparatus 100 may execute different software programs or defined protocols using this proximity-based information. For example, the apparatus 100 may additionally or alternatively communicate over the network(s) 199 to communicate with a server 1230 and/or pair with a user device 1210*b* that is remote from the apparatus 100.

In some implementations, the apparatus 100 may be paired with an authorized user's device 1210, such that apparatus recognizes when the authorized user is present in the local proximity or absent and remote, as illustrated by the communication link 1299*a*. Based on that information, the apparatus 100 may be programmed to allow or deny attempts to unlock the cables 120 and/or anchor mechanism by an unauthorized user who does not have the properly recognized unique RFID of the authorized user's device 1210 and/or key fob 1240. In this case, the authorized RFID pairing can act as a proximity-based electronic key in a single factor authentication protocol, or can act as an additional proximity-based factor within a multi-factor authorization or identity authentication security protocol.

In some implementations, the apparatus 100 may be paired with a device such as a smart home device (e.g., a smart speaker), desktop computer, proximal user device 1210*a*, in-home/in-office server 1230, etc. that may be configured as a room monitoring device. Such a room monitoring device may be configured to run an application or app that uses communication facilities of the room monitoring device to regularly (e.g., continually, periodically, occasionally, etc.) monitor for the RFID of the apparatus 100 in its local proximity. If the room monitoring device detects that the apparatus 100 has been removed from the local proximity of the room monitoring device, the application or app running on the room monitoring device may report the absence of the apparatus to the authorized user's device 1210*b* (e.g., via the server 1230 and/or the communication links 1299*d* and 1299*e*). The apparatus 100 and/or the room monitoring device may further alert the user device 1210*b* if other tampering of the apparatus 100 is detected; for example, by movement using the accelerometer/vibration sensor 1212 and/or GPS module 1214.

In some implementations, the apparatus 100 may transmit status information periodically and/or upon request. For example, the apparatus 100 may generate wireless electronic signal indicating whether the apparatus 100 is locked or unlocked (e.g., to a device 101) and/or anchored or unanchored. The apparatus 100 may indicate the status of individual electromechanical components (e.g., whether they are in an rest state or actuated state). The apparatus 100 may indicate whether it detects the presence and/or proximity of a key fob 1240 and/or other authorized device. The user device 1210 may receive the indication directly (e.g., by receiving the wireless electronic signal) and/or indirectly (e.g., via the server 1230 or another device 1210).

In some implementations, the apparatus 100 may also include an accelerometer/vibration sensor 1212 and/or GPS module 1214. If the apparatus 100 (e.g., while attached to a device 101) determines from these sensors that the device 101 and/or the apparatus 100 is being moved, lifted or otherwise tampered with, the apparatus 100 may take one or more predefined actions triggered by the sensed event. For example, if the apparatus is currently paired to a room monitoring device, it can inform the room monitoring device of the unauthorized tampering. The room monitoring device may alert the authorized user about the tampering via the network 199; for example, by sending a message to the user's device 1210, which may not be in local proximity. The apparatus 100 may also take other actions, including triggering an audible alert and/or visible lights that draw attention to the tampering attempt. In some implementations, the apparatus 100 may combine the previously described proximity detection feature with the motion detection feature to monitor for tampering and take appropriate action when the authorized owner is not present, thereby reducing false tampering alerts or actions when the authorized user is present.

In some implementations, the apparatus may be configured with one or more electronic authentication mechanisms, such as a fingerprint scanner and/or other biometric scanner (e.g., using face recognition, iris recognition, voice recognition, etc.). Fingerprint scanning may provide an easy alternative manner of unlocking the apparatus 100 from the device 101 and/or an anchor. In some implementations, the apparatus 100 may be configured to unlock via a positive fingerprint read only if the proximity detection feature confirms the presence of an authorized individual as confirmed by recognizing the unique RFID of a previously paired and authorized user device 1210.

In some implementations, the apparatus 100 may be used to secure a user device 1210 that is configured to operate the apparatus 100. In such cases, proximity-based control of the apparatus 100 may be temporarily or permanently deactivated such that user authentication by the user device 1210 is required to cause the user device 1210 to send to the apparatus 100 an electronic signal that will release the user device 1210 and/or release an anchored apparatus 100 from the surface or object to which it is anchored. User authentication may be by means of a user pin, password, biometric reading, etc., for unlocking the user device 1210 and/or a separate user pin, password, biometric reading, etc., for unlocking the app.

In some implementations, the apparatus 100 may be in communication with one or more servers 1230 via a communication link 1299*b*. The server 1230 may be local to the apparatus 100 (e.g., in a same room or building and in communication via a direct wired or wireless link). The server 1230 may be remote from the apparatus 100 (e.g., in another room or building, in the cloud, and/or in communication via the network 199). The server 1230 may facilitate communication between one or more apparatus 100 and one or more user device 1210. In some implementations, the server 1230 may host a web app or other user-facing software that may facilitate binding/pairing between apparatus 100 and a user device 1210, provide status information regarding an apparatus 100 to a user device 1210 (e.g., location information, lock/unlock events, movement, etc.), and/or remote locking/unlocking of cables 120 and/or anchor mechanisms. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Figure 13A:
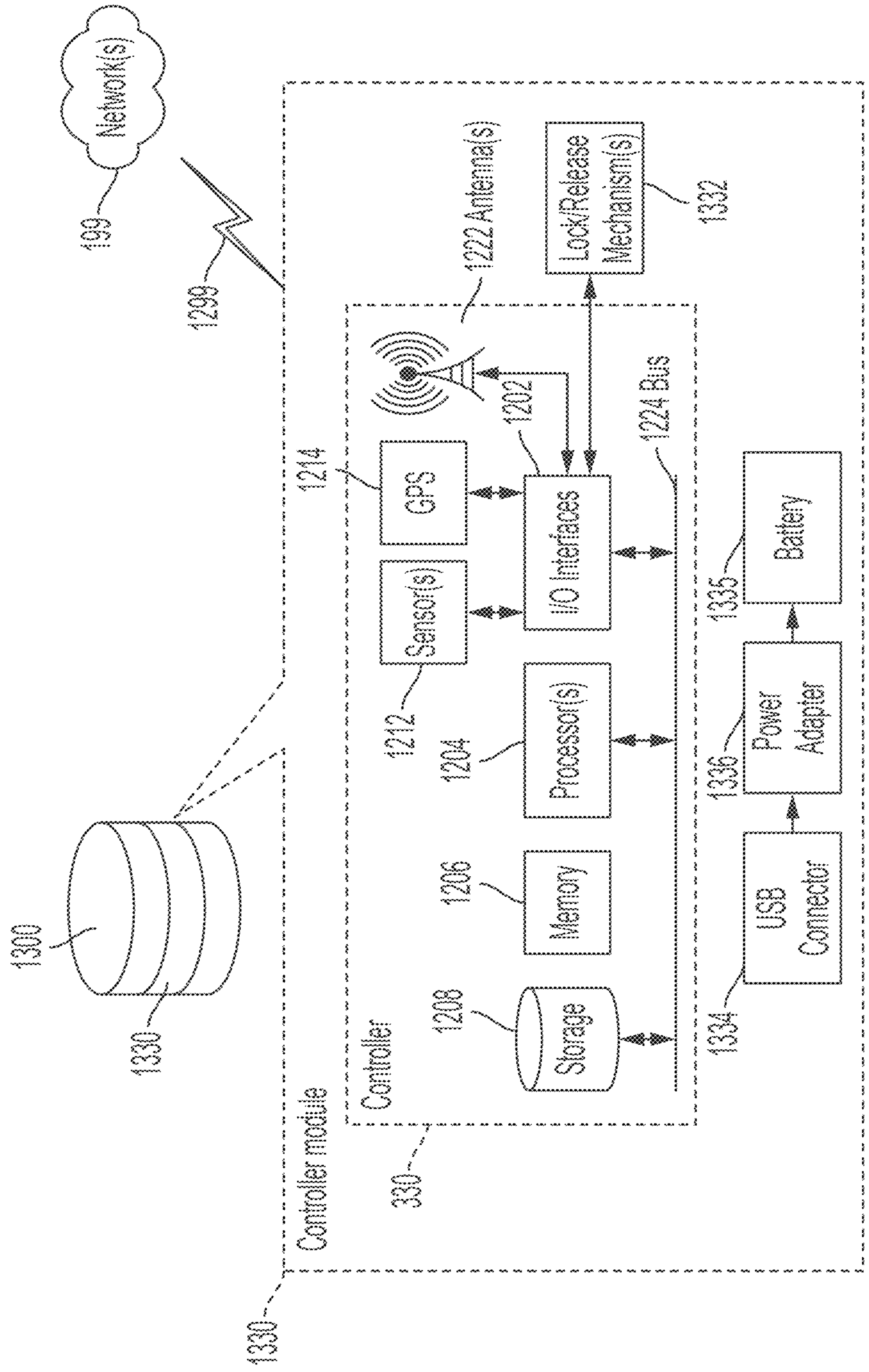
FIG. 13A is a block diagram conceptually illustrating components of an example controller module of a modular security apparatus, according to embodiments of the present disclosure.

FIG. 13A is a block diagram conceptually illustrating components of an example controller module 1330 of a modular security apparatus 1300, according to embodiments of the present disclosure. Like the apparatus 100, the modular security apparatus 1300 may be easily portable when not anchored to an anchor surface or other fixed or immovable object. The controller module 1330 may include a controller 330 as described previously. The controller 330 may include one or more antenna(s) 1222 for communicating via one or more communications links 1299 over a computer network or multiple computer networks 199. The controller 330 may include one or more processors 1204, which may each include a central processing unit (CPU) for processing data and computer-readable instructions, and a memory 1206 for storing data and instructions of the respective device. The memories 1206 may individually include volatile random-access memory (RAM), non-volatile read only memory (ROM), non-volatile magnetoresistive memory (MRAM), and/or other types of memory. The controller 330 may include a data storage component 1208 for storing data and controller/processor-executable instructions. Each data storage component 1208 may individually include one or more non-volatile storage types such as magnetic storage, optical storage, solid-state storage, etc. The controller 330 may also be connected to removable or external non-volatile memory and/or storage (such as a removable memory card, memory key drive, networked storage, etc.) through respective input/output device interfaces 1202.

Computer instructions for operating the controller 330 and its various components may be executed by the processor(s) 1204, using the memory 1206 as temporary "working" storage at runtime. A device's computer instructions may be stored in a non-transitory manner in non-volatile memory 1206, data storage component 1208, or an external device(s). Alternatively, some or all of the executable instructions may be embedded in hardware or firmware on the respective device in addition to or instead of software.

The controller 330 may include input/output device interfaces 1202. A variety of components may be connected through the input/output device interfaces 1202, as will be discussed further below. Additionally, the controller 330 may include an address/data bus 1224 for conveying data among components of the respective device. Each component within the controller 330 may also be directly connected to other components in addition to (or instead of) being connected to other components across the data bus 1224.

In some implementations, the controller 330 may transmit status information periodically and/or upon request. For example, the controller 330 may generate wireless electronic signal indicating whether the modular security apparatus 1300 is locked or unlocked (e.g., to a device 101) and/or anchored or unanchored. The controller 330 may indicate whether one or both fastener modules are attached to/detached from the controller module 1330. The controller 330 may indicate the status of individual electromechanical components of the modular security apparatus 1300 (e.g., whether in the controller module 1330 or one of the fastener modules). The controller 330 may indicate whether it detects the presence and/or proximity of a key fob 1240 and/or other authorized device. The user device 1210 may receive the indication directly (e.g., by receiving the wireless electronic signal) and/or indirectly (e.g., via the server 1230 or another device 1210).

The controller 330 may include input/output device interfaces 1202 that connect to a variety of components such as an accelerometer and/or vibration sensor 1212 (e.g., to detect tampering with the apparatus 100), a global-positioning system (GPS) 1214 component for determining a location of the apparatus 100, and/or the antenna(s) 1222. In some implementations, the input/output device interfaces 1202 may connect to additional components such as a fingerprint reader, scanner, and/or camera for biometric identification which may, in some implementations, be used as an additional or alternative method of unlocking the apparatus 100 from a secured device 101 and/or an anchor surface or other fixed object. In some implementations, the input/output device interfaces 1202 may connect to a speaker and/or microphone.

Via the antenna(s) 1222, the input/output device interfaces 1202 may connect to one or more networks 199 via communication links 1299 such as a radio-frequency (RF) wireless local area network (WLAN) using Wi-Fi, Bluetooth, near-field communication (NFC), and/or a low power wide area network (LPWAN) using Long-Range (LoRa), LoRaWAN, or Chirp Spread Spectrum (CSS), as well as a wireless network radio capable of communication with a wireless communication network such as a Long-Term Evolution (LTE) network, WiMAX network, 3G network, 4G network, 5G network, etc. A wired connection such as Ethernet or USB may also be supported. Through the network(s) 199, the system may be distributed across a networked environment. The I/O device interface 1202 may also include communication components that allow data to be exchanged with internet-of-things (IoT) edge computing devices, or between devices such as different physical servers in a collection of servers or other components.

The controller module 1330 may include components for powering the various functions of the modular security apparatus 1300. For example, the controller module 1330 may include a battery 1335, which may be charged by a power adapter 1336 receiving power from a USB connector 1334. In some implementations, the modular security apparatus 1300 may be configured such that the USB connector 1334 is accessible only when the modular security apparatus 1300 is disassembled; for example, by positioning the USB connector 1334 on a surface of the controller module 1330 that is covered by one of the fastener modules when the modular security apparatus 1300 is assembled. This may prevent access to the USB connector 1334 when the modular security apparatus 1300 is locked, thereby enhancing the security of the modular security apparatus 1300. In some implementations, the controller module 1330 may be configured such that the USB connector 1334 receives power only and not data. This may enhance the security of the modular security apparatus 1300 by preventing hacking via a wired digital connection to the controller 330, while still allowing charging of the battery 1335 when the modular security apparatus 1300 is locked. In this manner, the user will not be prevented from unlocking the modular security apparatus 1300 (e.g., via one or more lock/release mechanisms 1332) if the battery 1335 does not have enough charge to release any of the locking mechanisms. In some implementations, the modular security apparatus 1300 may be configured such that the battery 1335 located within the controller module 1330, provides power to one or more fastener modules 1410/1420 when one or more of the fastener modules 1410/1420 are locked onto the controller module 1330 within the modular security apparatus 1300.

The lock/release mechanisms 1332 may include one or more devices configured to lock and/or release an object of value such as a device 101, lock and/or release one or more fastener modules 1410/1420 of the modular security apparatus 1300 with respect to each other, and/or lock and/or release the modular security apparatus 1300 to/from the anchor surface 700 and/or other fixed or immovable object. For example, various lock/release mechanisms 1332 may include, for example and without limitation, a solenoid, motor, valve, gas generating cell, etc. In some cases, the lock/release mechanism 1332 may be in a fastener module and controlled by the controller 330 via electrodes on the modular security apparatus 1300 and fastener module 1410/1420, where the electrodes are brought into electrical communication when the controller module 1330 and fastener module are attached to one another (e.g., via the twist-lock mechanism illustrated in FIG. 16A through 16C and described below). In some implementations, the electrodes may convey an actuation signal to the lock/release mechanism 1332 in the fastener module. In some implementations, the actuation signal may be an electric voltage and/or current (e.g., either direct current (DC) and/or alternating current (AC)) that actuates the lock/release mechanism 1332. In some implementations, the actuation signal may be a data signal (e.g., a binary digital signal) that may communicate securely with a second controller within the fastener module. The data signal may be encrypted and/or otherwise secured against manipulation or replication. The second controller may actuate the lock/release mechanism 1332 based on receipt and, in some cases, verification of the received data signal. In implementations in which the fastener module includes the second controller, the fastener module may also include a battery and means for charging it.

Although the modular security apparatus 1300 illustrated in FIG. 13A is shown with three modules, the modular security apparatus 1300 may be implemented with more or fewer modules. For example, in some implementations, the modular security apparatus 1300 may be implemented as a two-part apparatus in which a single module acts as both the controller module and one of the fastener modules. The integrated controller/fastener module may act as an anchor module, while the second module may secure the electronic device, or vice-versa. Example two-part implementations of the modular security apparatus 1300 are described in further detail below with reference to FIGS. 19A and 19B.

Figure 13B:
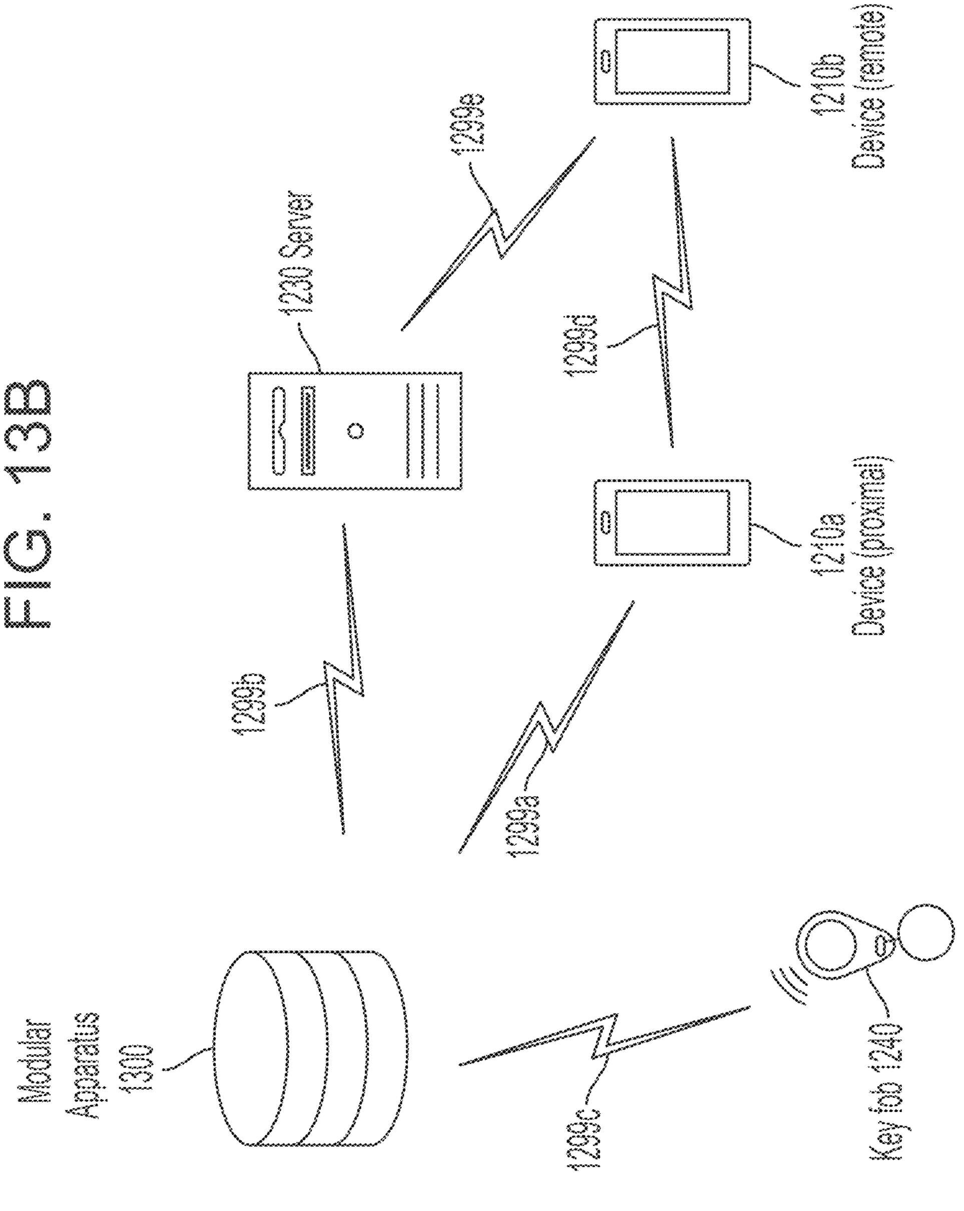
FIG. 13B is a conceptual drawing illustrating an example of communication between the modular security apparatus and a controlling device and/or key fob, etc., according to embodiments of the present disclosure.

FIG. 13B is a conceptual drawing illustrating an example of communication between the modular security apparatus 1300 and a controlling device 1210 and/or key fob 1240, etc., according to embodiments of the present disclosure. Similar to FIG. 12B described above, FIG. 13B illustrates an example of communication between the modular security apparatus 1300 (e.g., the controller module 1330), one or more controlling devices 1210, servers 1230, and/or key fobs 1240, according to embodiments of the present disclosure. A controlling device 1210 may be, for example and without limitation, a mobile device (e.g., cell phone), tablet, laptop or desktop computer, smart watch or other wearable device, and/or computing device integrated with another device such as an appliance, vehicle, etc. In some implementations, communication between the modular security apparatus 1300 and another device may be based on proximity (e.g., over a communication link 1299*a* with a user device 1210*a* and/or a communication 1299*c* with a key fob 1240 (e.g., a remote, dongle, transmitter, etc.). In some implementations, the modular security apparatus 1300 may communicate with a remote server 1230 and/or a remote device 1210*b* over communication links 1299*e* or 1299*d*, respectively.

In some implementations, the modular security apparatus 1300 may be programmed to recognize an authorized user when a transmitting device such as the proximal device 1210*a* and/or the key fob 1240 is in local proximity to the modular security apparatus 1300. As part of a set-up procedure, the authorized user may physically activate a feature in the modular security apparatus 1300 that causes the controller 330 to enter a binding mode that allows pairing between the controller 330 (e.g., via the antenna(s) 1222) and the transmitting device (e.g., using an app on a mobile phone, tablet, smart watch, laptop, etc.). Once the modular security apparatus 1300 and the transmitting device are communicatively coupled via a communication link 1299, the authorized user may operate the transmitting device to instruct the controller 330 to store the unique radio-frequency identifier (RFID) of the authorized user's transmitting device (e.g., the user device 1210*a* and/or the key fob 1240) in its non-volatile memory.

In some implementations, the controller 330 may be programmed to periodically broadcast its unique RFID and to scan for other radio frequency signals (e.g., a Bluetooth identifier and/or other identifier) from transmitting devices. A transmitting device may also broadcast its unique RFID periodically and/or on command and scan for other radio frequency signals. When the authorized user carries the transmitting device in local proximity to the modular security apparatus 1300 (e.g., as shown by the key fob 1240 and/or proximal user device 1210*a* in FIG. 13B), the controller 330 may recognize the unique RFID of the transmitting device as one it has stored and authorized, and thereby recognizes the close proximity of the user. Similarly, when the authorized user carries the transmitting device out of local proximity to the modular security apparatus 1300, the controller 330 may detect the absence of the RFID of the transmitting device and, by proxy, its authorized user.

In some implementations, the transmitting device (the key fob 1240 and/or user device 1210*a*) may remember an RFID of the controller 330. This procedure also works for multiple modular security apparatus 1300 and multiple transmitting devices, with each device (e.g., the modular security apparatus 1300 and the transmitting device) storing the unique RFID of those other devices with which it has been paired.

In some implementations, the controller 330 may execute different software programs or defined protocols using this proximity-based information. For example, the controller 330 may additionally or alternatively communicate over the network(s) 199 to communicate with a server 1230 and/or pair with a user device 1210*b* that is remote from the apparatus 100.

In some implementations, the controller 330 may be paired with an authorized user's device 1210, such that apparatus recognizes when the authorized user is present in the local proximity or absent and remote, as illustrated by the communication link 1299*a*. Based on that information, the controller 330 may be programmed to allow or deny attempts to unlock the fastener modules, cables 120, and/or anchor mechanism by an unauthorized user who does not have the properly recognized unique RFID of the authorized user's device 1210 and/or key fob 1240. In this case, the authorized RFID pairing can act as a proximity-based electronic key in a single factor authentication protocol, or can act as an additional proximity-based factor within a multi-factor authorization or identity authentication security protocol.

In some implementations, the controller 330 may be paired with a device such as a smart home device (e.g., a smart speaker), desktop computer, proximal user device 1210*a*, in-home/in-office server 1230, etc. that may be configured as a room monitoring device. Such a room monitoring device may be configured to run an application or app that uses communication facilities of the room monitoring device to regularly (e.g., continually, periodically, occasionally, etc.) monitor for the RFID of the controller 330 in its local proximity. If the room monitoring device detects that the controller 330 has been removed from the local proximity of the room monitoring device, the application or app running on the room monitoring device may report the absence of the apparatus to the authorized user's device 1210*b* (e.g., via the server 1230 and/or the communication links 1299*d* and 1299*e*). The controller 330 and/or the room monitoring device may further alert the user device 1210*b* if other tampering of the modular security apparatus 1300 is detected; for example, by movement using the accelerometer/vibration sensor 1212 and/or GPS module 1214.

In some implementations, the controller 330 and/or the controller module 1330 may also include an accelerometer/vibration sensor 1212 and/or GPS module 1214 (e.g., as shown in FIG. 13A). If the controller 330 (e.g., while the modular security apparatus 1300 is attached to a device 101) determines from these sensors that the device 101 and/or the modular security apparatus 1300 is being moved, lifted or otherwise tampered with, the controller 330 may take one or more predefined actions triggered by the sensed event. For example, if the controller 330 is currently paired to a room monitoring device, it can inform the room monitoring device of the unauthorized tampering. The room monitoring device may alert the authorized user about the tampering via the network 199; for example, by sending a message to the user's device 1210, which may not be in local proximity. The controller 330 may also take other actions, including triggering an audible alert and/or visible lights that draw attention to the tampering attempt. In some implementations, the controller 330 may combine the previously described proximity detection feature with the motion detection feature to monitor for tampering and take appropriate action when the authorized owner is not present, thereby reducing false tampering alerts or actions when the authorized user is present.

In some implementations, the controller module 1330 may be configured with one or more electronic authentication mechanisms, such as a fingerprint scanner and/or other biometric scanner (e.g., using face recognition, iris recognition, voice recognition, etc.). Fingerprint scanning may provide an easy alternative manner of unlocking the modular security apparatus 1300 from the device 101 and/or an anchor. In some implementations, the modular security apparatus 1300 may be configured to unlock via a positive fingerprint read only if the proximity detection feature confirms the presence of an authorized individual as confirmed by recognizing the unique RFID of a previously paired and authorized user device 1210.

In some implementations, the modular security apparatus 1300 may be used to secure a user device 1210 that is configured to operate the modular security apparatus 1300. In such cases, proximity-based control of the modular security apparatus 1300 may be temporarily or permanently deactivated such that user authentication by the user device 1210 is required to cause the user device 1210 to send to the modular security apparatus 1300 an electronic signal that will release the user device 1210 and/or release an anchored modular security apparatus 1300 from the surface or object to which it is anchored. User authentication may be by means of a user pin, password, biometric reading, etc., for unlocking the user device 1210 and/or a separate user pin, password, biometric reading, etc., for unlocking the app.

In some implementations, the controller module 1330 may be in communication with one or more servers 1230 via a communication link 1299*b*. The server 1230 may be local to the modular security apparatus 1300 (e.g., in a same room or building and in communication via a direct wired or wireless link). The server 1230 may be remote from the modular security apparatus 1300 (e.g., in another room or building, in the cloud, and/or in communication via the network 199). The server 1230 may facilitate communication between one or more modular security apparatus 1300 and one or more user device 1210. In some implementations, the server 1230 may host a web app or other user-facing software that may facilitate binding/pairing between apparatus 100 and a user device 1210, provide status information regarding a modular security apparatus 1300 to a user device 1210 (e.g., location information, lock/unlock events, movement, etc.), and/or remote locking/unlocking of fastener modules, cables 120, and/or anchor mechanisms. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include internet of things edge computing devices or other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, edge computing, sandbox techniques, or other computing techniques.

The modular security apparatus 1300 may include a controller module and one or more fastener modules that may be releasably attached to each other. A first fastener module may be configured to secure a personal electronic device, such as the device 101 shown in FIGS. 1C, 1D, and elsewhere. In various implementations, the first fastener module may have two cables (e.g., as shown in FIGS. 3A through 3D) or four cables (e.g., as shown in FIGS. 1A through 1D). In some implementations, the first fastener module may secure the device 101 by other means; for example, an electronically releasable suction cup, a solenoid and pin configured to engage a feature of the device 101, a cut-resistant strap, etc. A second fastener module may be configured to secure to an anchor surface and/or other fixed or immovable object, such as shown in FIGS. 7A, 8, and elsewhere. In various implementations, the second fastener module may releasably anchor to the anchor surface 700 via an electronically releasable suction cup, a solenoid and pin configured to engage a should screw and or other feature protruding from the anchor surface 700, etc. In some implementations, both the first and second fastener modules may include an electronically releasable cable mechanism. In some implementations, both the first and second fastener modules may include an electronically releasable suction cup. In some implementations, other combinations of first and second fastener modules may be used. In some implementations, one of the fastener modules may be integrated with the controller module 1330. For example, an integrated controller/fastener module may act as an anchor module, while the second module may secure an electronic device. Alternatively, an integrated controller/fastener module may secure the electronic device, while the second module may act as the anchor module. Example of such two-part implementations of the modular security apparatus 1300 are described in further detail below with reference to FIGS. 19A and 19B.

Figure 14:
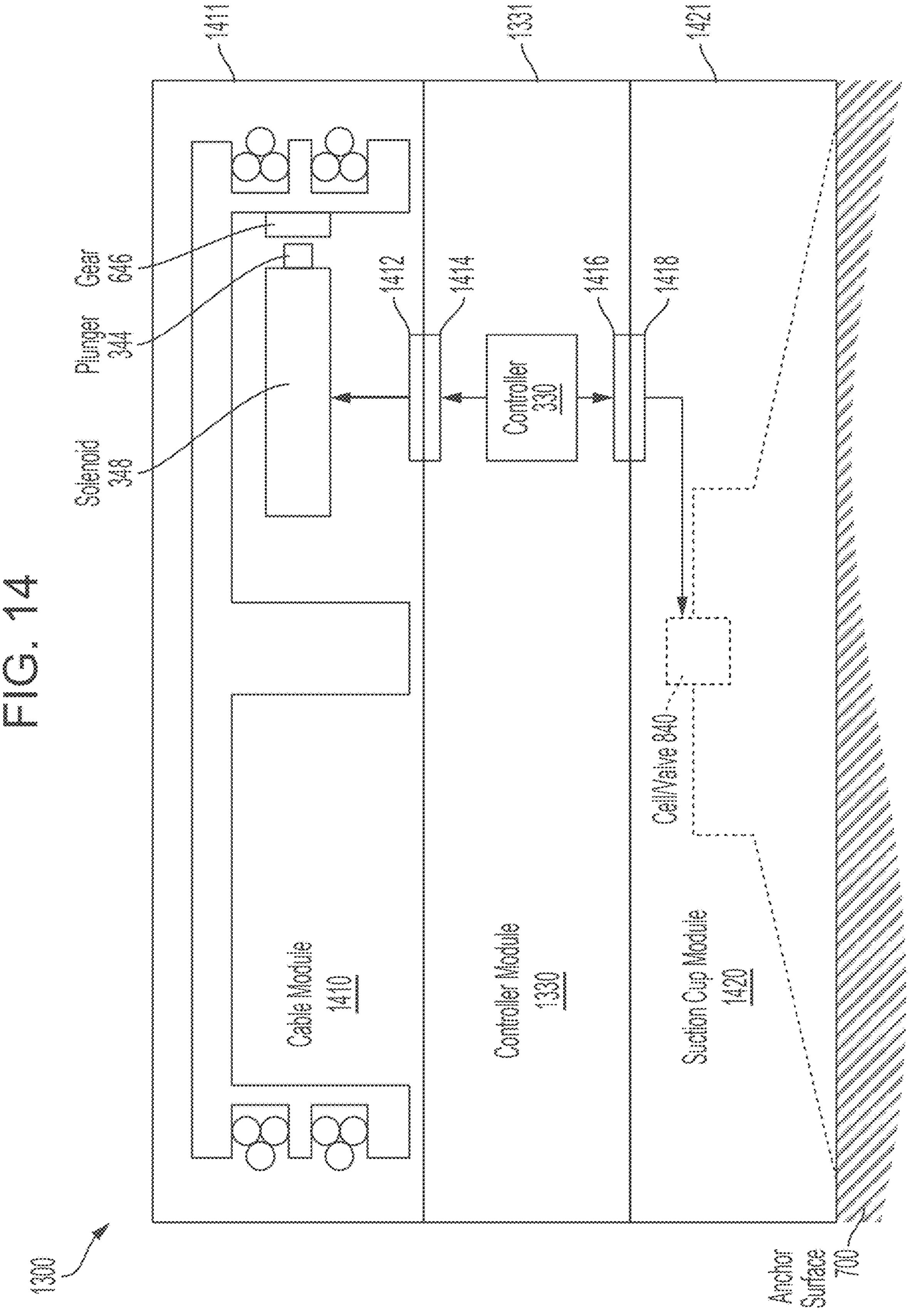
FIG. 14 is a side view of an example implementation of a modular security apparatus with electrical actuation of the fastener modules, according to embodiments of the present disclosure.

FIG. 14 is a side view of an example implementation of a modular security apparatus 1300 with electrical actuation of the fastener modules 1410 and 1420, according to embodiments of the present disclosure. The controller module 1330 may have a housing 1331 containing electronic and electromechanical components of the controller module 1330 such as the controller 330 and, in some implementations, one or more lock/release mechanisms 1332. The housing 1331 may have a first surface configured to mate with a surface of a housing 1411 of the first fastener module 1410 and a second surface, opposite the first surface, configured to mate with a surface of a housing 1421 of the second fastener module 1420. The controller module 1330 may releasably attach to each of the first fastener module 1410 and the second fastener module 1420 as described in further detail below with reference to FIGS. 16A through 16C, 17A through 17D, and/or 18A through 18C. In the example implementation shown in FIG. 14, the first fastener module 1410 may be configured to secure a device 101 (e.g., using cables and/or any one of the other example device-securing mechanisms described herein), while the second fastener module 1420 may be configured to anchor to an anchor surface 700.

The controller module 1330 may be configured to electronically actuate the lock/release mechanisms of one or both of the fastener modules 1410, 1420. For example, the controller 330 may, upon verifying an electronic signal as previously described, may send an electronic signal to electrode(s) 1414 arranged on a surface of the controller module 1330. When the first fastener module 1410 is attached to the controller module 1330, electrode(s) 1412 arranged on a surface of the first fastener module 1410 may make contact and form an electrical connection between the controller module 1330 and the first fastener module 1410. The electronic signal may actuate a lock/release mechanism of the first fastener module 1410 to, for example, cause the solenoid 348 to retract the plunger 344 from teeth of the gear 646, allowing the cables to be released (e.g., to release the device 101 and/or lengthen the cables to wrap around the device 101). Similarly, the controller 330 may send an electronic signal to electrode(s) 1416 arranged on a second surface of the controller module 1330. When the second fastener module 1420 is attached to the controller module 1330, electrode(s) 1418 arranged on a surface of the second fastener module 1420 may make contact and form an electrical connection between the controller module 1330 and the second fastener module 1420. The electronic signal may actuate a lock/release mechanism of the second fastener module 1420 to, for example, actuate the cell/valve 840 to allow gas to flow into the suction cup, thereby releasing it from the anchor surface. Although the example implementation in FIG. 14 is shown with a cable module and suction cup module, other implementations of one or both fastener modules 1410, 1420 are possible.

Figure 15:
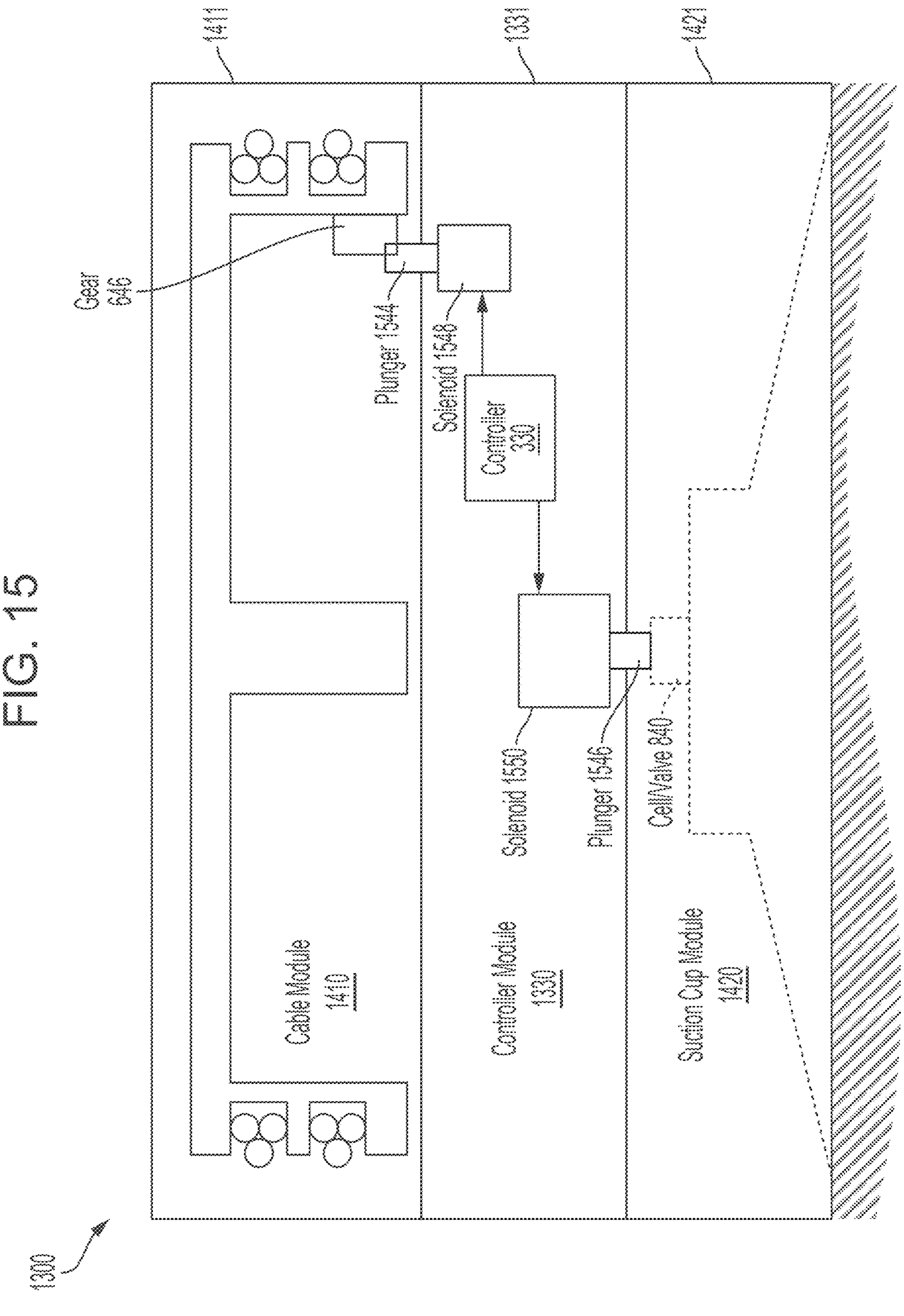
FIG. 15 is a side view of an example implementation of a modular security apparatus with mechanical actuation of the fastener modules, according to embodiments of the present disclosure.

FIG. 15 is a side view of an example implementation of a modular security apparatus 1300 with mechanical actuation of the fastener modules 1410 and 1420, according to embodiments of the present disclosure. In contrast with FIG. 14, the implementation shown in FIG. 15 includes a controller module 1330 having lock/release mechanisms substantially internal to itself and controllably extending into and retracting from the fastener modules 1410, 1420. The controller module 1330 may include a solenoid 1548 with a plunger 1544 configured to extend into the fastener module 1410 and engage with teeth of the gear 646 to prevent release of the cable(s). The 1548 and the plunger 1544 may form an electromechanical component in which the solenoid 1548 is a stationary element that may have a position fixed with respect to a housing 1331, and the plunger 1544 is a movable element that can extent or retract from the solenoid 1548 under control of the controller 330. To release the cables, the controller 330 may send an actuation signal to the solenoid 1548 (e.g., an electric voltage and/or current), causing the solenoid 1548 to retract the plunger 1544, thereby disengaging the plunger 1544 from the gear 646 and releasing the cable(s).

Similarly, the controller module may include a solenoid 1550 and a plunger 1546 configured to extend into the fastener module 1420 to actuate the cell/valve 840. To release the modular security apparatus 1300 from the anchor surface 700, the controller 330 may send an actuation signal to the solenoid 1550, causing the solenoid 1550 to extend the plunger 1546 to actuate the cell/valve 840, thereby releasing gas into the suction cup and releasing the modular security apparatus 1300 from the anchor surface 700.

In some implementations, the modular security apparatus 1300 may include a combination of the lock/release mechanisms shown in FIGS. 14 and 15. For example, in various implementations, the first fastener module 1410 may house its lock/release mechanism while the controller module 1330 houses the lock/release mechanism for the second fastener module 1420, and vice-versa.

Figure 16A:
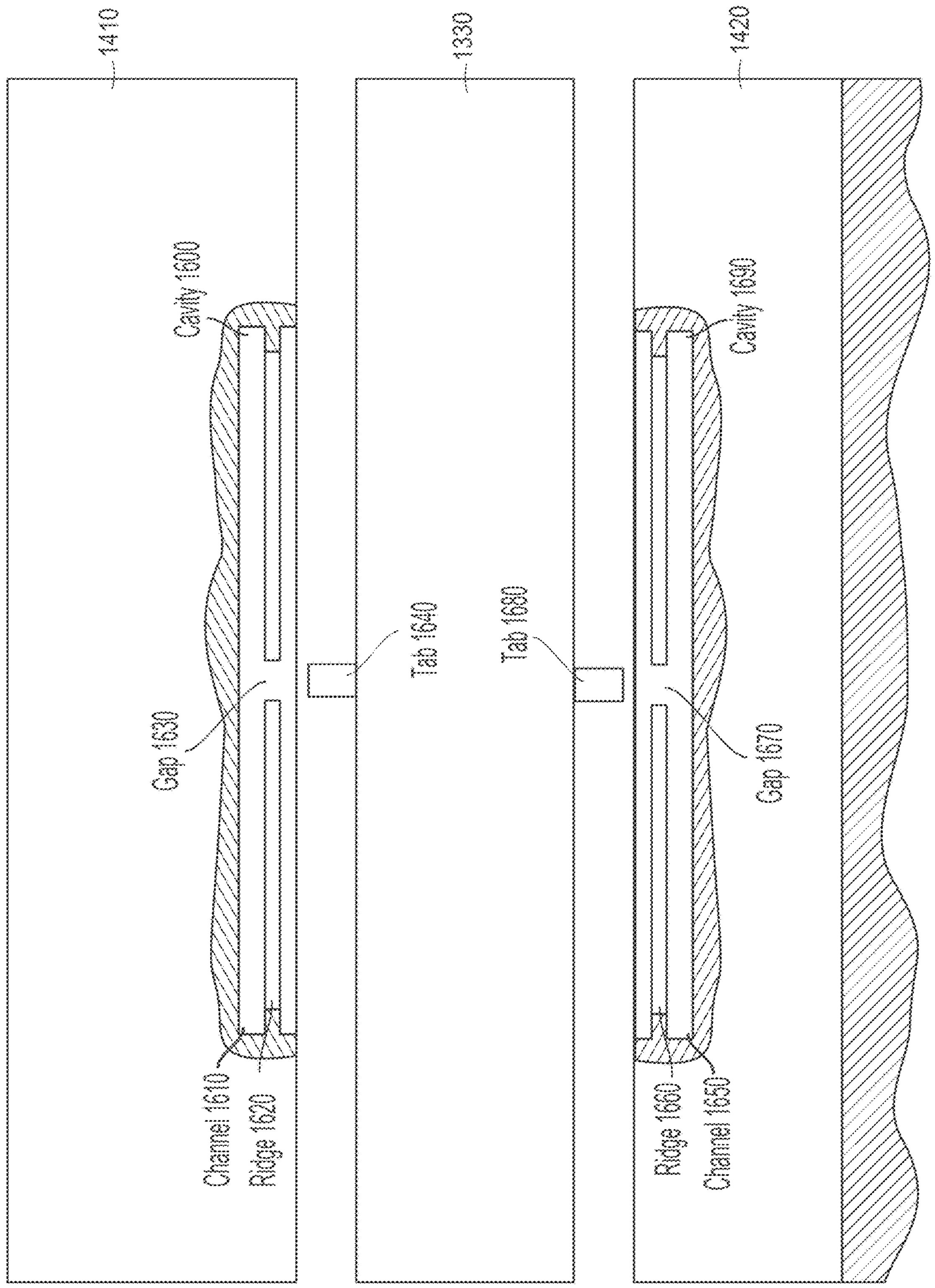
FIGS. 16A through 16C show various views of a mechanism for joining the controller module and fastener module (s) together, according to embodiments of the present disclosure.
Figure 16B:
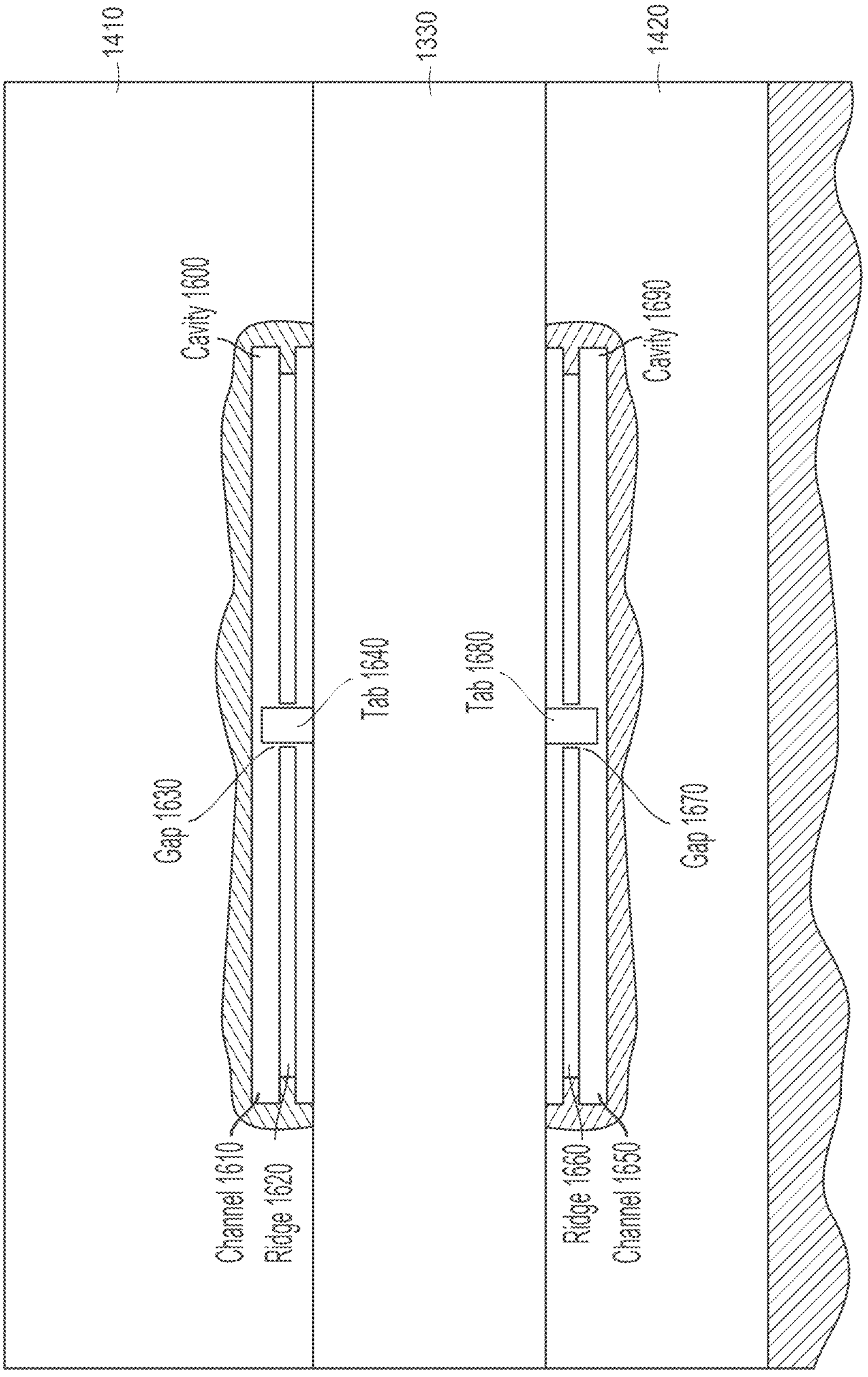
Figure 16C:
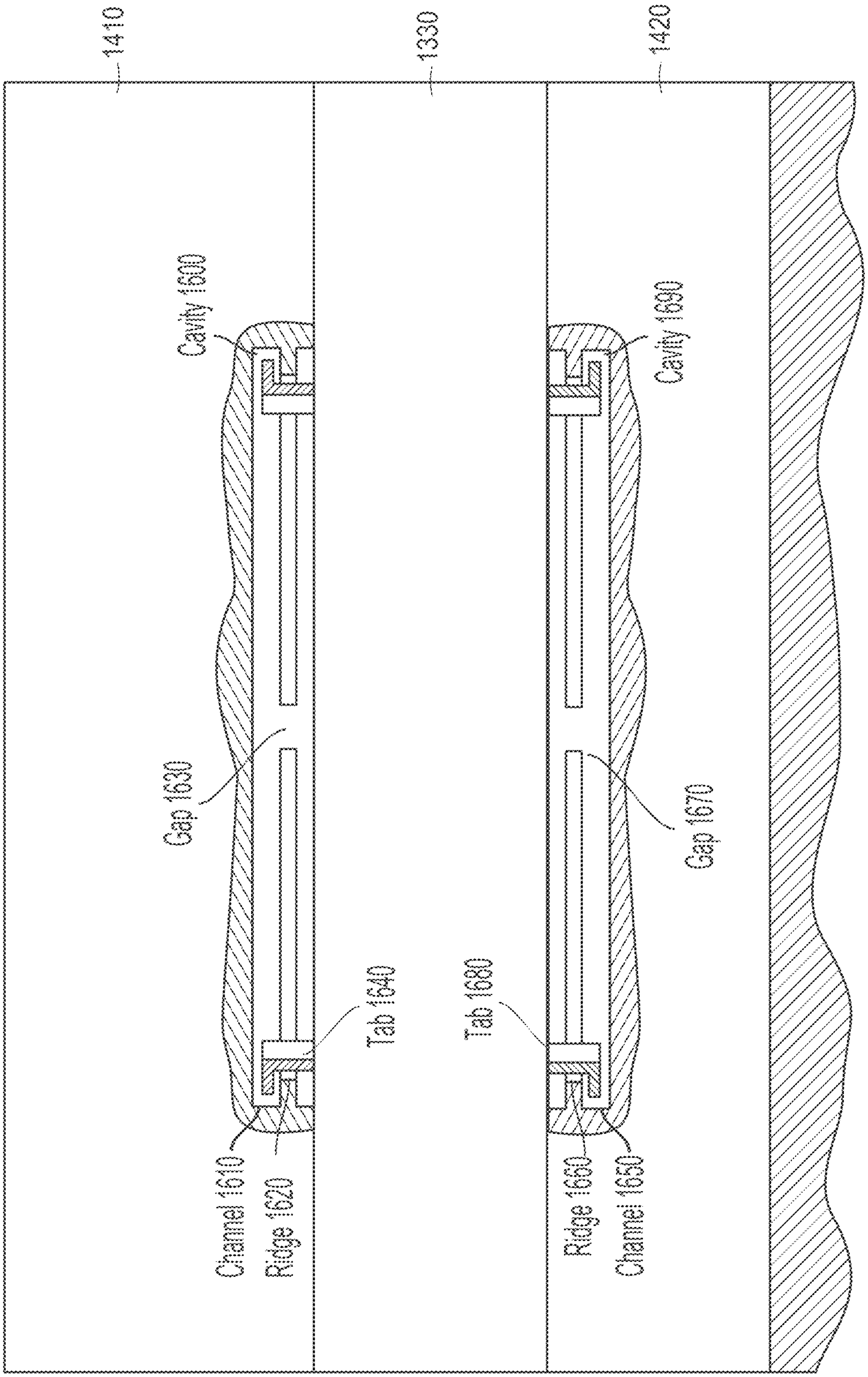

FIGS. 16A through 16C show various views of a mechanism for joining the controller module and fastener module (s) together, according to embodiments of the present disclosure. In some implementations, the modules 1410, 1330, 1420 may be joined together using a twist-lock mechanism. For example, the user may bring a fastener module 1410 and the controller module 1330 into contact with each other and rotate the fastener module 1410 with respect to the controller module 1330 to engage the twist-lock mechanism such that the modules 1410, 1330 cannot be separated unless the rotation is reversed. A mechanism may prevent rotation of the modules with respect to each other unless and until the mechanism is released. FIGS. 17A through 17D illustrate an example of an electrically actuated mechanism for locking modules together, and FIGS. 18A through 18D illustrate operation of an example of a manually actuated mechanism for locking the modules together.

FIG. 16A shows the first fastener module 1410, the controller module 1330, and the second fastener module 1420 detached from one another. A partial cross section of the first fastener module 1410 is shown to illustrate a cavity 1600 defined in the first fastener module 1410. The cavity 1600 may have a substantially cylindrical lateral inner surface extending from an opening in a bottom surface of the first fastener module 1410 to substantially flat top inner wall of the cavity (e.g., which may be parallel to the bottom surface of the first fastener module 1410). A ridge 1620 may extend from the lateral inner surface partially into the interior of the cavity 1600 to create a channel 1610. The ridge 1620 may define a gap 1630 where the lateral inner surface does not extend inward into the cavity 1600. The gap 1630 may allow for a tab 1640 extending from a top surface of the controller module 1330 to pass into the cavity 1600 and past the ridge 1620 when the controller module 1330 and the first fastener module 1410 are brought together, as shown in FIG. 16B.

The second fastener module 1420 may include a cavity 1690, channel 1650, ridge 1660, and gap 1670 that may be the same or similar to the cavity 1600, channel 1610, ridge 1620, and gap 1630, allowing a second tab 1680 of the controller module 1330 to pass into the cavity 1690 and past the ridge 1660 when the controller module 1330 and the second fastener module 1420 are brought together. In some implementations, the position of the tabs and cavities may be reversed with respect to the controller module 1330 and one or both of the fastener modules 1410, 1420. In some implementations, the controller module 1330 may include two cavities while the fastener modules 1410, 1420 include tabs, or vice versa.

FIG. 16B shows the modules 1330, 1410, 1420 brought together such that the tabs 1640, 1680 extend into the cavities 1600, 1690, respectively. The three modules need not be joined at the same time, however; rather, the controller module 1330 may be attached to the first fastener module 1410 in a first operation and the controller module 1330 may be attached to the second fastener module 1420, or vice-versa. When the modules are in the relative positions shown in FIG. 16B, however, the modules are not locked together may still be separated. The user may lock the modules together by twisting them; that is, by rotating one with respect to the other to, for example, move the tab 1640 such that it engages with the ridge 1620, as shown in FIG. 16C.

In FIG. 16C, the first faster module 1410 has been rotated with respect to the controller module 1330 such that the tab 1640 has engaged with the ridge 1620. The ridge 1620 and the tab 1640 may be configured to create a mechanical interference when they are engaged such that first fastener module 1410 cannot be separated from the controller module 1330 by an outward force alone; rather, the modules must be rotated with respect to each other to align the tab 1640 with the gap 1630 (and similarly for the tab 1680 and the ridge 1660). As can be appreciated, in various implementations, the modules may be configured with any number of tabs and corresponding gaps. The tabs and ridge may be engaged by as little as a few degrees of rotation to half a turn or more. In some implementations, the modules may be tapped and/or threaded to enable them to screw together in a manner similar to a nut and a bolt. In some implementations, modules may be joined by sliding laterally with respect to each other (e.g., in a direction parallel to the facing surfaces of the modules). In some cases, the modules may be joined by inserting a protrusion of one module into the cavity of the other, where one or more plungers are extended into the cavity and into the protrusion to prevent separation of the modules unless and until the plungers are retracted. Various means of preventing rotational and/or lateral movement of the modules with respect to each other are illustrated in FIGS. 17A through 17D and 18A through 18D.

Figure 17A:
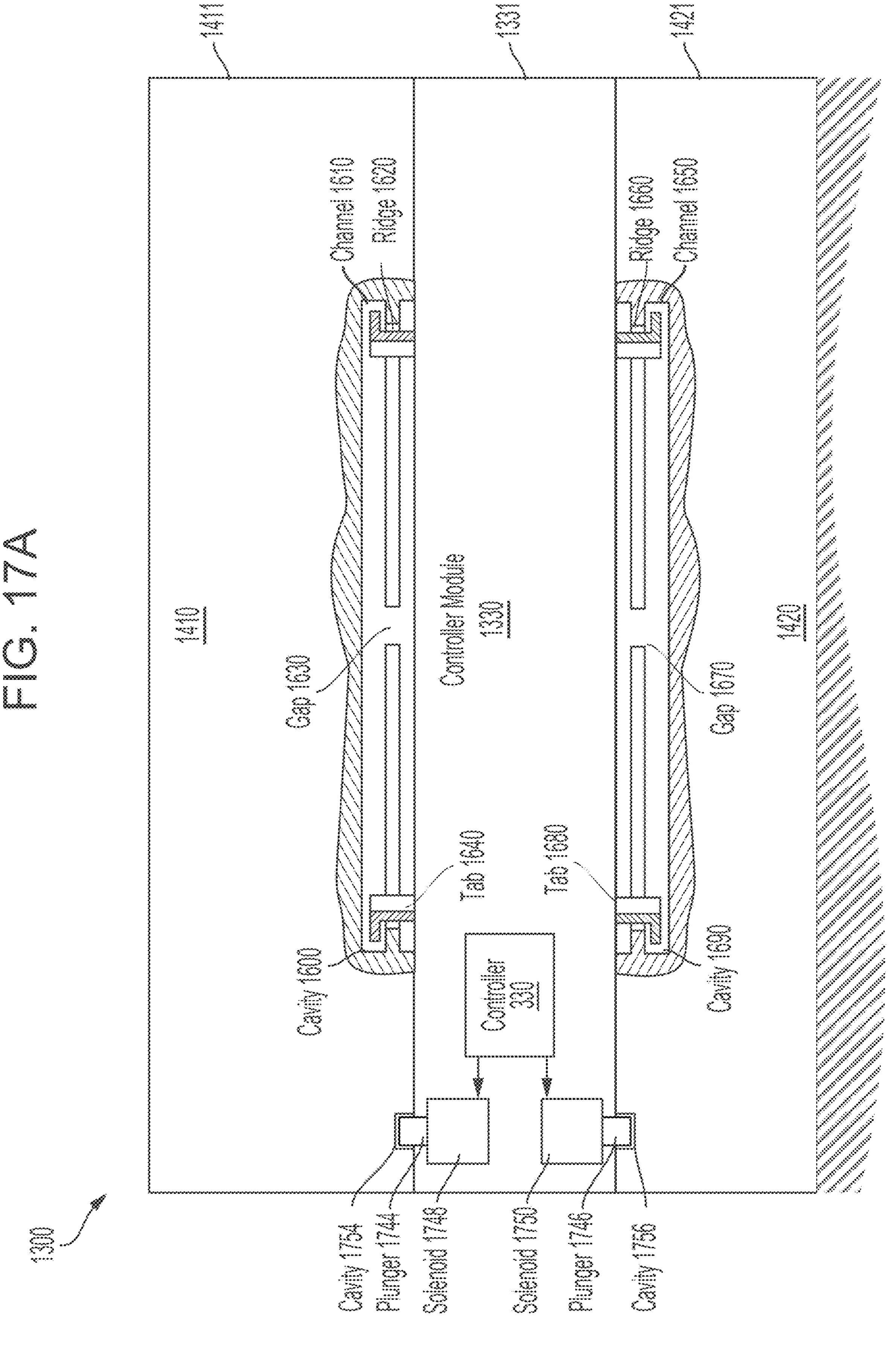
FIGS. 17A through 17D illustrate operation of an example of an electrically actuated mechanism for locking the controller module and fastener module(s) together, according to embodiments of the present disclosure.
Figure 17B:
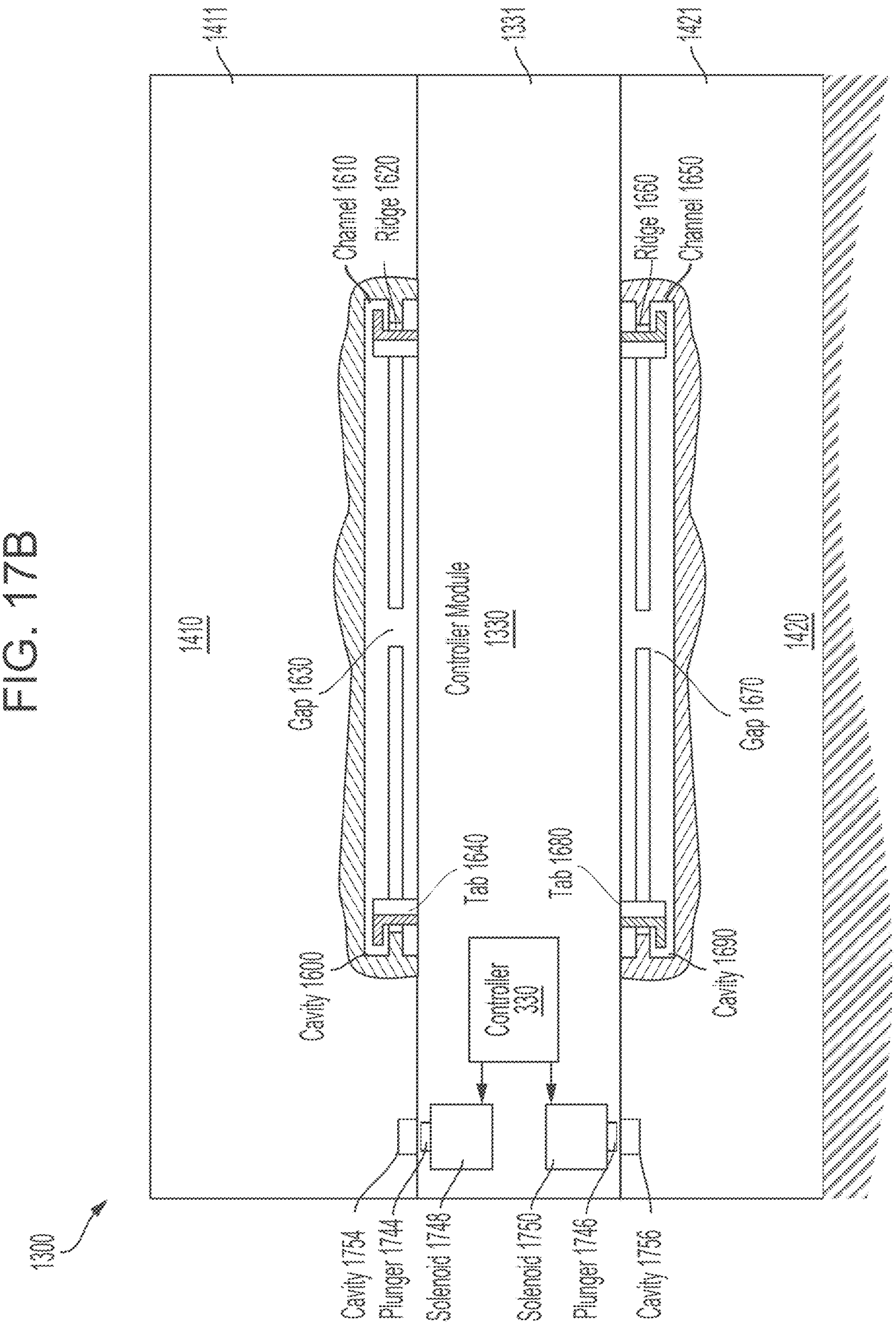

FIGS. 17A through 17D illustrate operation of an example of an electrically actuated mechanism for locking the controller module 1330 and fastener module(s) 1410 and 1420 together, according to embodiments of the present disclosure. The electrically actuated mechanism(s) may prevent rotational and/or lateral movement of the modules with respect to each other until released by the controller 330. The controller module 1330 may include a solenoid 1748 having a plunger 1744 configured to engage with a physical feature defined in and/or on a housing 1411 and/or 1421. The physical feature may be, for example a cavity, protrusion, edge, etc. For example, the solenoid 1748 may extend the plunger 1744 into a cavity 1754 of the first fastener module 1410 when the modules are to be locked together. The solenoid 1748 may be fixed with respect to a housing 1331. The plunger 1744 may extend out of the housing 1331 and into the cavity 1754 when in a rest state of the solenoid 1748 (e.g., no current passing through the wires of the solenoid). When activated (e.g., by a current passing through the wires of the solenoid), the plunger 1744 may retract from the cavity 1754. The solenoid 1748, etc., may be positioned outwards from the center of the first fastener module 1410 and/or controller module 1330 (e.g., wherein the center substantially corresponds to an axis of rotation), thus allowing it to prevent rotational movement of the first fastener module 1410 with respect to the controller module 1330. Upon verifying an electronic signal, the controller 330 may generate an actuation signal (e.g., an electric current and/or voltage) to actuate the solenoid 1748 to retract the plunger 1744, removing it from the cavity 1754 as shown in FIG. 17B. A second solenoid 1750 and plunger 1746 may operate similarly with respect to a second cavity 1756 of the second fastener module 1420. In some implementations, one or both of the cavities 1754 or 1756 may be defined in the housing 1411 or 1421 of the respective fastener module 1410 or 1420. In some implementation, one or both of the cavities 1754 or 1756 may be modified with and/or replaced by a protrusion from the housing 1411 or 1421. The plunger 1744 or 1746 may engage with an edge of the protrusion in a manner that creates a mechanical interference that prevents lateral and/or rotational movement of the fastener module 1410 or 1420 with respect to the controller module 1330. Additionally or alternatively, one or both of the plungers 1744 or 1746 may be modified and/or replaced with other movable components such as a hook, hinged plate, etc. configured to engage with the cavity/protrusion.

In another example, the controller module 1330 may include an electromagnet and/or permanent magnet configured to attract a moving component from a fastener module such that it engages with a cavity or protrusion of the controller module 1330. The magnet/moving component mechanism may be similar to a solenoid/plunger mechanism; but rather than having the electromagnet and plunger in the same module, the electromagnet may be disposed within the controller module 1330 while the moving component is disposed in the fastener module 1410 and/or 1420. The moving component may be a pin, a hook (e.g., that rotates into position to catch a surface of a cavity or protrusion in the controller module 1330), a hinged plate that can rotate to engage with the cavity or protrusion, and/or take various other configurations. The moving component may be magnetic or ferromagnetic such that it is attracted by the permanent magnet or electromagnet disposed in and/or on the controller module 1330. To release the moving component and allow separation of the modules, the controller 330 may release the electromagnet or, if the moving component is attracted by a permanent magnet, the controller 330 may activate an electromagnet to counteract the attraction of the permanent magnet to release the moving component.

Figure 17C:
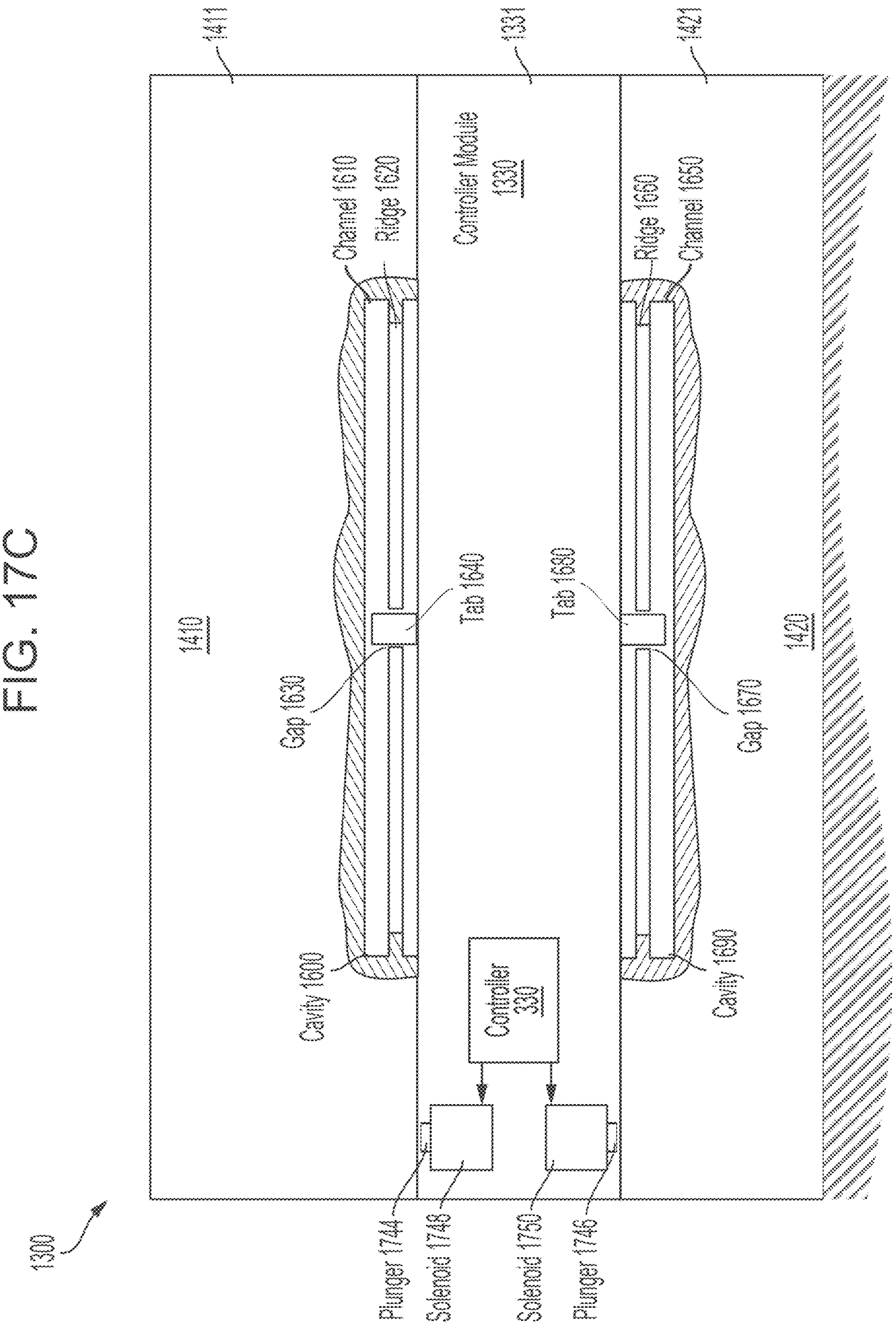
Figure 17D:
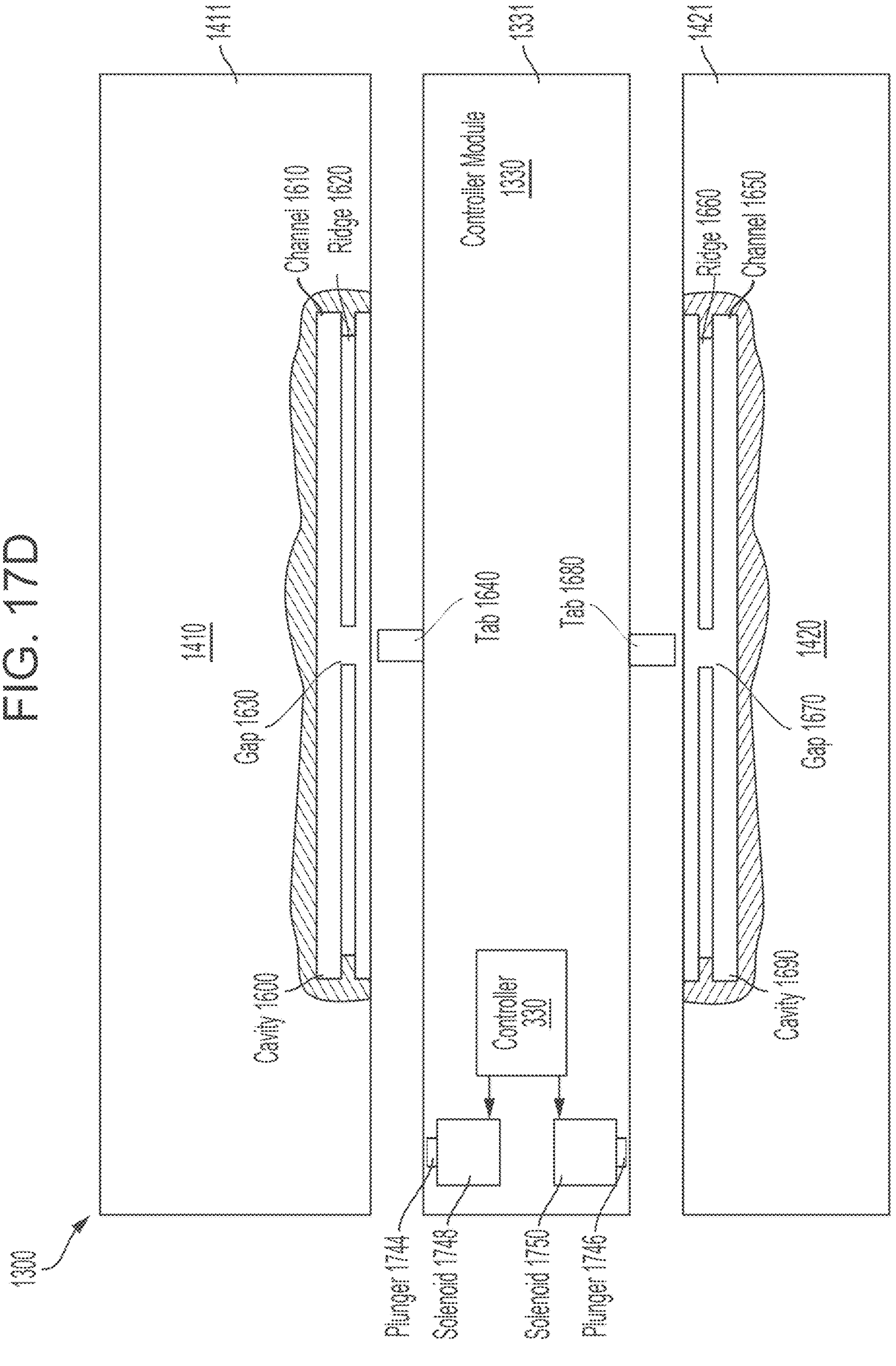

FIG. 17B shows the plungers 1744, 1746 retracted from the cavities 1754, 1756, respectively. The modules may remain attached by the mechanical interference between the tabs 1640, 1680 and the ridges 1620, 1660. With the plungers 1744, 1746 retracted, however, one or both fastener modules 1410, 1420 may be rotated with respect to the controller module 1330 to align the tabs 1640, 1680 with the gaps 1630, 1670, respectively, as shown in FIG. 17C. With the tabs 1640, 1680 and gaps 1630, 1670 so aligned, one or both fastener modules 1410, 1420 may be separated from the controller module 1330 as shown in FIG. 17D.

FIGS. 18A through 18D illustrate operation of an example of a manually actuated mechanism for locking the controller module 1330 and fastener module(s) 1410 and 1420 together, according to embodiments of the present disclosure. The pin 1844 and cavity 1754 may operate similarly to the plunger 1744 and cavity 1754 shown in FIGS. 17A through 17D in preventing rotational and/or lateral movement of the first fastener module 1410 with respect to the controller module 1330. Similarly the pin 1846 and cavity 1856 may operate similarly to the plunger 1746 and cavity 1756; in contrast to the implementations illustrated by FIGS. 17A through 17D, however, the cavity 1856 may be defined in the controller module 1330 rather than the second fastener module 1420, and the pin 1846 may extend out of the second fastener module 1420.

Figure 18A:
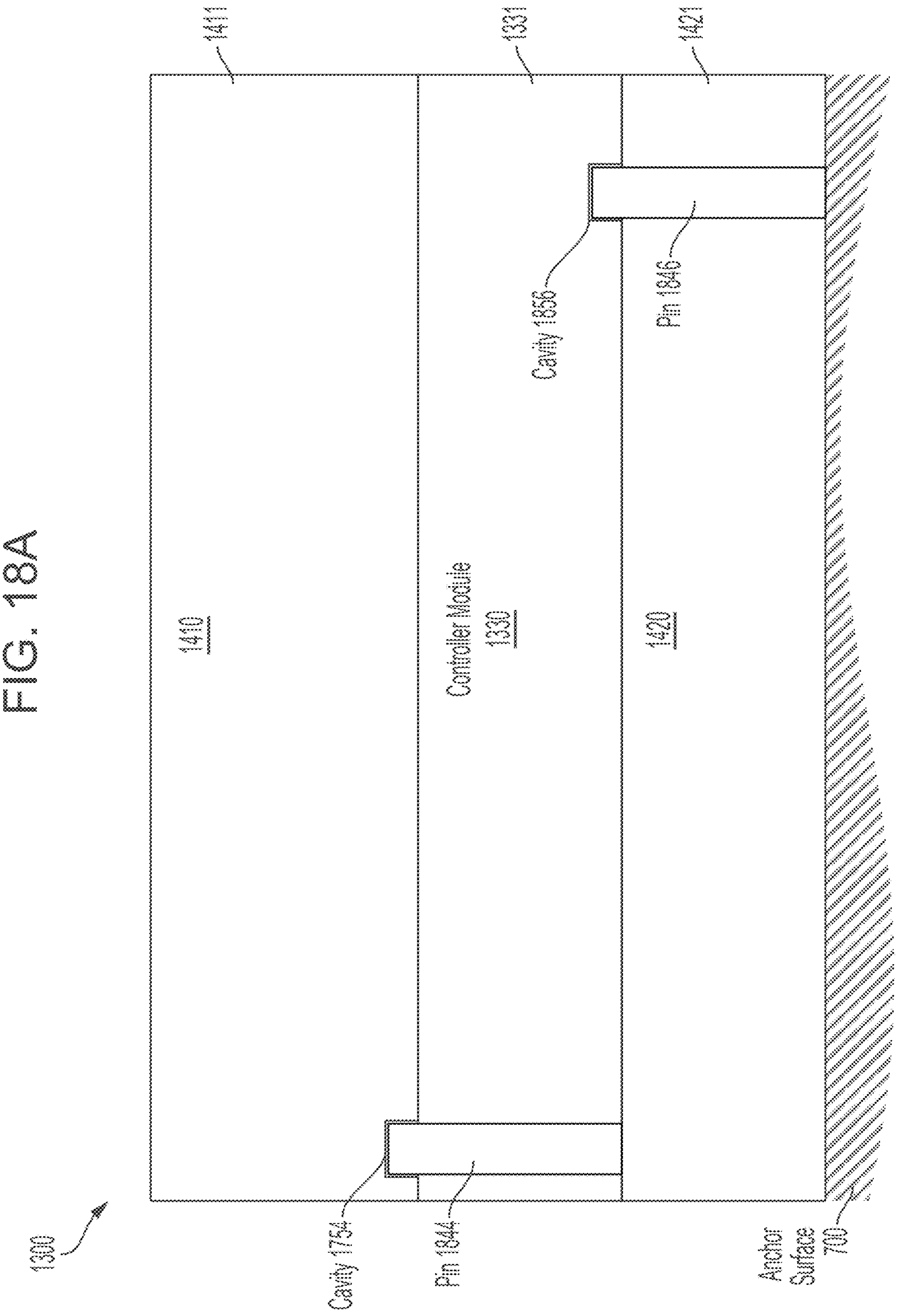
FIGS. 18A through 18D illustrate operation of an example of a manually actuated mechanism for locking the controller module and fastener module(s) together, according to embodiments of the present disclosure.
Figure 18B:
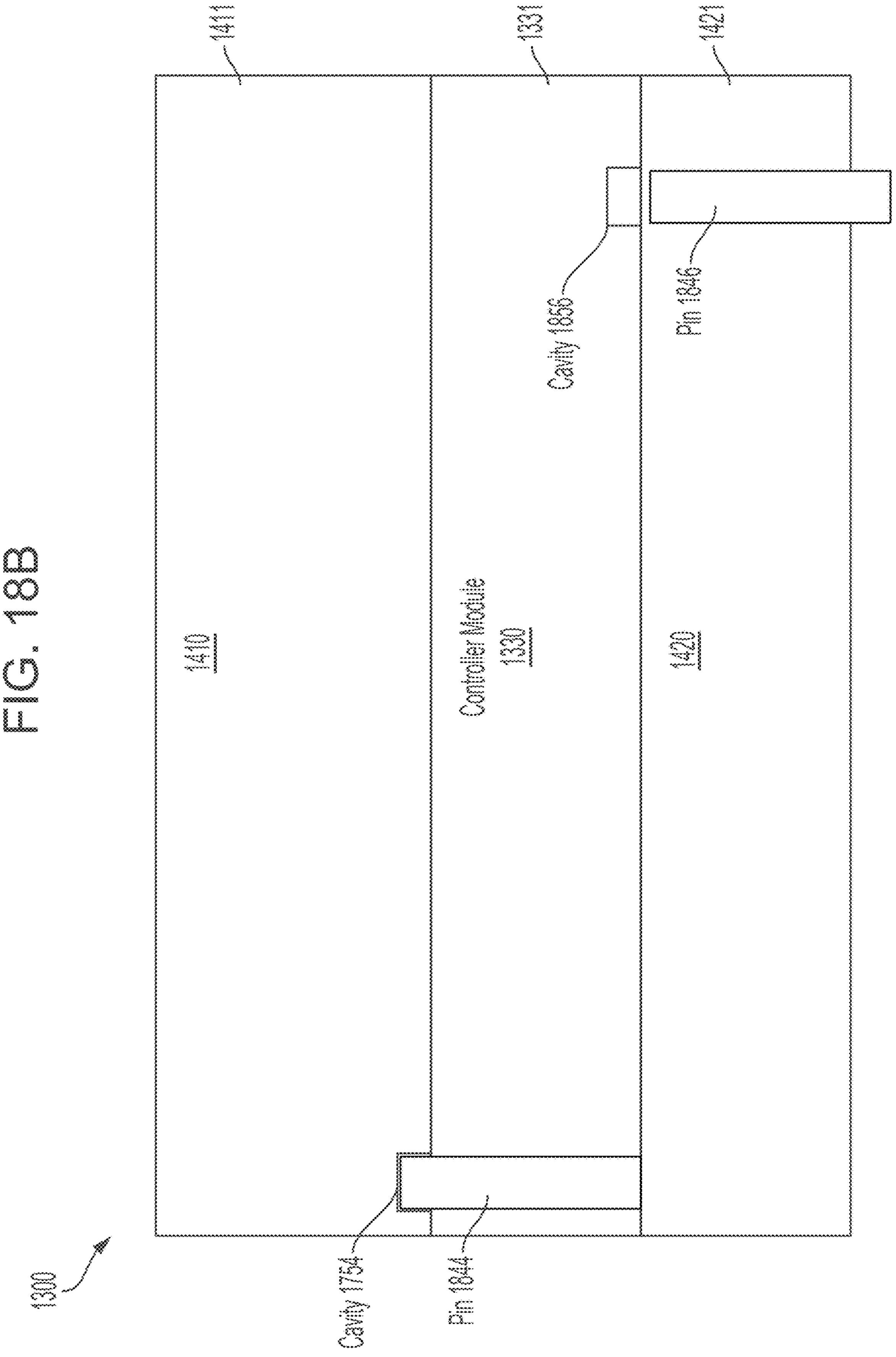

The pins 1844, 1846 may be accessed when the bottom surface of the controller module 1330 or second fastener module 1420, respectively, is exposed. When the modular security apparatus 1300 is anchored to the anchor surface 700, however, access to the pin 1846 is blocked and the pin 1846 cannot be retracted from the cavity 1856. This may prevent the controller module 1330 from being removed from the second fastener module 1420 as long as the second fastener module 1420 is anchored to the anchor surface 700. Similarly, when the second fastener module 1420 is attached to the controller module 1330, access to the pin 1844 is blocked and the pin 1844 cannot be retracted from the cavity 1754. This may prevent the first fastener module 1410 from being removed from the controller module 1330 as long as the controller module 1330 is attached to the second fastener module 1420. Therefore, to disassemble the modular security apparatus 1300, the modular security apparatus 1300 must first be unanchored from the anchor surface 700 as shown in FIG. 18B.

Figure 18C:
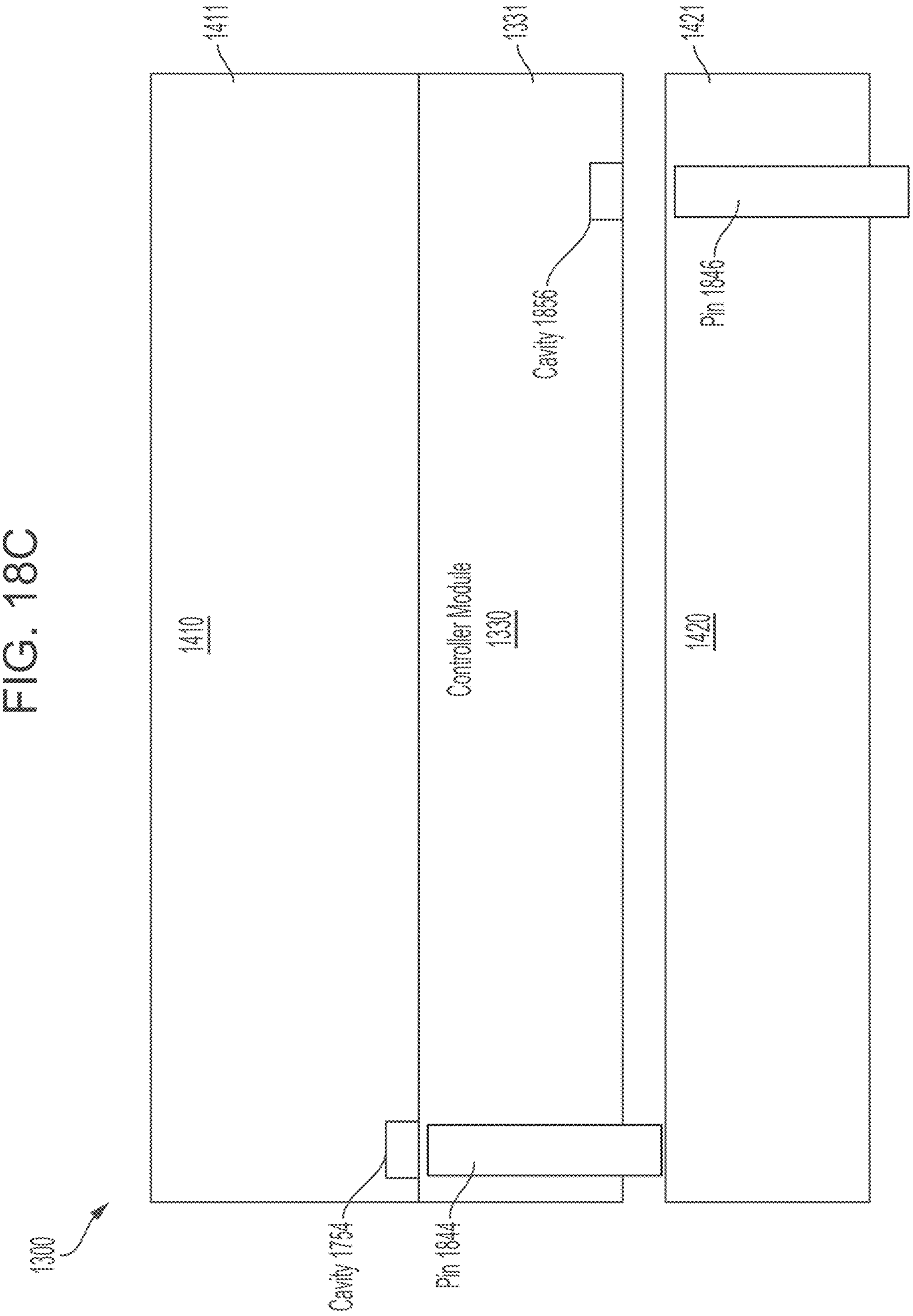
Figure 18D:
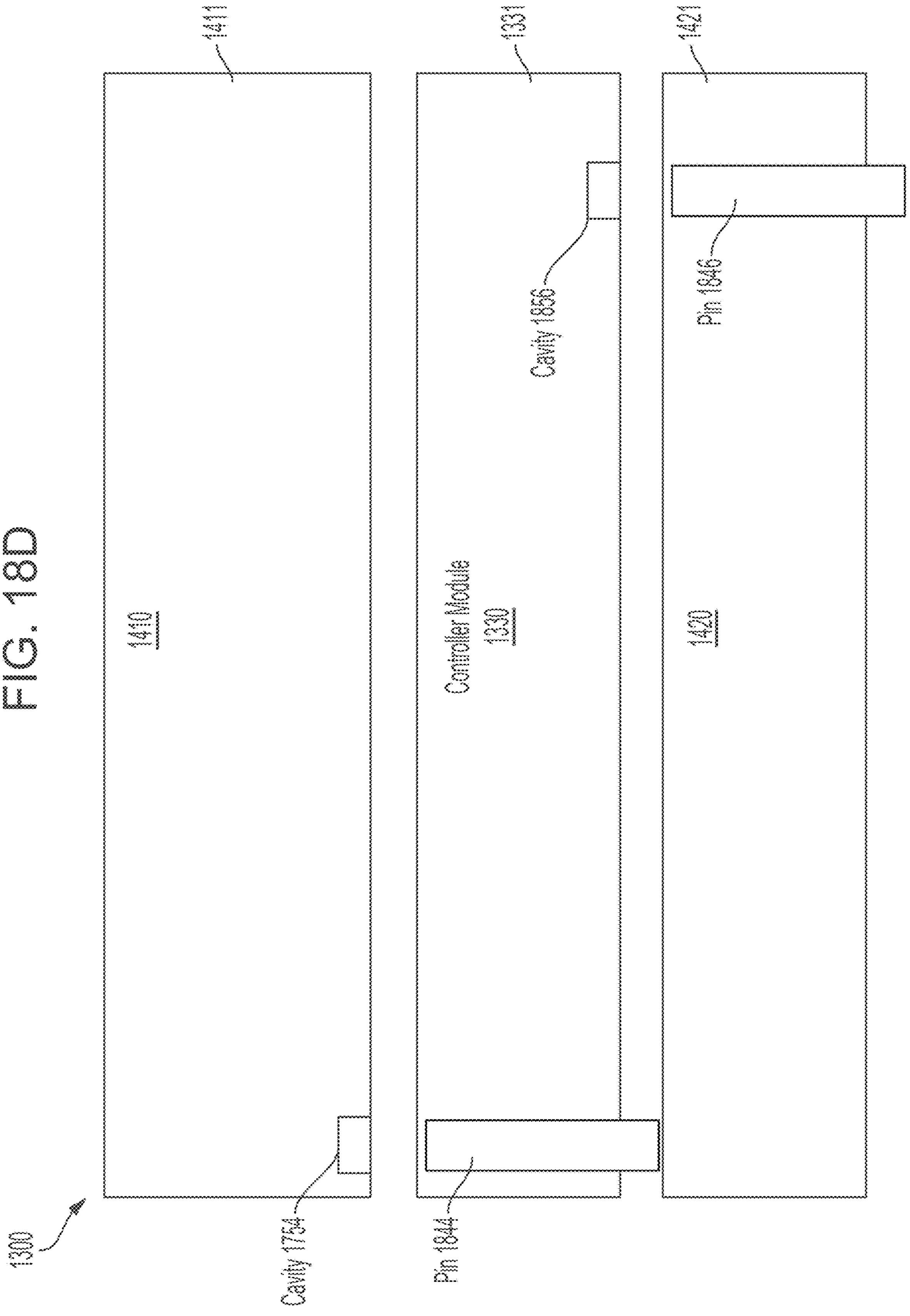

Once the modular security apparatus 1300 is unanchored, a user may access the pin 1846 and remove it from the cavity 1856. This may allow the second fastener module 1420 to be rotated with respect to the controller module 1330 and detached as shown in FIG. 18C. Once the second fastener module 1420 and the controller module 1330 have been separated, the pin 1844 become accessible and may be retracted from the cavity 1754. This may allow the first fastener module 1410 to be rotated with respect to the controller module 1330 and detached as shown in In some implementations, the modular security apparatus 1300 may secure the controller module 1330 and faster modules 1410 and/or 1420 in various other ways including the use of an electronically releasable surface treatment on one or more of the mating surfaces between the modules. For example, a surface of the controller module 1330 may include the electrically or electronically controlled barbs (e.g., similar to those discussed previously with reference to FIG. 8) that are mechanically deployed from the surface to affect the coefficient of friction that resists lateral and/or rotational sliding of the modules with respect to each other. In a first state, the controller 330 may cause the barbs to deploy from the surface(s) and increase friction to resist lateral/rotational movement. In a second state, the controller 330 may cause the barbs to retract from the surface(s) and reduce the friction to permit lateral/rotational movement. The mating surface of the fastener module 1410 and/or 1420 may also include the electronically controlled barbs and/or may include a passive surface treatment configured for robust engagement with the electronically controlled barbs when the latter are deployed.

Figure 19A:
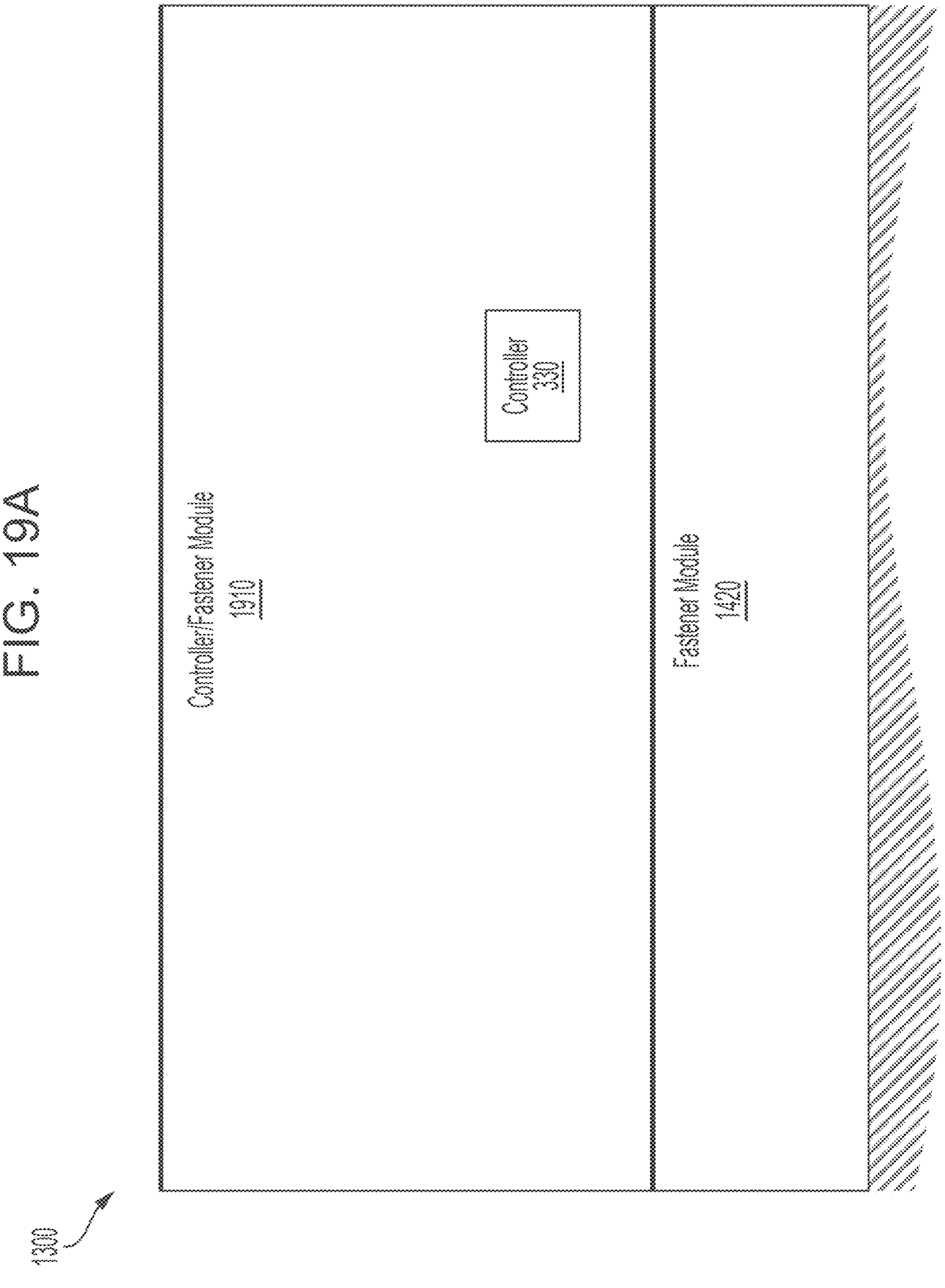
FIG. 19A illustrates a first example implementation of a two-part modular security apparatus, according to embodiments of the present disclosure.

FIG. 19A illustrate example implementations of a two-part modular security apparatus 1300, according to embodiments of the present disclosure. In a two-part implementation, the controller module may be combined with one of the fastener modules 1. In the example implementation shown in FIG. 19A, an integrated controller/fastener module 1910 can take the place of the controller module and first fastener module. The integrated controller/fastener module 1910 may include the controller 330 and/or other components of the controller module 1330 and/or first fastener modules 1410 previously described, including means for securing a device 101. The integrated controller/fastener module 1910 may attach to a second fastener module 1420, which itself may be configured to releasably anchor to an anchor surface 700 until released by the controller 330.

Figure 19B:
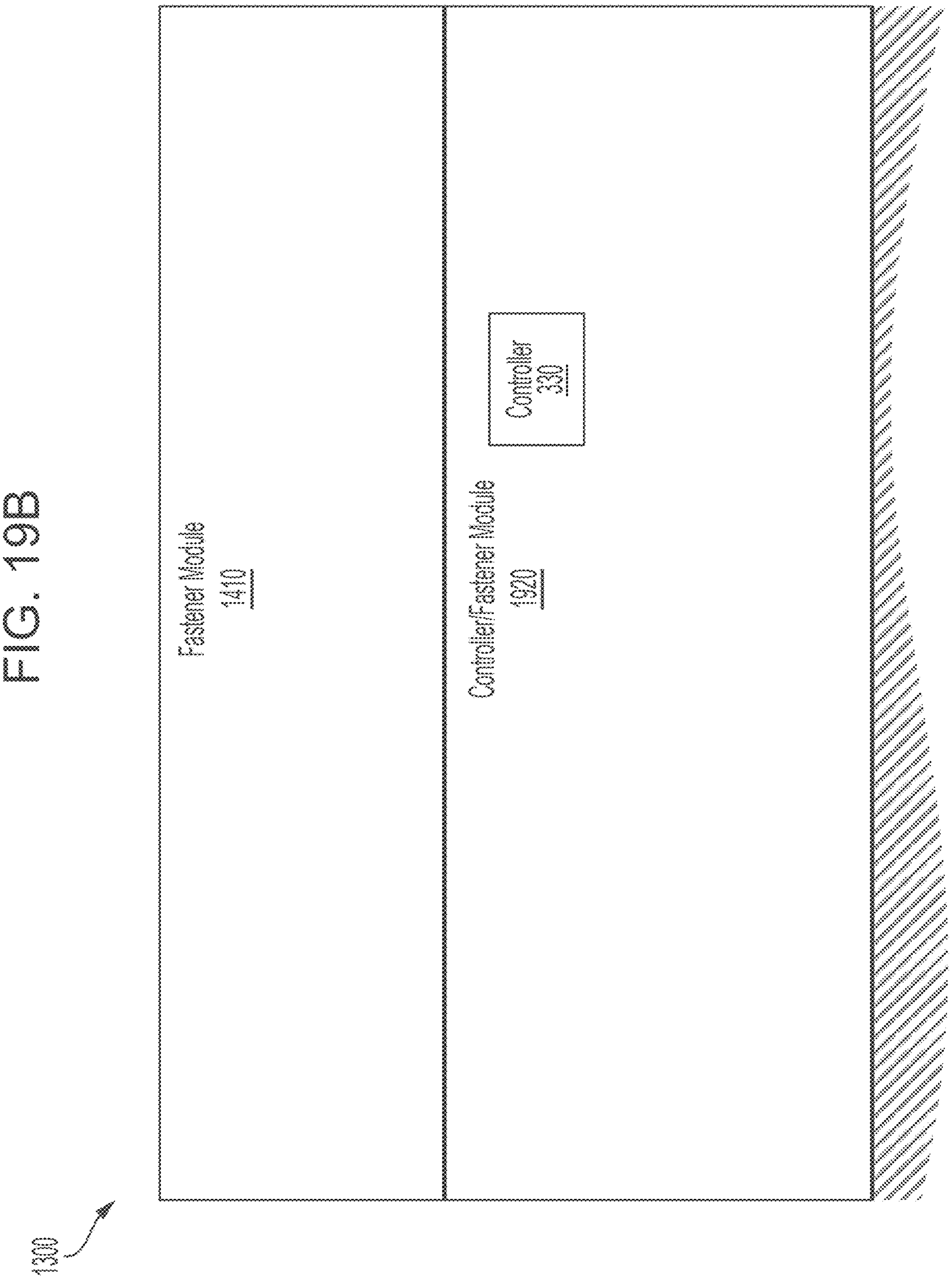
FIG. 19B illustrates a second example implementation of a two-part modular security apparatus, according to embodiments of the present disclosure

In the example shown in FIG. 19B, an integrated controller/fastener module 1920 can take the place of the controller module and second fastener module. The integrated controller/fastener module 1920 may include the controller 330 and/or other components of the controller module 1330 and/or second fastener modules 1420 previously described, including means for anchoring to an anchor surface 700. The integrated controller/fastener module 1920 may attach to a first fastener module 1410, which itself may be configured for securing a personal electronic device.

Figure 20B:
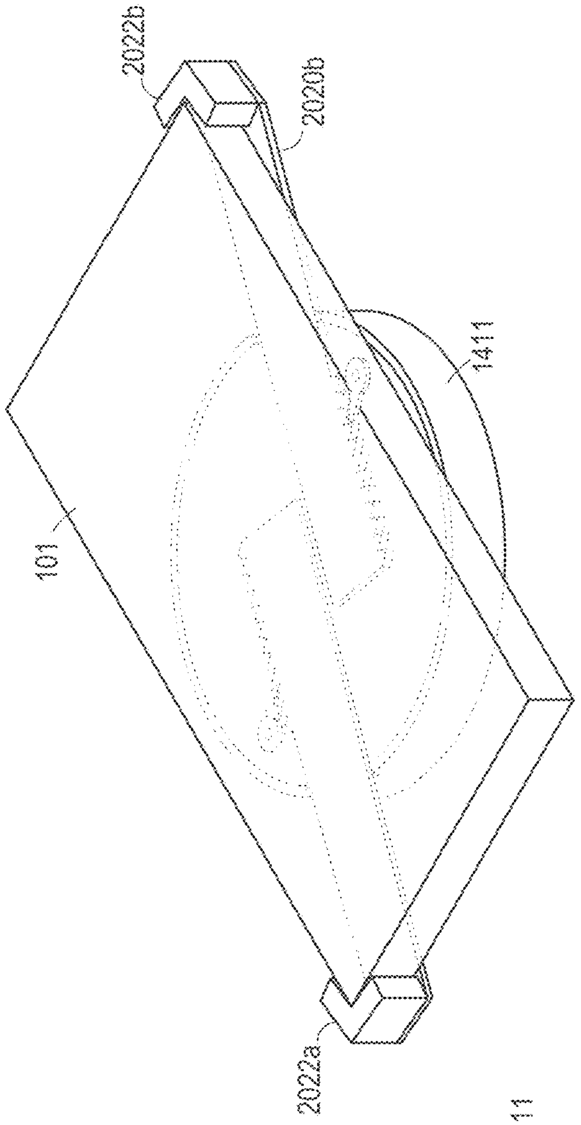
FIGS. 20A and 20B are views of a first example implementation of a fastener module configured to secure a device with electronically releasable brackets, according to embodiments of the present disclosure.
Figure 20A:
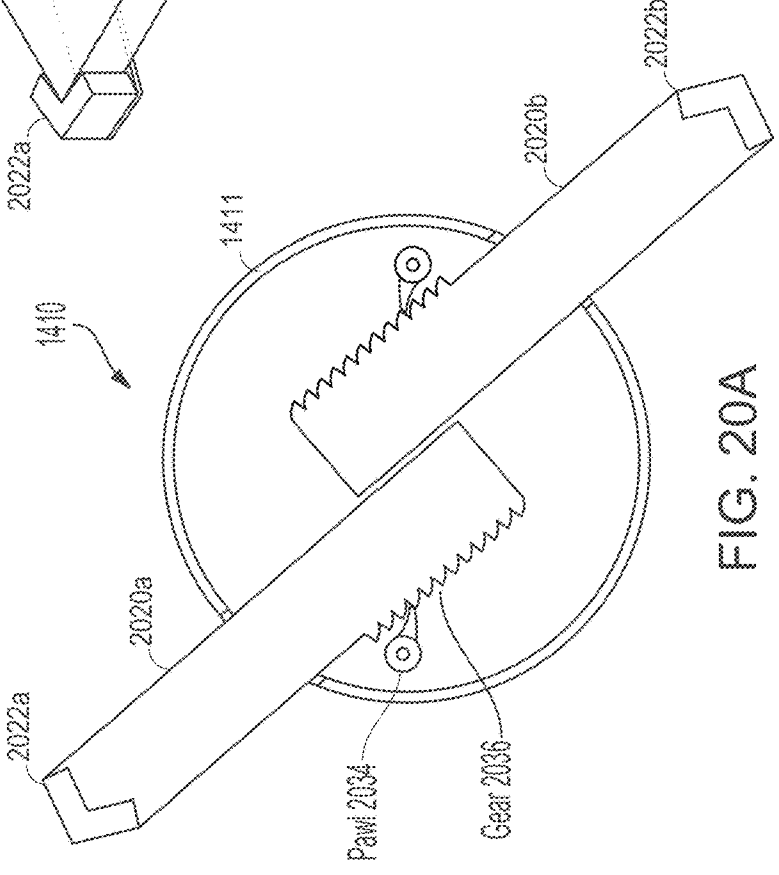

FIGS. 20A and 20B are views of a first example implementation of a fastener module 1410 configured to secure a device 101 with electronically releasable brackets 2020, according to embodiments of the present disclosure. The fastener module 1410 may include brackets 2020*a* and 2020*b* (collectively "brackets 2020") that perform a function similar to that of the cables 120 of the security apparatus 100. The brackets 2020 may include a respective hook

2022a or 2022b (collectively "hooks 2022") configured to extend around edges or corners of a device 101 to retain the device 101 securely unless and until the brackets 2020 are extended. Although FIG. 20A shows a top view of the fastener module 1410 that exposes internal components such as the brackets 2020 and pawl 2034, the housing 1411 may cover the top side of the fastener module 1410 to prevent manipulation of such internal components.

Similar to the cables 120, the brackets 2020 may protrude from the housing 1411 and be retained by a one-way locking mechanism within the housing 1411. For example, the one-way locking mechanism may include a pawl 2034 that engages with teeth of a gear 2036. This may allow a user to close the brackets 2020 around the device 101 until the device is secured by the hooks 2022. The user may release the device 101 from the fastener module 1410 (and the modular security apparatus 1300) by sending a wireless electronic signal to the modular security apparatus 1300. Upon verifying the wireless electronic signal, the controller 330 may actuate the pawl 2034 (e.g., by sending an electric signal to a solenoid, motor, etc. connected to the pawl 2034) to cause the pawl 2034 to disengage from the gear 2036 and allow the bracket 2020 to move, and a corner of the device 101 to be removed from the hook 2022. In some implementations, both brackets 2020 may be configured with a one-way locking mechanism. In some implementations, one of the brackets 2020 may be fixed while the other may be electronically releasable using a one-way locking mechanism. In some implementations, one or more of the brackets 2020 may be electronically releasable by other means; for example, using a solenoid and plunger to engage with the gears in a manner similar to the mechanism that locks the spool/pully 332 illustrated in FIG. 3C and described previously. In some implementations, the fastener module 1410 may include various numbers of brackets 2020. In some implementations, the brackets 2020 may be arranged such that they slide past each other as shown in FIGS. 20A and 20B. In some implementations, one bracket may be partially or wholly nested within the other; for example, in a manner similar to the rulers of a slide rule. One or both of the brackets may define gears 2036, holes, and/or other mechanical features that may be engaged by an electronically releasable locking mechanism such as the pawl 2034, a solenoid and plunger, pin, clamp, etc.

Figure 21B:
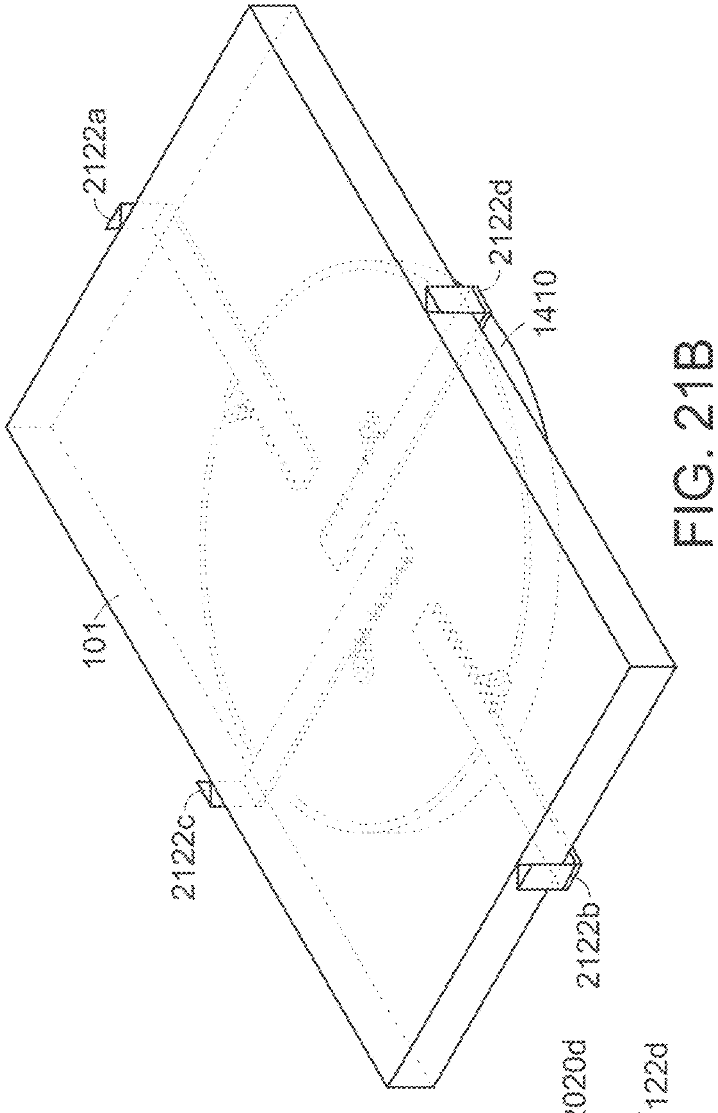
FIGS. 21A and 21B are views of a second example implementation of a fastener module configured to secure a device with electronically releasable brackets, according to embodiments of the present disclosure.
Figure 21A:
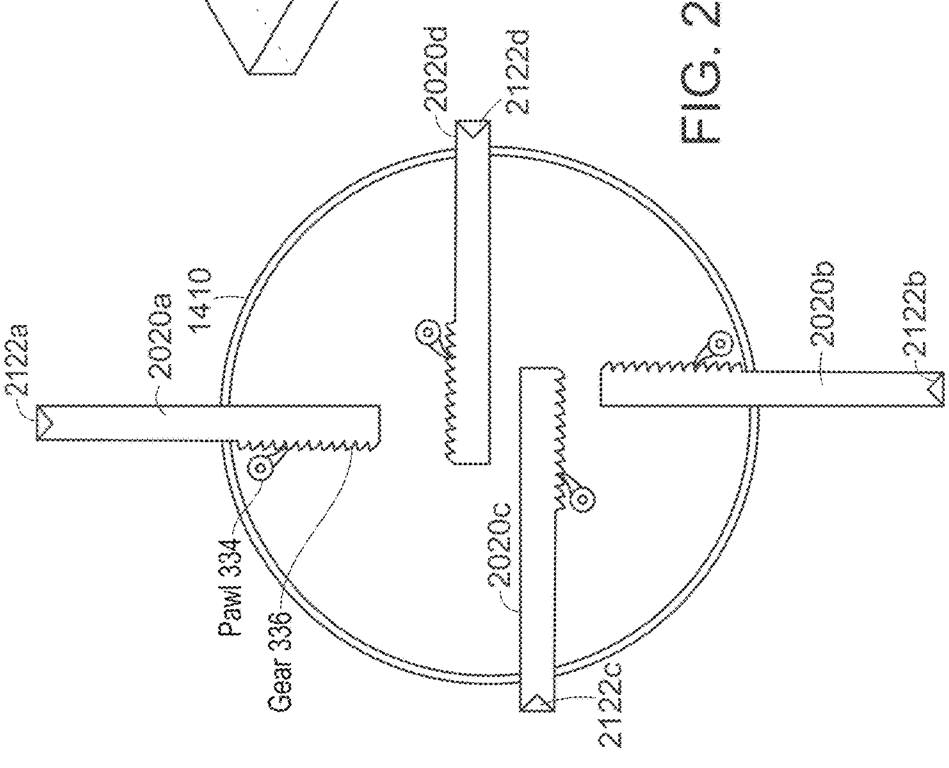

FIGS. 21A and 21B are views of a second example implementation of a fastener module configured to secure a portable item with electronically releasable brackets, according to embodiments of the present disclosure. This example implementation includes four brackets 2020a, 2020b, 2020c, 2020d (collectively "brackets 2020"). The brackets 2020 may include hooks 2122a, 2122b, 2122c, and 2122d (collectively "hooks 2122") configured to retain an edge of a device 101 (e.g., rather than the corners as illustrated in FIGS. 20A and 20B); however, implementations of the modular security apparatus 1300 are not so limited, and in some implementations the hooks 2122 may be configured to retain corners alternatively or in addition to retaining edges of the device 101. Similar to the example implementation shown in FIGS. 20A and 20B, the housing 1411 may cover the top side of the fastener module 1410 to prevent manipulation of internal components. One or more of the brackets 2020 may be retained by an electronically releasable locking mechanism including the pawl 2034 and gear 2036 and/or one of the other electronically releasable locking mechanisms described herein. In some implementations, one or more of the brackets 2020 (e.g., one per axis) may be fixed while the opposing bracket 2020 is electronically releasable.

It is to be appreciated that embodiments of the systems and methods discussed herein are not limited in application to the details of construction and the arrangement of components set forth in this description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Example Implementations

Item 1. A modular electronically releasable security apparatus comprising:
- a first fastener module having a first locking mechanism, the first fastener module configured to releasably secure a portable item using the first locking mechanism;
- a first electromechanical component configured to actuate the first locking mechanism;
- a controller module removably attached to the first fastener module and having:
  - one or more antennas, and
  - one or more processors configured to, upon verification of a first wireless electronic signal received by the one or more antennas, actuate the first electromechanical component to release the first locking mechanism; and
- a second electromechanical component; and
- a second fastener module removably attached to the controller module and configured to releasably anchor to a fixed object, wherein the one or more processors are further configured to, upon verification of a second wireless electronic signal received by the one or more antennas, actuate the second electromechanical component to release the second fastener module from the fixed object.

Item 2. The modular electronically releasable security apparatus of item 1, further comprising:

a first housing corresponding to the first fastener module;

a second housing corresponding to the controller module; and a third electromechanical component having a first stationary element having a position fixed with respect to the second housing, and a first movable element arranged to engage with a feature defined in the first housing, thereby preventing movement of the first fastener module with respect to the controller module in at least a first direction.

Item 3. The modular electronically releasable security apparatus of item 2, the one or more processors further configured to, upon verification of a third wireless electronic signal, actuate the third electromechanical component to release the first fastener module, thereby allowing movement of the first fastener module with respect to the controller module in the first direction.

Item 4. The modular electronically releasable security apparatus of item 3, wherein moving the first fastener module with respect to the controller module in the first direction allows the controller module to be detached from the first fastener module.

Item 5. The modular electronically releasable security apparatus of item 4 wherein the first direction is a rotational direction.

Item 6. The modular electronically releasable security apparatus of item 1, further comprising:

a first housing corresponding to the controller module; and a third electromechanical component having a first stationary element having a position fixed with respect to the first housing, and a first movable element arranged to engage with a feature defined in a second housing of the second fastener module, thereby preventing movement of the second fastener module with respect to the controller module in at least a first direction.

Item 7. The modular electronically releasable security apparatus of item 5, the one or more processors further configured to, upon verification of a third wireless electronic signal, actuate the third electromechanical component to release the second fastener module, thereby allowing movement of the second fastener module with respect to the controller module in the first direction.

Item 8. The modular electronically releasable security apparatus of item 7, wherein moving the second fastener module with respect to the controller module in the first direction allows the second fastener module to be detached from the controller module.

Item 9. The modular electronically releasable security apparatus of item 8 wherein the first direction is a rotational direction.

Item 10. The modular electronically releasable security apparatus of item 1, further comprising:

a first housing corresponding to the first fastener module;

a second housing corresponding to the controller module and having a first surface facing the first housing and a second surface, opposite the first surface, facing the second fastener module; and a first pin, movable with respect to the second housing, arranged such that a first end of the first pin may extend out of the second housing and engage with the first housing, thereby preventing movement of the first fastener module with respect to the controller module in at least a first direction.

Item 11. The modular electronically releasable security apparatus of item 10, the controller module further comprising:

an opening defined in the second surface allowing access to a second end of the first pin such that the first pin may be disengaged from the first housing, thereby allowing movement of the first fastener module with respect to the controller module in the first direction.

Item 12. The modular electronically releasable security apparatus of item 11, wherein moving the first fastener module with respect to the controller module in the first direction allows the controller module to be detached from the first fastener module.

Item 13. The modular electronically releasable security apparatus of item 12 wherein the first direction is a rotational direction.

Item 14. The modular electronically releasable security apparatus of item 11, wherein the second fastener module, when attached to the controller module, blocks access to the second end.

Item 15. The modular electronically releasable security apparatus of item 1, further comprising:

a first housing corresponding to the controller module;

a second housing corresponding to the second fastener module and having a first surface facing the controller module and a second surface, opposite the first surface; and a first pin, movable with respect to the second housing, arranged such that a first end of the first pin may extend out of the second housing and engage with the first housing, thereby preventing movement of the controller module with respect to the second fastener module in at least a first direction.

Item 16. The modular electronically releasable security apparatus of item 15, the controller module further comprising:

an opening defined in the second surface allowing access to a second end of the first pin such that the first pin may be disengaged from the first housing, thereby allowing movement of the controller module with respect to the second fastener module in the first direction.

Item 17. The modular electronically releasable security apparatus of item 16, wherein moving the second fastener module with respect to the controller module in the first direction allows the second fastener module to be detached from the controller module.

Item 18. The modular electronically releasable security apparatus of item 17 wherein the first direction is a rotational direction.

Item 19. The modular electronically releasable security apparatus of item 16, wherein the second fastener module, when anchored to the fixed object, blocks access to the second end.

Item 20. The modular electronically releasable security apparatus of item 1, further comprising:

a first housing corresponding to the first fastener module; and a first cable having a first end retained by or within the first housing and a second end passing through a first opening defined in the first housing, wherein the first locking mechanism is configured to receive the second end of the first cable, thereby forming a first loop of the first cable external to the first housing.

Item 21. The modular electronically releasable security apparatus of item 20, the first fastener module further comprising:

a second cable having a third end retained by or within the first housing and a fourth end passing through a second opening defined in the first housing, thereby forming a second loop of the second cable external to the first housing.

Item 22. The modular electronically releasable security apparatus of item 21, wherein the first loop wraps around a first portion of the portable item and the second loop wraps around a second portion of the portable item, thereby securing the portable item.

Item 23. The modular electronically releasable security apparatus of item 22, wherein releasing the first locking mechanism allows the movement of the first cable through the first opening to increase a length of the first cable that forms the first loop.

Item 24. The modular electronically releasable security apparatus of item 1, further comprising:

a first housing corresponding to the first fastener module; and a first bracket having a first end configured to retain the portable item and a second end passing through a first opening defined in the first housing, wherein the first locking mechanism is configured to receive the second end of the first cable, thereby forming a first loop of the first cable external to the first housing.

Item 25. The modular electronically releasable security apparatus of item 24, the first fastener module further comprising:

a second bracket having a third end configured to retain the portable item and a fourth end retained by or within the first housing.

Item 26. The modular electronically releasable security apparatus of item 25, wherein the first bracket engages with a first portion of the portable item and the second bracket engages with a second portion of the portable item, thereby securing the portable item.

Item 27. The modular electronically releasable security apparatus of item 26, wherein releasing the first locking mechanism allows the movement of the first bracket through the first opening to increase a distance between the first end and the third end.

Item 28. A method comprising:

receiving a first wireless electronic signal using one or more antennas of a controller module, the controller module releasably attached to a first fastener module;

verifying the first wireless electronic signal;

in response to verifying the first wireless electronic signal, causing a first electromechanical component to release a first locking mechanism of the first fastener module, the first locking mechanism securing a portable item to the first fastener module; and in response to verifying at least one of the first wireless electronic signal or a second wireless electronic signal received by the one or more antennas, actuating a second electromechanical component to release the first fastener module, thereby allowing movement of the first fastener module in at least a first direction with respect to the controller module, wherein moving the first fastener module in the first direction with respect to the controller module releases the first fastener module from the controller module.

Item 29. The method of item 28, further comprising:

in response to verifying at least one of the first wireless electronic signal, the second wireless electronic signal, or a third wireless electronic signal received by the one or more antennas, actuating a third electromechanical component to release a second fastener module, thereby allowing movement of the second fastener module in at least a second direction with respect to the controller module, wherein moving the second fastener module in the second direction with respect to the controller module releases the second fastener module from the controller module.

Item 30. The method of item 28, further comprising:

in response to verifying at least one of the first wireless electronic signal, the second wireless electronic signal, or a third wireless electronic signal received by the one or more antennas, actuating a third electromechanical component to release an anchoring mechanism of a second fastener module releasably attached to the controller module, the anchoring mechanism securing the second fastener module to a fixed object.

Item 31. The method of item 28, further comprising:

in response to verifying at least one of the first wireless electronic signal, the second wireless electronic signal, or a third wireless electronic signal received by the one or more antennas, sending a fourth wireless electronic signal indicating an actuation state of at least one of the first electromechanical component or the second electromechanical component.

Item 32. The method of item 28, further comprising:

detecting movement of the controller module using a sensor; and in response to detecting the movement, sending a third wireless electronic signal indicating potential tampering.

What is claimed is:

1. A modular electronically releasable security apparatus comprising:

a first fastener module having a first locking mechanism, the first fastener module configured to releasably secure a portable item using the first locking mechanism;

a first electromechanical component configured to actuate the first locking mechanism;

a controller module removably attached to the first fastener module and having:

one or more antennas, and one or more processors configured to, upon verification of a first wireless electronic signal received by the one or more antennas, actuate the first electromechanical component to release the first locking mechanism;

a second electromechanical component; and a second fastener module removably attached to the controller module and configured to releasably anchor to a fixed object, wherein the one or more processors are further configured to, upon verification of a second wireless electronic signal received by the one or more antennas, actuate the second electromechanical component to release the second fastener module from the fixed object.

2. The modular electronically releasable security apparatus of claim 1, further comprising:

a first housing corresponding to the first fastener module;

a second housing corresponding to the controller module; and a third electromechanical component having a first stationary element having a position fixed with respect to the second housing, and a first movable element arranged to engage with a feature defined in the first housing, thereby preventing movement of the first fastener module with respect to the controller module in at least a first direction.

3. The modular electronically releasable security apparatus of claim 2, the one or more processors further configured to, upon verification of a third wireless electronic signal, actuate the third electromechanical component to release the first fastener module, thereby allowing movement of the first fastener module with respect to the controller module in the first direction.

4. The modular electronically releasable security apparatus of claim 3, wherein moving the first fastener module with respect to the controller module in the first direction allows the controller module to be detached from the first fastener module.

5. The modular electronically releasable security apparatus of claim 1, further comprising:

a first housing corresponding to the controller module; and a third electromechanical component having a first stationary element having a position fixed with respect to the first housing, and a first movable element arranged to engage with a feature defined in a second housing of the second fastener module, thereby preventing movement of the second fastener module with respect to the controller module in at least a first direction.

6. The modular electronically releasable security apparatus of claim 5, the one or more processors further configured to, upon verification of a third wireless electronic signal, actuate the third electromechanical component to release the second fastener module, thereby allowing movement of the second fastener module with respect to the controller module in the first direction.

7. The modular electronically releasable security apparatus of claim 6, wherein moving the second fastener module with respect to the controller module in the first direction allows the second fastener module to be detached from the controller module.

8. The modular electronically releasable security apparatus of claim 1, further comprising:

a first housing corresponding to the first fastener module;

a second housing corresponding to the controller module and having a first surface facing the first housing and a second surface, opposite the first surface, facing the second fastener module; and a first pin, movable with respect to the second housing, arranged such that a first end of the first pin may extend out of the second housing and engage with the first housing, thereby preventing movement of the first fastener module with respect to the controller module in at least a first direction.

9. The modular electronically releasable security apparatus of claim 8, the controller module further comprising:

an opening defined in the second surface allowing access to a second end of the first pin such that the first pin may be disengaged from the first housing, thereby allowing movement of the first fastener module with respect to the controller module in the first direction.

10. The modular electronically releasable security apparatus of claim 9, wherein the second fastener module, when attached to the controller module, blocks access to the second end.

11. The modular electronically releasable security apparatus of claim 8, wherein moving the first fastener module with respect to the controller module in the first direction allows the controller module to be detached from the first fastener module.

12. The modular electronically releasable security apparatus of claim 1, further comprising:

a first housing corresponding to the controller module;

a second housing corresponding to the second fastener module and having a first surface facing the controller module and a second surface, opposite the first surface; and a first pin, movable with respect to the second housing, arranged such that a first end of the first pin may extend out of the second housing and engage with the first housing, thereby preventing movement of the controller module with respect to the second fastener module in at least a first direction.

13. The modular electronically releasable security apparatus of claim 12, the controller module further comprising:

an opening defined in the second surface allowing access to a second end of the first pin such that the first pin may be disengaged from the first housing, thereby allowing movement of the controller module with respect to the second fastener module in the first direction.

14. The modular electronically releasable security apparatus of claim 13, wherein the second fastener module, when anchored to the fixed object, blocks access to the second end.

15. The modular electronically releasable security apparatus of claim 12, wherein moving the second fastener module with respect to the controller module in the first direction allows the second fastener module to be detached from the controller module.

16. A method comprising:

receiving a first wireless electronic signal using one or more antennas of a controller module, the controller module releasably attached to a first fastener module;

verifying the first wireless electronic signal;

in response to verifying the first wireless electronic signal, causing a first electromechanical component to release a first locking mechanism of the first fastener module, the first locking mechanism securing a portable item to the first fastener module; and in response to verifying at least one of the first wireless electronic signal or a second wireless electronic signal received by the one or more antennas, actuating a second electromechanical component to release the first fastener module, thereby allowing movement of the first fastener module in at least a first direction with respect to the controller module, wherein moving the first fastener module in the first direction with respect to the controller module releases the first fastener module from the controller module.

17. The method of claim 16, further comprising:

in response to verifying at least one of the first wireless electronic signal, the second wireless electronic signal, or a third wireless electronic signal received by the one or more antennas, actuating a third electromechanical component to release a second fastener module, thereby allowing movement of the second fastener module in at least a second direction with respect to the controller module, wherein moving the second fastener module in the second direction with respect to the controller module releases the second fastener module from the controller module.

18. The method of claim 16, further comprising:

in response to verifying at least one of the first wireless electronic signal, the second wireless electronic signal, or a third wireless electronic signal received by the one or more antennas, actuating a third electromechanical component to release an anchoring mechanism of a second fastener module releasably attached to the controller module, the anchoring mechanism securing the second fastener module to a fixed object.

19. The method of claim 16, further comprising:

in response to verifying at least one of the first wireless electronic signal, the second wireless electronic signal, or a third wireless electronic signal received by the one or more antennas, sending a fourth wireless electronic signal indicating an actuation state of at least one of the first electromechanical component or the second electromechanical component.

20. The method of claim 16, further comprising:

detecting movement of the controller module using a sensor; and in response to detecting the movement, sending a third wireless electronic signal indicating potential tampering.

* * * * *